US007248358B2

(12) United States Patent
Geshwind et al.

(10) Patent No.: US 7,248,358 B2
(45) Date of Patent: Jul. 24, 2007

(54) DEVICES AND METHOD FOR SPECTRAL MEASUREMENTS

(75) Inventors: Frank Geshwind, Madison, CT (US); Ronald R. Coifman, North Haven, CT (US); Andreas Coppi, Groton, CT (US); Richard A. Deverse, Kailua Kona, HI (US); William G. Fateley, Manhattan, KS (US)

(73) Assignee: Plain Sight Systems, Inc., Hamden, CT (US)

( * ) Notice: Subject to any disclaimer, the term of this patent is extended or adjusted under 35 U.S.C. 154(b) by 0 days.

(21) Appl. No.: 11/243,054

(22) Filed: Oct. 4, 2005

(65) Prior Publication Data

US 2006/0092414 A1     May 4, 2006

Related U.S. Application Data

(60) Continuation of application No. 11/075,114, filed on Mar. 7, 2005, and a continuation-in-part of application No. 10/832,684, filed on Apr. 26, 2004, which is a division of application No. 09/798,860, filed on Mar. 1, 2001, now Pat. No. 6,859,275, which is a continuation-in-part of application No. 09/672,257, filed on Sep. 28, 2000, now Pat. No. 6,392,748, which is a continuation of application No. 09/502,758, filed on Feb. 11, 2000, now Pat. No. 6,128,078, which is a continuation of application No. 09/289,482, filed on Apr. 9, 1999, now Pat. No. 6,046,808.

(60) Provisional application No. 60/615,724, filed on Oct. 4, 2004, provisional application No. 60/550,966, filed on Mar. 6, 2004.

(51) Int. Cl.
*G01J 3/28* (2006.01)

(52) U.S. Cl. ........................... 356/310; 356/330

(58) Field of Classification Search ................ 356/310, 356/330
See application file for complete search history.

(56) References Cited

U.S. PATENT DOCUMENTS

| 4,193,691 A | 3/1980 | Fjarlie |
| 4,448,529 A | 5/1984 | Krause |
| 4,790,654 A | 12/1988 | Clarke |
| 5,061,049 A | 10/1991 | Hornbeck |
| 5,323,002 A | 6/1994 | Sampsell et al. |
| 5,384,725 A | 1/1995 | Coifman et al. |
| 5,483,335 A | 1/1996 | Tobias |

(Continued)

OTHER PUBLICATIONS

Coifman et al., "Entropy-Based Algorithms for Best Basis Selection," IEEE Transactions on Information Theory, vol. 38, No. 2, 713-718, Mar. 1992.

(Continued)

*Primary Examiner*—F. L. Evans
(74) *Attorney, Agent, or Firm*—Fulbright & Jaworski LLP

(57) ABSTRACT

A spectral measurement device comprising an entrance aperture for receiving an electromagnetic energy and a mask located at the entrance aperture in the form of a two-dimensional encodement pattern. An optical element conditions the electromagnetic energy received from the mask for presentation to the spectral dispersion element and the and a spectral dispersion element disperses the electromagnetic energy in one or more dimensions. Additionally, the optical element conditions the dispersed electromagnetic energy onto an array of detector elements.

18 Claims, 62 Drawing Sheets

U.S. PATENT DOCUMENTS

| | | |
|---|---|---|
| 5,504,575 A | 4/1996 | Stafford |
| 5,506,676 A | 4/1996 | Hendler et al. |
| 5,526,299 A | 6/1996 | Coifman et al. |
| 5,627,639 A * | 5/1997 | Mende et al. ............... 356/310 |
| 5,737,075 A | 4/1998 | Koch et al. |
| 5,748,308 A | 5/1998 | Lindberg et al. |
| 5,828,066 A | 10/1998 | Messerschmidt |
| 7,092,101 B2 | 8/2006 | Brady et al. |

OTHER PUBLICATIONS

Mende et al., Hadamard spectroscopy with a two-dimensional detecting array, Applied Optics, Voc. 32, No. 34, 7095-7105, Dec. 1, 1993.

Thiele, "A Fast Algorithm for Adapted Time-Frequency Tilings," Applied and Computational Harmonic Analysis, 3, 91-99 (1996).

* cited by examiner

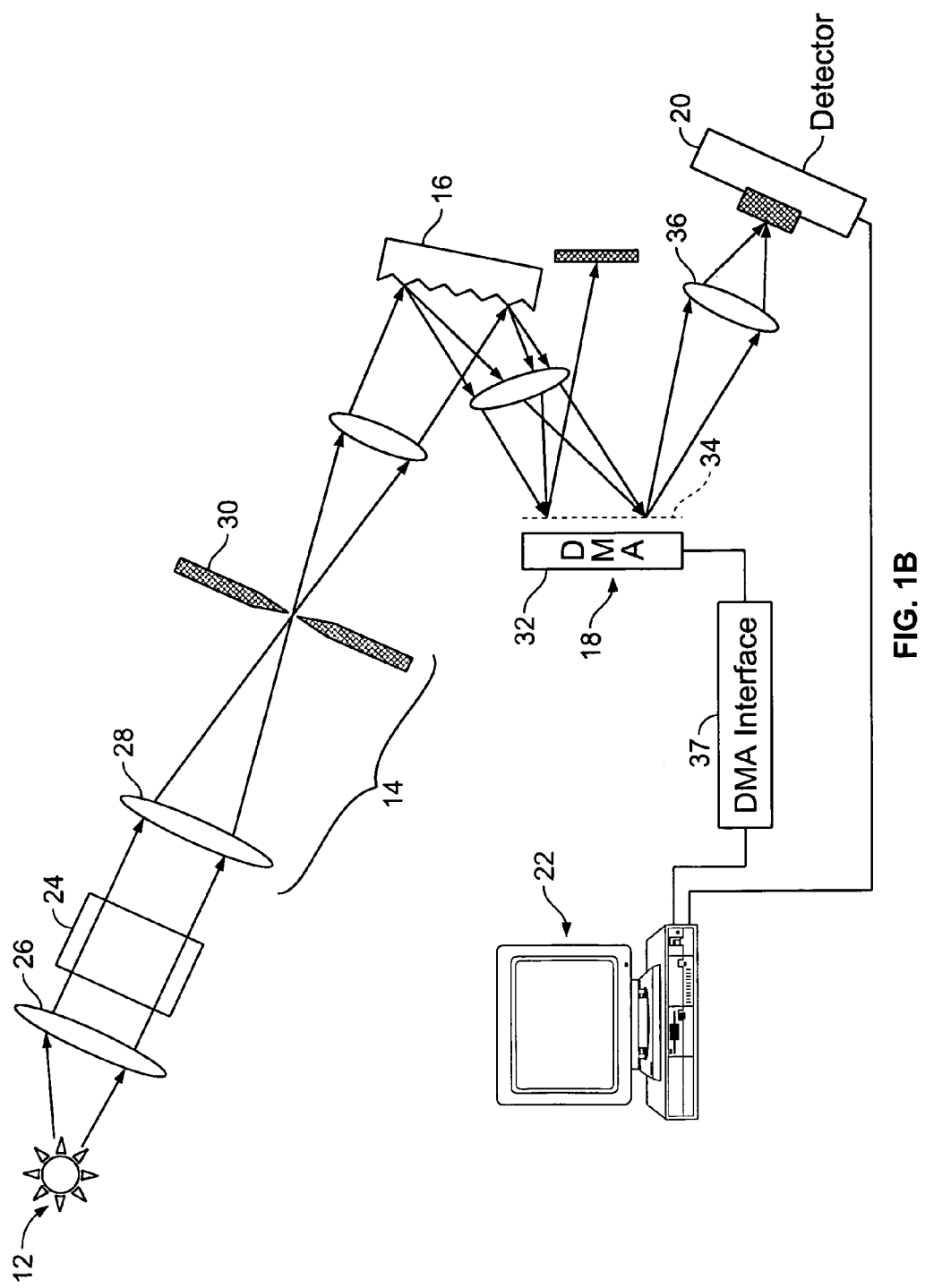

The Focal Plane of the NIR - DMA Imaging Spectrograph

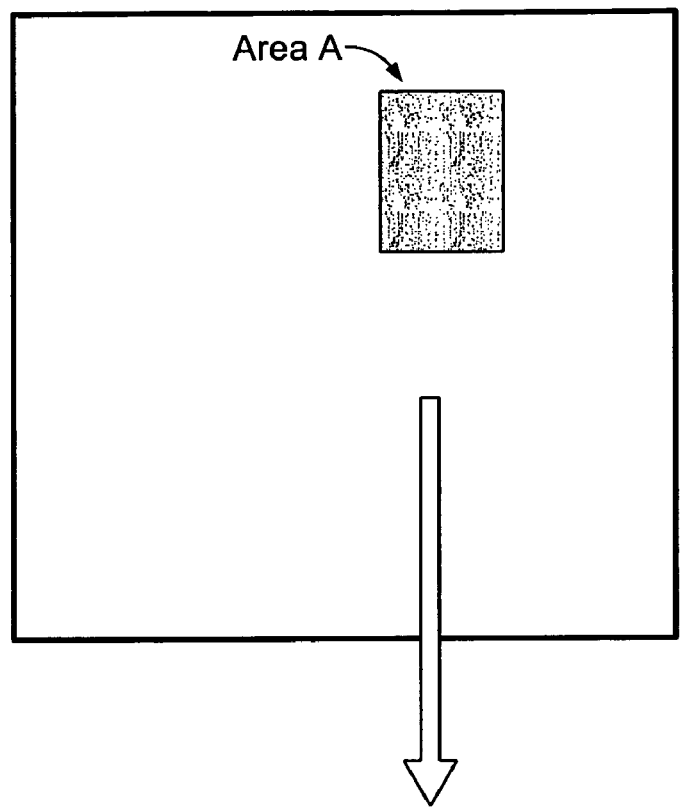
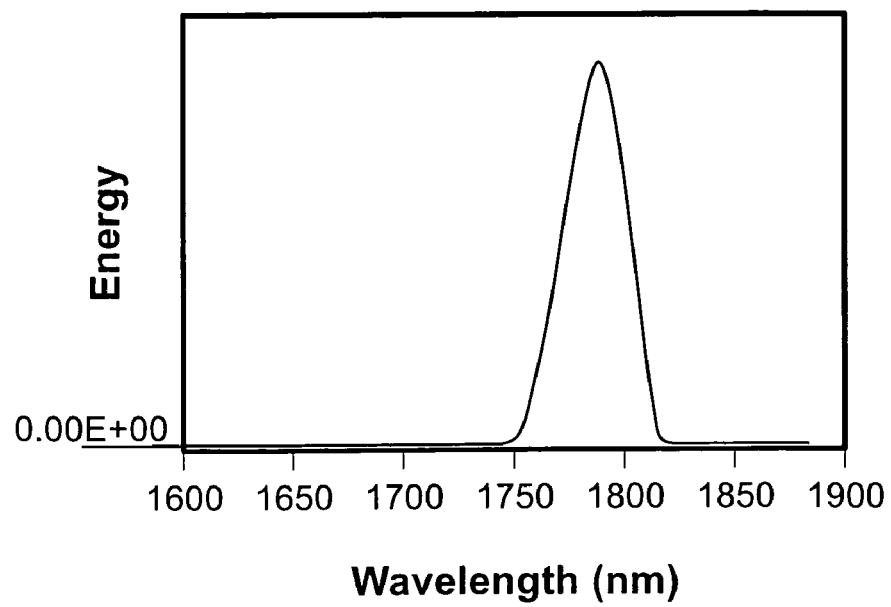
FIG. 9A

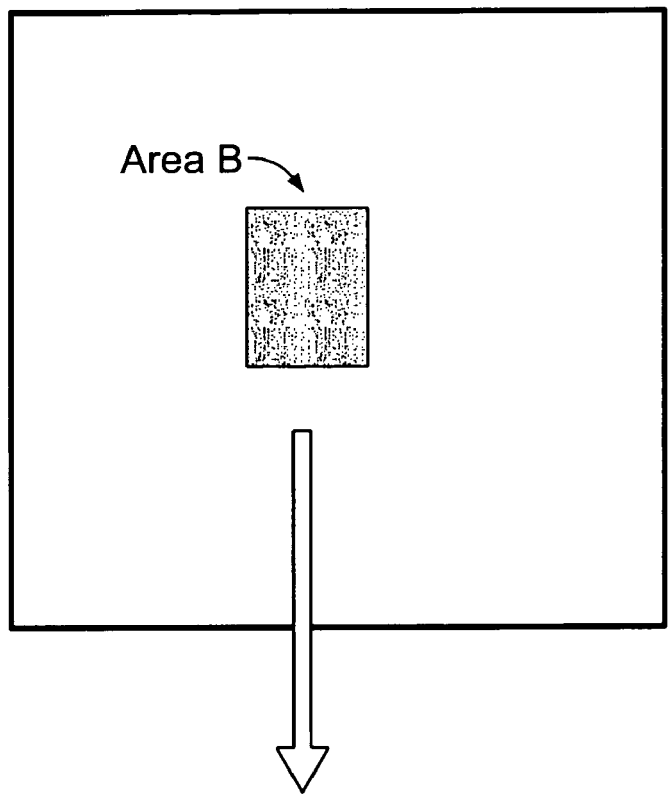
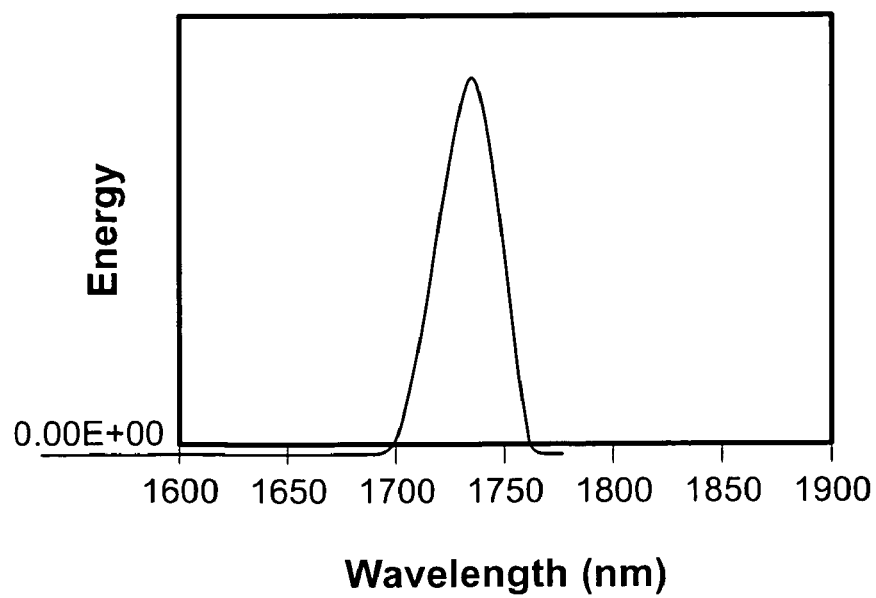
FIG. 9B

Filter 3
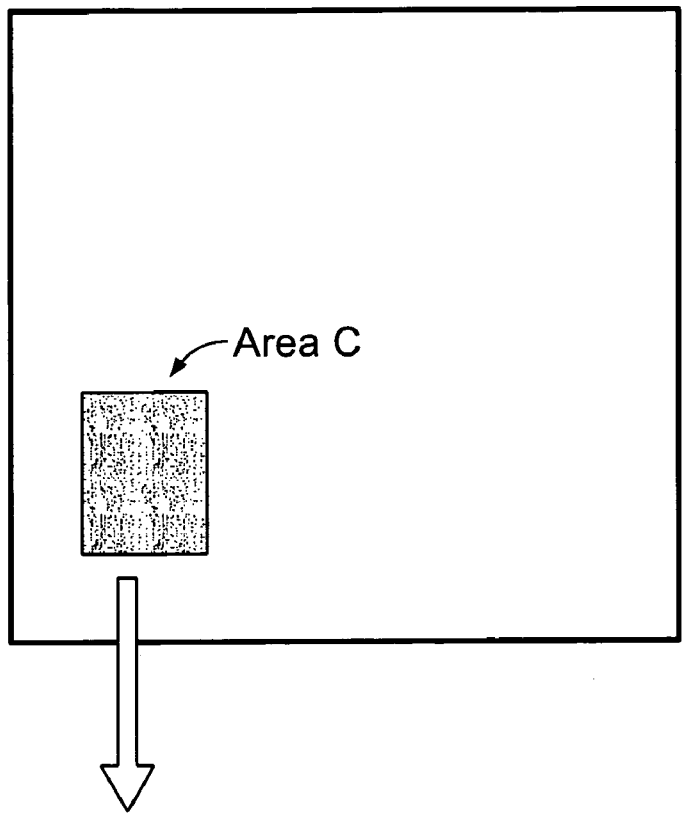
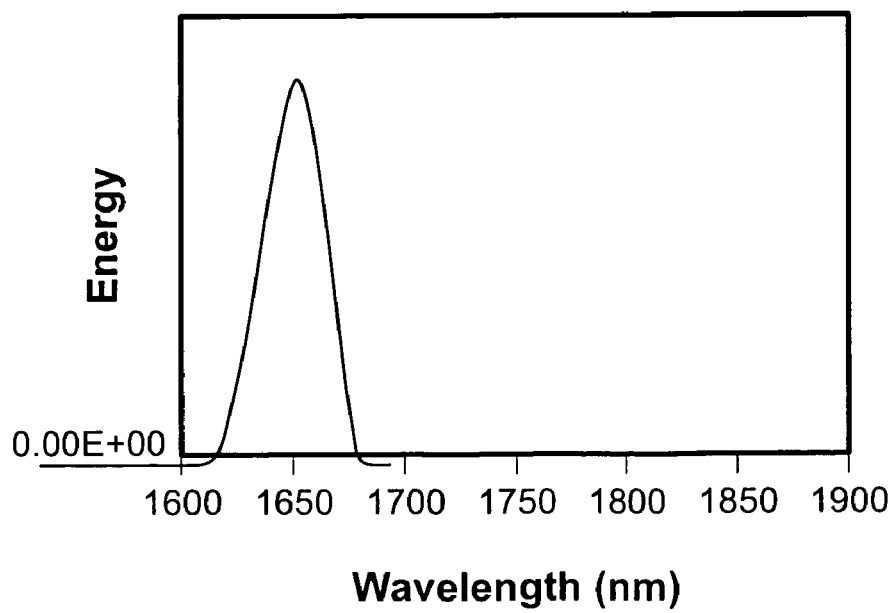
FIG. 9C

Filter 1,2,3
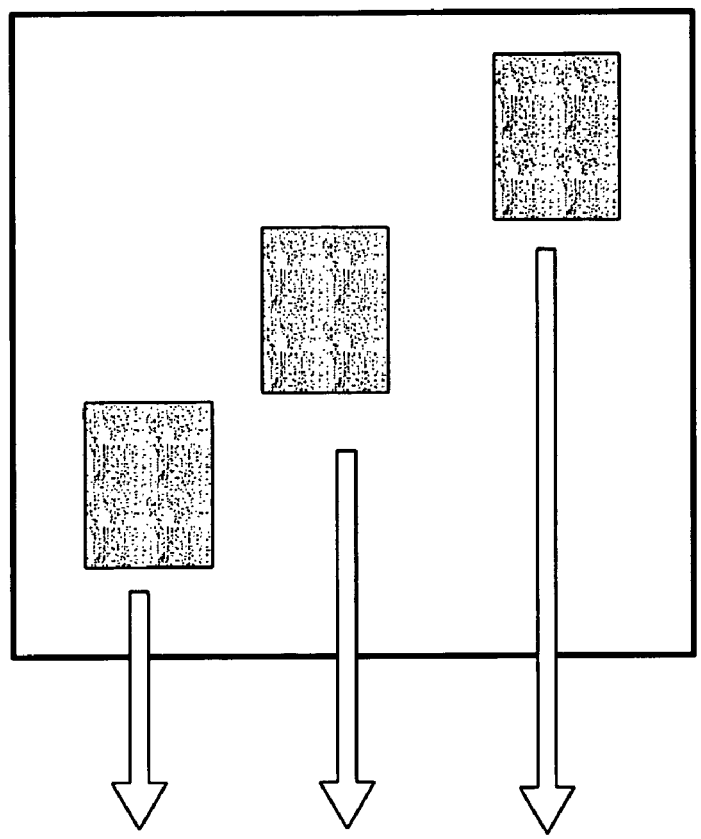
Filter 1,2,3
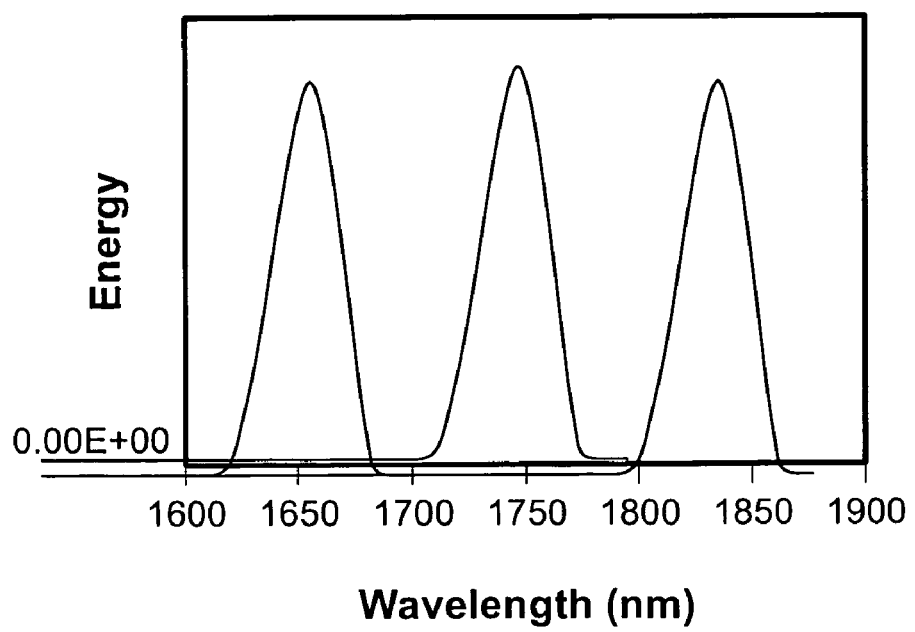
Wavelength (nm)
FIG. 9D

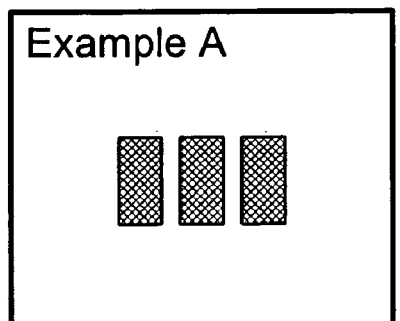
Example A
Wavelength (nm)
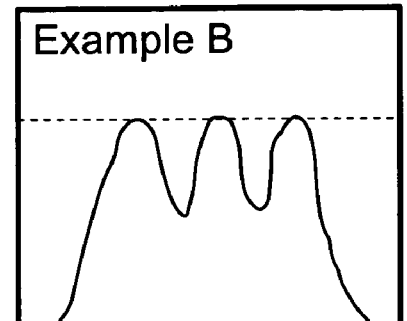
Example B
Wavelength (nm)
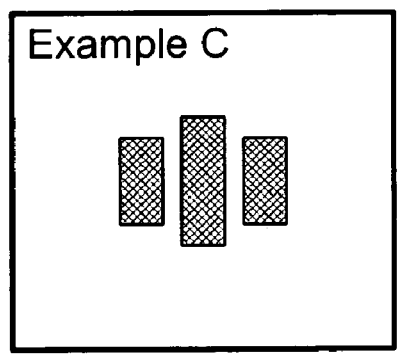
Example C
Wavelength (nm)
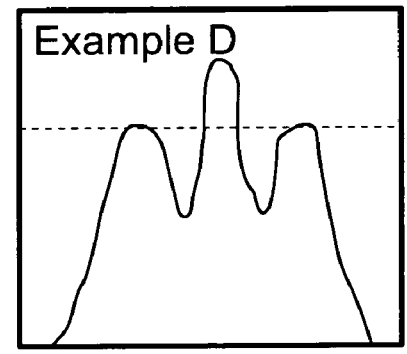
Example D
Wavelength (nm)
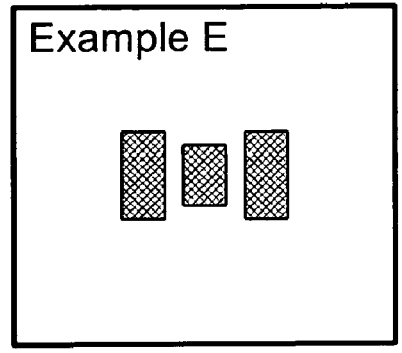
Example E
Wavelength (nm)
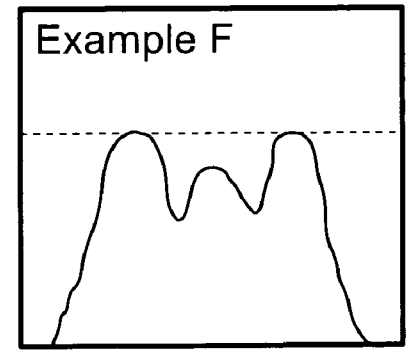
Example F
Wavelength (nm)
FIG. 10

Side View of Modulator
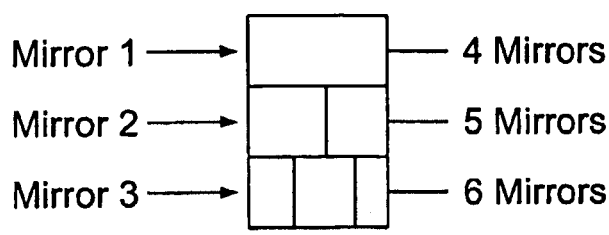
Mirror 1 → 4 Mirrors
Mirror 2 → 5 Mirrors
Mirror 3 → 6 Mirrors
FIG. 13
Top View of Modulator
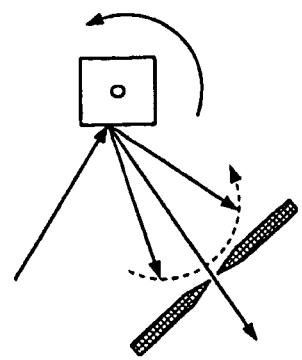
FIG. 14
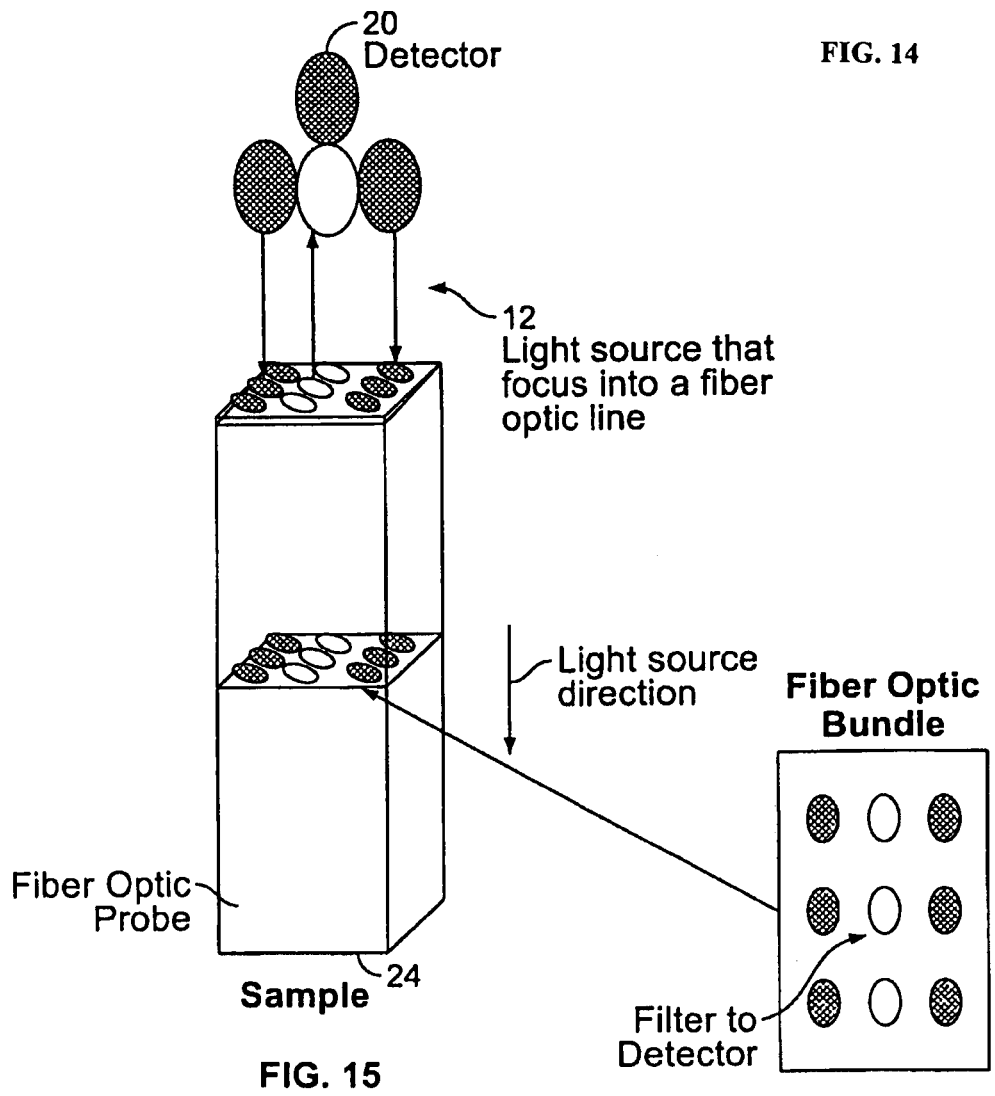
FIG. 15
FIG. 16

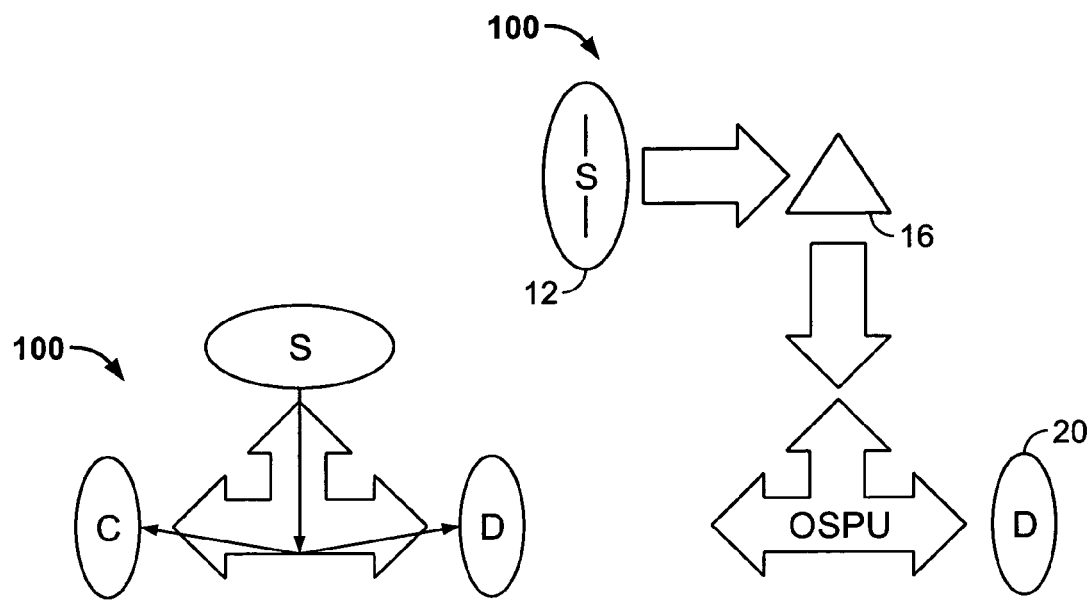
FIG. 18B         FIG. 19
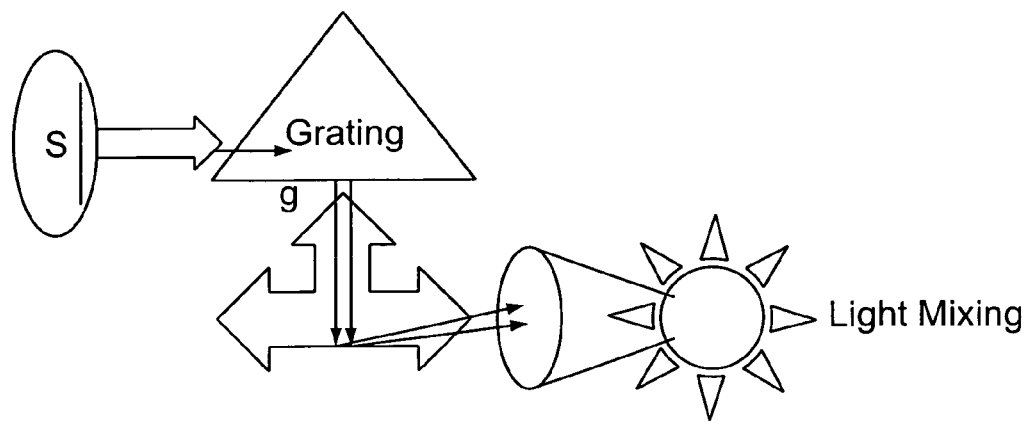
FIG. 20

Modular Fiber Optic Sensor System

E-Probe for Pierced Ears

E-Probe for Pierced Ears

Effect of Noise on Regression Error for Standard and Walsh Methods

Pushbroom Scan for X Spatial Dimension

DEVICES AND METHOD FOR SPECTRAL MEASUREMENTS

RELATED APPLICATION

This application claims priority benefit of provisional patent application No. 60/615,724, filed Oct. 4, 2004, which is incorporated by reference in its entirety. This application is a continuation of application Ser. No. 11/075,114, filed Mar. 7, 2005, which claims priority benefit of provisional patent application No. 60/550,966, filed Mar. 6, 2004 and is a continuation-in-part of application Ser. No. 10/832,684, filed Apr. 26, 2004, which is a divisional of application Ser. No. 09/798,860, filed Mar. 1, 2001, now U.S. Pat. No. 6,859,275, which is a continuation-in-part of application Ser. No. 09/672,257, filed Sep. 28, 2000, now U.S. Pat. No. 6,392,748, which is a continuation of application Ser. No. 09/502,758 filed Feb. 11, 2000, now U.S. Pat. No. 6,128,078, which is a continuation of application Ser. No. 09/289,482 filed Apr. 9, 1999, now U.S. Pat. No. 6,046,808, each of which is incorporated by reference in its entirety.

FIELD OF THE INVENTION

The present invention relates generally to multiplexed, encoded and weighted spectral measurements and devices, more particularly to an improved spectral measurement method and system utilizing a compact, field deployable solid state device with no moving parts and employing weighted combinations of resolution elements, Hadamard, principal component analysis and other encoding methods to provide real-time high-throughput spectrometric, chemometric and/or other analytical measurements.

BACKGROUND OF THE INVENTION

Imagers employ either a two-dimensional (2D) multi-channel detector array or a single element detector. Imagers using a 2D detector array measure the intensity distribution of all spatial resolution elements simultaneously during the entire period of data acquisition. Imagers using a single detector require that the individual spatial resolution elements be measured consecutively via a raster scan so that each one is observed for a small fraction of the period of data acquisition. Prior art imagers using a plurality of detectors at the image plane can exhibit serious signal-to-noise ratio problems. Prior art imagers using a single element detector can exhibit more serious signal-to-noise ratio problems. Signal-to-noise ratio problems limit the utility of imagers applied to chemical imaging applications where subtle differences between a sample's constituents become important.

Spectrometers are commonly used to analyze the chemical composition of samples by determining the absorption or attenuation of certain wavelengths of electromagnetic radiation by the sample or samples. Because it is typically necessary to analyze the absorption characteristics of more than one wavelength of radiation to identify a compound, and because each wavelength must be separately detected to distinguish the wavelengths, prior art spectrometers utilize a plurality of detectors, have a moving grating, or use a set of filter elements. However, the use of a plurality of detectors or the use of a macro moving grating has signal-to-noise limitations. The signal-to-noise ratio largely dictates the ability of the spectrometer to analyze with accuracy all of the constituents of a sample, especially when some of the constituents of the sample account for an extremely small proportion of the sample. There is, therefore, a need for imagers and spectrometers with improved signal-to-noise ratios.

Prior art variable band pass filter spectrometers, variable band reject filter spectrometers, variable multiple band pass filter spectrometers or variable multiple band reject filter spectrometers typically employ a multitude of filters that require macro moving parts or other physical manipulation in order to switch between individual filter elements or sets of filter elements for each measurement. Each filter element employed can be very expensive, difficult to manufacture and all are permanently set at the time of manufacture in the wavelengths (bands) of radiation that they pass or reject. Physical human handling of the filter elements can damage them and it is time consuming to change filter elements. There is, therefore, a need for variable band pass filter spectrometers, variable band reject filter spectrometers, variable multiple band pass filter spectrometers or variable multiple band reject filter spectrometers without a requirement for discrete (individual) filter elements that have permanently set band pass or band reject properties. There is also a need for variable band pass filter spectrometers, variable band reject filter spectrometers, variable multiple band pass filter spectrometers or variable multiple band reject filter spectrometers to be able to change the filters corresponding to the bands of radiation that are passed or rejected rapidly, without macro moving parts and without human interaction.

In several practical applications it is required that an object be irradiated with radiation having particularly shaped spectrum. In the simplest case when only a few spectrum lines (or bands) are necessary, one can use a combination of corresponding sources, each centered near a required spectrum band. Clearly, however, this approach does not work in a more general case, and therefore it is desirable to have a controllable radiation source capable of providing arbitrary spectrum shapes and intensities. Several types of prior art devices are known that are capable of providing controllable radiation. Earlier prior art devices primarily relied upon various "masking" techniques, such as electronically alterable masks interposed in the optical pathway between a light source and a detector. More recent prior art devices use a combination of two or more light-emitting diodes (LEDs) as radiation sources. In such cases, an array of LEDs or light-emitting lasers is configured for activation using a particular encoding pattern, and can be used as a controllable light source. A disadvantage of these systems is that they rely on an array of different LED elements (or lasers), each operating in a different, relatively narrow spectrum band. In addition, there are technological problems associated with having an array of discrete radiation elements with different characteristics. Accordingly, there is a need for a controllable radiation source, where virtually arbitrary spectrum shape and characteristics can be designed, and where disadvantages associated with the prior art are obviated. Further, it is desirable not only to shape the spectrum of the radiation source, but also encode its components differently, which feature can be used to readily perform several signal processing functions useful in a number of practical applications. The phrase "a spectrum shape" in this disclosure refers not to a mathematical abstraction but rather to configurable spectrum shapes having range(s) and resolution necessarily limited by practical considerations.

In addition to the signal-to-noise issues discussed above, one can consider the tradeoff between signal-to-noise and, for example, one or more of the following resources: system cost, time to measure a scene, and inter-pixel calibration. Thus, in certain prior art systems, a single sensor system may cost less to produce, but will take longer to fully measure an object under study. In prior art multi-sensor systems, one often encounters a problem in which the different sensor elements have different response characteristics, and it is necessary to add components to the system to calibrate for this. It is desirable to have a system with which one gains the. lower-cost, better signal-to-noise, and automatic inter-pixel calibration advantages of a single-sensor system while not suffering all of the time loss usually associated with using single sensors.

In a conventional monochromater, white light or broadband optical energy emerging from an entrance slit is collimated onto a diffraction grating, angularly dispersed according to wavelength and then focused onto an exit slit. In this way, relatively monochromatic light or optical energy confined to some narrow band defined by the geometry and physical properties of optical elements and their arrangement emerges from the exit slit. By moving or translation of one or more of the slits left and right or rotating the grating while leaving the slits stationary, the wavelength of the monochromatic output light scans through the wavelength range of the device. The resulting output sequence interacts with the matter, and the results of each are measured. Alternatively, the light interacts with the matter prior to passing through the spectrometer and the resulting output sequence is then measured. In either case, the resulting sequence of measurements gives a spectral signature of the matter. However, such devices are deficient in that the two slits required to help define the bandpass located both at the object and image plane of the optical system work to severely limit the amount of light that passes through the system, and therefore limit the amount of light that is measured. For this reason, it is difficult or impossible to rapidly obtain good signal to noise ratios with monochromaters where high resolution is desired or in situations where there is a limit to the amount of light energy available.

Conventional linear array spectrometers can be viewed as an improvement over the monochromaters. In a conventional linear array spectrometer, the output slit located at the image plane or focal plane of the optical system is replaced by a linear array of detectors situated such that there is a detector at each exit slit position to receive the light. For such spectrometers, light interacts with the matter prior to passing into the monochromater, and the linear array of detectors simultaneously measures the resulting sequence of spectral data. The intensity of the set of bands of wavelength that impinge upon the linear array of detectors during the integration time of the measurement provides the spectral signature of the matter. Linear array spectrometers have an advantage over monochromaters in that the linear detector array collects all of the data simultaneously such that fluctuations in the source energy are not interpreted as features of the spectral signature of the matter. Additionally, unlike the monochrometers, the linear array spectrometers have no moving parts and can make instantaneous measurements. Further, during the time it takes to collect a spectrum using a scanning type monochrometer, the linear array spectrometers can collect multiple spectra. Conversely, the linear array spectrometer can collect an entire spectrum in the time it takes the scanning monochrometer to collect one spectral resolution element. However, the entrance slit still limits the amount light entering the system to each detector element in the linear detector array.

Conventional Hadamard spectrometers can be viewed as an improvement over both the scanning monochromaters and linear array spectrometers. In conventional Hadamard spectrometers, one or both of the slits of a monochromater are replaced by a coded array of slits (or mask). Thus, the exit light is no longer monochromatic in nature, but is an encoded mixture of wavelengths of light where the encodement is determined by the optical masks that can be located at the object or image planes of the optical system. The conventional Hadamard spectrometer operates by changing or moving one or both of the mask(s) through a pre-determined sequence of changes or moves. In this way, a full encodement library of exit light is produced. The light entering or exiting the optical system interacts with the sample or matter, and the results of each of the encodements are measured. The measurements of the light resulting from the interaction with the sample or matter and sequence of encoding combinations dictated by mask positions or encodements, is then mathematically inverted, so that one reconstructs the spectral signature of the sample or matter. Since the Hadamard spectrometer has many more slits than the monchrometer, more light is available at the exit aperture. However, the conventional Hadamard spectrometers have changing or moving parts to move or translate the encoded aperture through the requisite combinations of encodements to be measured. Such motion or change due to physical limitation of the conventional Hadamard spectrometer is generally subject to some variation, error and/or distortion over time, and is especially susceptible to errors in the presence of noise, heat, and other environmental or mechanical disturbances.

As noted herein, conventional spectral measurement systems, such as the scanning monochromaters suffer from these attributes noted herein. The linear array spectrometers and scanning monochromaters suffer from a lack of light throughput. Conventional spectral measurement systems, such as the monochromaters, Hadamard spectrometers and Fourier transform spectrometers suffer from a complexity and instability due to the presence of moving or changing parts. Since the latter spectral measurement systems make a series of measurements over time, rather than instantaneously, each suffers from errors when it is looking at light sources or sample/matter that is changing during the time of measure or scan. A further disadvantage of the scanning monochromaters, linear array spectrometers and Fourier transform spectrometer systems is that a contiguous regular interval of wavelength spectral data are collected. In many spectrometric applications, such contiguous spectral data generally contains no relevant or useful information with respect to the spectral signature of the sample or matter. Hence, it is desirable to collect non-contiguous variable band pass spectral resolution element data that comprise only those spectral bands that are deemed of significance to the spectrometric measure or analysis of the desired sample or matter.

Accordingly, there is a need for a spectral measurement system that offers the advantages of both the linear array spectrometers and Hadamard or Fourier spectrometers. Additionally, there is a need for a spectral measurement system capable of collecting only the non-contiguous and non-uniform band pass spectral data necessary for the desired analysis. The spectral measurement system of the present invention comprises multi-detector and no moving parts and provides instantaneous measurements.

In prior-art dispersive systems, as one moves to high resolution spectrometric measures one must decrease the slit width when preserving spectral bandwidth (spectral range) or increase the angular dispersion of the diffraction element and this results in a decrease of spectral range. Both the decrease in slit width and increase in angular dispersion decrease the photon flux through the spectrometer for any given measure of individual spectral resolution elements. This decrease in photonic flux limits sensitivity, analytical capability and the ability of the detector to measure subtle differences in spectral energy at each data resolution element or related spectral resolution element. Hadamard transform measurements allow for multiplexing in which a multitude of slits are opened simultaneously for each measurement. Fourier transform measurements allow for multiplexing in which there is no slit in the system, and each wavelength is measured with a Fourier weight that varies over time. The advantage of these multiplexing techniques is that photonic flux improves over single slit methods as the demand for resolution or data resolution elements increase for a given spectral bandwidth of operation. The drawback to increasing the spectral resolution requirement that can apply to these conventional methods, even Hadamard and Fourier Transform multiplexed measurements, is that the scan times may need to be increased so that the integration times for each of the data resolution elements in the scan is sufficient to collect enough signal to rise above the noise floor of the system and to achieve the desired measure of the requisite signal-to-noise. The conventional multiplexing methods require measuring a series of encodements over time T which dictates a maximum detector integration time of T/N where N is the number of resolution elements. This requires an increase in scan time and can be problematic if the source energy or sample changes over the time T of the scan. The spectral measurement system of the present invention based on multiplexing spectrometry proceeds upon the desirability of eliminating such problem as each detector views the source or sample fluctuations simultaneously.

In the spectral measurement system of the present invention, the scan is not intermodulated by these changes and the intermodulations do not show up as noise in the spectral data. This has been the impetus for fast scan type Fourier Transform (FT) spectrometer systems. Despite the speed increase in scan times, these fast scan systems are inadequate for many measures such as looking at spark or combustion products during the life of a burn cycle. The spectral measurement system of the present invention based on static spectrometer is capable of looking at rapidly changing sources, samples and environments while taking advantage of the high throughput afforded by multiplexed measurements.

Many point spectrometers whether multiplexed or not utilize single detectors. Historically this has in large part been due to the lack of availability, reliability, or affordability of appropriate detector arrays. Most applications that did not overtly require linear or two-dimensional arrays were hastily assigned to single detector solutions. However, detector arrays, when properly employed, can enable advantages such as faster collection rates, oversampling, and better signal to noise. One of the first to realize this was S. Mende in "Hadamard spectroscopy with a two-dimensional detecting array", S. B. Mende; E. S. Claflin; R. L. Rairden; G. R. Swenson, Applied Optics 32 (34): 7095–7105 (Dec. 1, 1993), in which he made the clever observation that for diffuse sources one could illuminate a two-dimensional coded aperture spectrograph and to obtain accurate and high resolution measurements. Each row of the mask consisted of a Hadamard sequence parallel to the direction of dispersion. The dispersed output from that row was recorded across the corresponding row of a two-dimensional focal plane array. Using that data, he proposed a scheme to invert the data and reconstruct the spectrum of the uniform light illuminating that row. Different Hadamard sequences of varying lengths were put on each row providing redundant information for averaging, or, if the source were uniformly illuminating across rows but spatially coherent across columns, 1-D spectral imaging could be obtained. In either case, the measurement required no mechanical scanning and only one frame of acquisition. His invention was limited by the numerical conditioning of the mathematical inverse required to reconstruct the spectra from the data collected. He also neglected to consider the possibilities of a linear array in similar configurations.

The present invention differs from Mende's in several ways. Each row of the coded aperture contains Hadamard basis vector generated by the same Hadamard sequence. In one embodiment, this would mean that each row would contain a cyclic shift of a particular Hadamard sequence. Dispersion is still parallel to the rows, but the detector no longer needs to measure across the corresponding row to compute the spectra of the impinging light but rather across the columns. This removes the mathematical issues of Mende's approach and also no longer requires a two-dimensional array which can still difficult to afford or obtain for many wavelength ranges. Furthermore with a linear array perpendicular to the rows, acquisition can be even faster. A two-dimensional array can still be employed in the current invention, yielding redundant information to improve SNR for example by averaging.

It should be pointed out that in the subsequent U.S. Pat. No. 5,627,639, Mende discloses various coded aperture approaches to spectral imaging, and does consider one configuration in which each row is a generated by shifts of the same sequence, as in some embodiments of the present invention. However, he only discloses this in the context of spectral imaging and with the added requirement that the mask (or scene) be scanned. Again, the present invention is for diffuse input only and does not resolve spatial information, i.e., image. It requires no scanning and yields an instantaneous measurement that Mende's scanning method does not. Furthermore, other embodiments of the present invention are not designed to recover the full spectrum but rather "filters" or weighted combinations of wavelengths derived from simple or sophisticated mathematical and chemometric models. These measurements rapidly yield quantities of interest at reduced data rates. None of Mende's disclosures have any provision for this; the full spectrum is always being measured.

While there are more and more intelligent spectral devices being developed that are capable of measuring quantities of interest as opposed to a full raw spectrum which is analyzed post acquisition, most either involve some kind of clever active illumination or scanning filters and or a mechanically moving part—in the best case a MEMS device.

SUMMARY OF THE INVENTION

Therefore, it is an object of the present invention to provide a spectral measurement system which overcomes the above-noted shortcomings of conventional spectral measurement systems.

An object of the present invention is to provide a spectral measurement system as aforesaid, which allows for a faster collection of spectral data during a single integration time of a detector or array of detectors. This faster collection is enabled by multiplexing.

An object of the present invention is to provide a spectral measurement system as aforesaid, which allows for the collection of spectral data with better signal-to-noise ratio (SNR) than similar multiplexed instrumentation that requires scanning and integration time of $t_i$ at every data collection point. The Fourier transform (FT) or Hadamard transform (HT) instruments need to move a mirror (FT) or a mask (HT) and then integrate for integration time $t_i$ such that the total data collection time is $t_i$ times the number of data resolution elements (RE) or mirror or mask positions. The static HT multiplexing spectrometer of the present invention can collect an entire spectrum of RE during $t_i$. These spectra can then be averaged to realize an additional improvement in SNR over scanning FT or scanning HT instruments that is equivalent to the SQRT of the number of RE. This faster collection is enabled by having a detector array, rather than a single detector.

An object of the present invention is to provide a spectral measurement system as aforesaid, which provides better SNR than conventional multiplexing spectrometers. This better SNR is accomplished by making multiplexing measurements with a multi-element detector array, rather than making non-multiplexed or single detector measurements.

An object of the present invention is to provide a spectral measurement system as aforesaid, which is a solid state device suitable for rugged field use with no moving parts. This is enabled by making multiplexing measurements with a multi-element detector array. Since each quantity to be measured is present at an element of the detector array at any given time, it is not necessary to have any moving parts.

An object of the present invention is to provide a spectral measurement system as aforesaid, which is more compact than conventional spectral measurement systems.

An object of the present invention is to provide a spectral measurement system as aforesaid which does not require scanning of mirrors (FT) or masks (HT), thereby enabling real-time spectral data collection. This is enabled by making multiplexing measurements with a multi-element detector array. Since each quantity to be measured is present at an element of the detector array at any given time, it is not necessary to have any moving parts.

An object of the present invention is to provide a spectral measurement system as aforesaid which improves the measurement of biological living samples. In the spectral measurement system of the present invention, the scan is not intermodulated by changes in the samples, and so the typical prior art noise in the spectral data caused by such intermodulation are not present. As a result, the spectral measurement system of the present invention based on a static spectrometer is capable of looking at rapidly changing sources, samples and environments while taking advantage of the high throughput afforded by multiplexed measurements.

An object of the present invention is to provide a spectral measurement system as aforesaid which improves Raman spectrometry such that source fluctuations are no longer an issue. This is due to the lack of intermodulations in the present invention. Since all detectors measure their respective data all of the time, source fluctuation do not distort the measurements.

An object of the present invention is to provide a spectral measurement system as aforesaid wherein designers and manufacturers can set the accuracy and precision of the spectral measurement system at the time of manufacture. In the present invention this is accomplished by determining the resolution and accuracy of the mask elements, and other elements of the system, and by computing calibration data for the system as described herein.

An object of the present invention is to provide a spectral measurement system as aforesaid utilizing less expensive optical elements. Indeed because of the other advantages described, the static spectrometer disclosed herein will not need, for example, the precision parts required for interferometric motion, or the other components standard in the art and used to compensate for the shortcomings of prior art spectrometers.

An object of the present invention is to provide a spectral measurement system as aforesaid in which the alignment of the optical system is not as critical at time of manufacture. Indeed, the calibration at time of manufacture allows the alignment issues to be incorporated into the mask design or detector data processing such that performance is maintained. Such calibration is accomplished by measuring a series of known spectral features with the device, at the time of manufacture, and incorporating inverse data into the software accompanying the disclosed spectral measurement system.

An object of the present invention is to provide a spectral measurement system wherein the smallest spectral data collection time equals the lowest detector integration time, thereby providing faster multiplexed measurements.

An object of the present invention is to provide the spectral measurement system as aforesaid which does not require scanning, thereby eliminating scanning errors. Indeed, one skilled in the art will readily see that the present invention teaches a spectrometer that does not need to scan, and can instead be used in a mode in which the device stares at the sample, material, scene or object of interest, and hence is a staring spectral measurement device.

An object of the present invention is to provide a spectral measurement system as aforesaid wherein all detectors see the same source fluctuations in time, thereby eliminating noise contributions from changes in the source over time.

An object of the present invention is to provide a spectral measurement system as aforesaid, wherein principal components can be encoded into the aperture to affect a direct measure of components of interest. This is accomplished simply by selecting the appropriate mask for the system, as disclosed herein. Of course the system can be designed so that the mask can be changed in the field, thus allowing a base system to be adapted to various field uses.

An object of the present invention is to provide a spectral measurement system as aforesaid which simultaneously encodes multiple spectral ranges. This is accomplished by using different regions on the mask for different spectral ranges, and, in some embodiments, using multiple gratings and/or detector types for different regions of the mask.

In some embodiments of the present invention, one can employ a spectral measurement system as disclosed which employs dual beam spectrometric measures thereby resulting in instantaneous transmission or absorption measures.

An object of some embodiments of the present invention is to provide a spectral measurement system as aforesaid which employs an all reflective design to enable an achromatic operation.

An object of some embodiments of the present invention is to provide a spectral measurement system as aforesaid which measures non-contiguous spectral data.

An object of some embodiments of the present invention is to provide a spectral measurement system as aforesaid which measures variable band pass spectral resolution elements. This is accomplished as further disclosed herein, by selecting appropriate mask designs.

In accordance with an embodiment of the present invention, the spectral measurement system has no moving parts of any kind. In certain other embodiments, the system has no parts that move during measurement, but can move during reconfiguration.

In accordance with an embodiment of the present invention, the spectral measurement system comprises a two-dimensional (2D) detector array for collecting multiple samples of the encoded spectral data which can be used to improve SNR or oversample the spectral data.

In accordance with an embodiment of the present invention, the spectral measurement system comprises a fixed series of fixed masks corresponding to the full encodement library and a detector for each mask (e.g., in a linear array). The masks and detectors are fixed, and the system simultaneously measures each of the encoded combinations of input light. Since a detector is associated with each mask and the full encodement library is represented simultaneously in the system, the present invention eliminates the need to move or change the mask(s) in any way. That is, the spectral measurement system of present invention has the advantages of both the linear array spectrometers and Hadamard spectrometers without their disadvantages.

In accordance with an embodiment of the present invention, the spectral measurement system comprises predetermined and known fixed series of masks, each mask corresponding to one spectral weighting combination, and a detector for each mask. That is, in accordance with an embodiment of the present invention, the fixed series of mask correspond to a subset of the full encodement library chosen to measure any fixed set of spectrally weighted combinations. In accordance with an aspect of the present invention, the encodement can relate to a certain spectral signature attribute of the sample under study, the type or class of the sample, or a particular spectral signature attribute. Additionally, a combination of principal spectral components can also serve as an encodement sequence for the fixed mask.

In accordance with an embodiment of the present invention, the spectral measurement system comprises encoded masks and detectors that are fixed, and the spectral measurement system simultaneously measures each of the desired spectrally weighted combinations of input light, thereby providing advantages over conventional linear array spectrometers and conventional Hadamard spectrometers. Preferably, since the encodement sequence allows combinations of contiguous or non-contiguous wavelengths and variable band pass over the spectral range of operation, the spectral measurement system of the present invention measures only those elements of the spectral signature that have value to the desired analysis.

In accordance with an embodiment of the present invention, the spectral measurement system can act as a spectrometer and measure energy as a function of wavelength or frequency using linear detector arrays.

In accordance with an embodiment of the present invention, the spectral measurement system can act as a direct measurement device and measure the interaction of radiation with matter to compute the desired linear functions of the wavelength energy profile of the input radiation. Preferably, the spectral measurement system utilizes a small number of detectors, arranged in an array or separated from each other.

In accordance with an embodiment of the present invention, the spectral measurement system employing the real-time simultaneously measured multiplexed encodement method disclosed herein, is capable of looking at rapidly changing sources, samples and environments while taking advantage of the high throughput afforded by multiplexed measurements. As events in time become shorter, there is an ever increasing need for throughput of photons because less are available during a given integration period of the detector. In such case, the spectral measurement system of the present invention suffers no loss of speed or increase in integration time for spectral data collection as spectral resolution or number of data resolution elements increase.

In accordance with an embodiment of the present invention, a method for spectral measurement comprises the steps of receiving electromagnetic energy through a mask located at the entrance aperture in the form of a two-dimensional encodement pattern, dispersing said electromagnetic energy in one or more dimensions, conditioning the electromagnetic energy received from said mask for presentation to a spectral dispersion element and conditioning the dispersed electromagnetic energy onto an array of detector elements.

In accordance with an embodiment of the present invention, a spectral measurement device comprises an entrance aperture for receiving an electromagnetic energy, a mask located at the entrance aperture in the form of a two-dimensional encodement pattern, a spectral dispersion element for dispersing the electromagnetic energy in one or more dimensions, an optical element for conditioning the electromagnetic energy received from the mask for presentation to said spectral dispersion element and conditioning the dispersed electromagnetic energy onto an array of detector elements.

In accordance with an embodiment of the present invention, a spectral measurement device comprises an entrance aperture for receiving electromagnetic energy, a mask located at the entrance aperture in the form of a two-dimensional encodement pattern, a concave grating for conditioning and dispersing the electromagnetic energy in one or more dimensions; and an array of detector elements for receiving the dispersed electromagnetic energy from the concave grating.

It is intended that the devices and methods in this application in general are capable of operating in various ranges of electromagnetic radiation, including the ultraviolet, visible, infrared, and microwave spectrum portions. Further, it will be appreciated by those of skill in the art of signal processing, be it acoustic, electric, magnetic, etc., that the devices and techniques disclosed herein for optical signal processing can be applied in a straightforward way to those other signals as well.

BRIEF DESCRIPTION OF THE DRAWINGS

The present invention will be understood and appreciated more fully from the following detailed description, taken in conjunction with the drawings in which:

FIGS. 1A and 1B are schematic diagrams illustrating a spectrometer constructed in accordance with two embodiments of the invention;

FIG. 9 illustrates the design of multi-modal band-pass or band-reject filters with corresponding intensity plots, in accordance with the present invention;

FIG. 10 illustrates the means for the intensity variation of a spectral filter built in accordance with this invention;

FIGS. 11–14 illustrate alternative embodiments of a modulating spectrometer in accordance with this invention; FIG. 12 illustrates an embodiment of a complete modulating spectrometer in which the DMA element is replaced by the concave mirrors of FIG. 11. FIG. 13 illustrates a modulating lens spectrometer using lenses instead of DMA, and a "barber pole" arrangement of mirrors to implement variable modulation. FIG. 14 illustrates a "barber pole" modulator arrangement;

FIGS. 15 and 16 illustrate an embodiment of this invention in which one or more light sources provide several modulated spectral bands using a fiber optic bundle;

FIGS. 18A and 18B illustrate in a diagram form an optical synapse processing unit (OSPU) used as a processing element in accordance with the present invention;

FIG. 19 illustrates in a diagram form the design of a spectrograph using OSPU;

FIG. 20 illustrates in a diagram form an embodiment of a tunable light source;

FIG. 24 is a flow chart of a raster-scan used in one embodiment of the present invention; FIG. 25 is a flowchart of a Walsh-Hadamard scan used in accordance with another embodiment of the invention. FIG. 26 is a flowchart of a multi-scale scan, used in a different embodiment.

DETAILED DESCRIPTION OF THE EMBODIMENTS

Figure 1A:
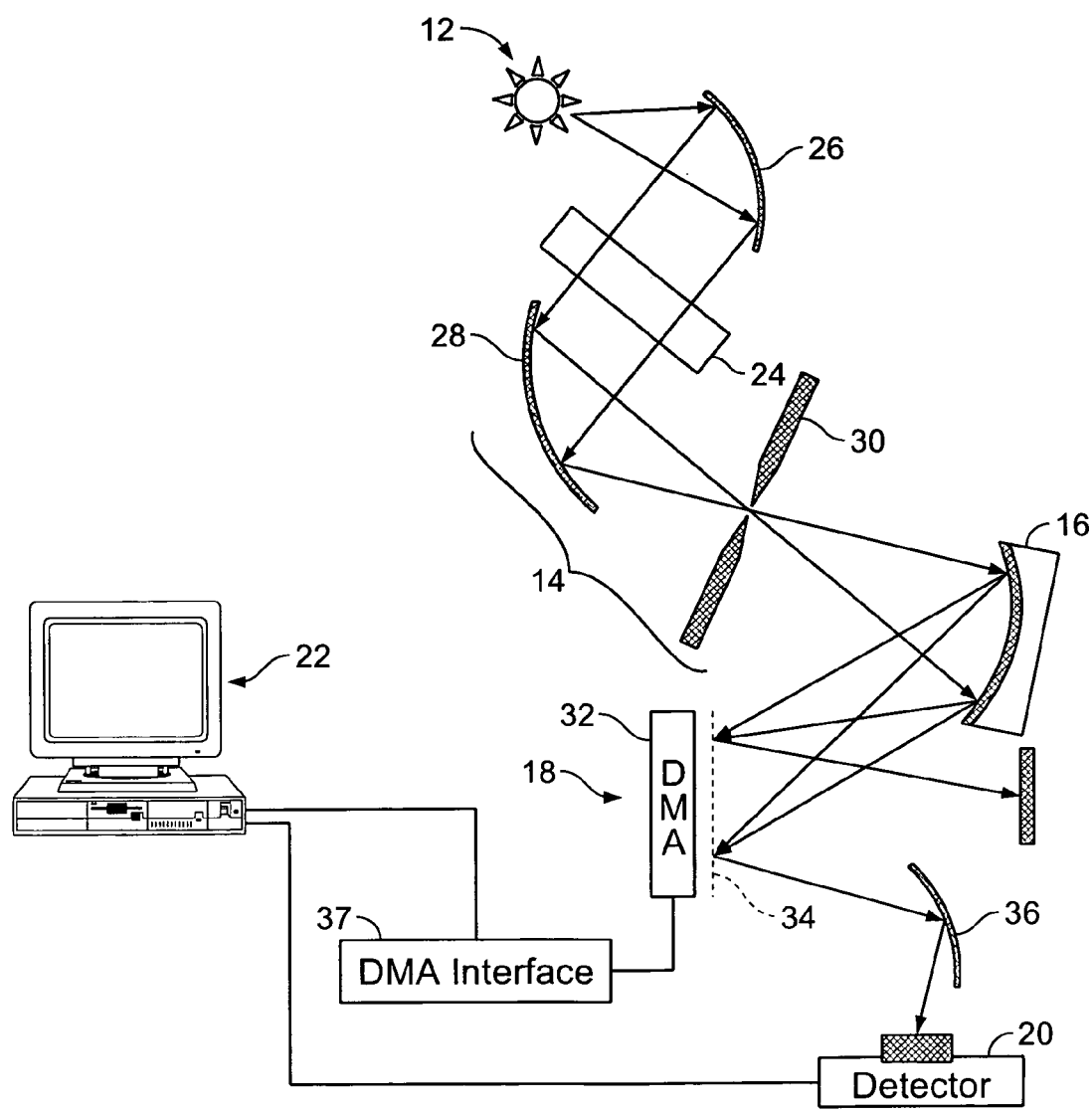

Turning now to the drawing figures and particularly FIG. 1A and 1B, a spectrometer assembly 10 constructed in accordance with one embodiment of the invention is illustrated. With reference to FIG. 1A the device broadly includes a source 12 of electromagnetic radiation, a mirror and slit assembly 14, a wavelength dispersing device 16, a spatial light modulator 18, a detector 20, and an analyzing device 22.

In particular, the electromagnetic radiation source 12 is operable to project rays of radiation onto or through a sample 24 that is to be analyzed, such as a sample of body tissue or blood. The radiation source can be any device that generates electromagnetic radiation in a known wavelength spectrum such as a globar, hot wire, or light bulb that produces radiation in the infrared spectrum. To increase the amount of rays that are directed to the sample, a parabolic reflector 26 can be interposed between the source 12 and the sample 24. In a specific embodiment, the source of electromagnetic radiation is selected as to yield a continuous band of spectral energies, and is referred to as the source radiation. It should be apparent that the energies of the radiation source are selected to cover the spectral region of interest for the particular application.

The mirror and slit assembly 14 is positioned to receive the radiation rays from the source 12 after they have passed through the sample 24 and is operable to focus the radiation onto and through an entrance slit 30. The collection mirror 28 focuses the radiation rays through slit 30 and illuminates the wavelength dispersing device 16. As shown in diagram form in FIG. 1B, in different embodiments of the invention radiation rays from the slit can also be collected through a lens 15, before illuminating a wavelength dispersion device 16.

The wavelength dispersing device 16 receives the beams of radiation from the mirror and slit assembly 14 and disperses the radiation into a series of lines of radiation each corresponding to a particular wavelength of the radiation spectrum. The preferred wavelength dispersing device is a concave diffraction grating; however, other wavelength dispersing devices, such as a prism, can be utilized. In a specific embodiment, the wavelengths from the dispersing device 16 are in the near infrared portion of the spectrum and can cover, for example, the range of 1650–1850 nanometers (nm). It should be emphasized, however, that in general this device is not limited to just this or to any spectral region. It is intended that the dispersion device in general is capable of operating in other ranges of electromagnetic radiation, including the ultraviolet, visible, infrared, and microwave spectrum portions, as well as acoustic, electric, magnetic, and other signals, where applicable.

Figure 2:
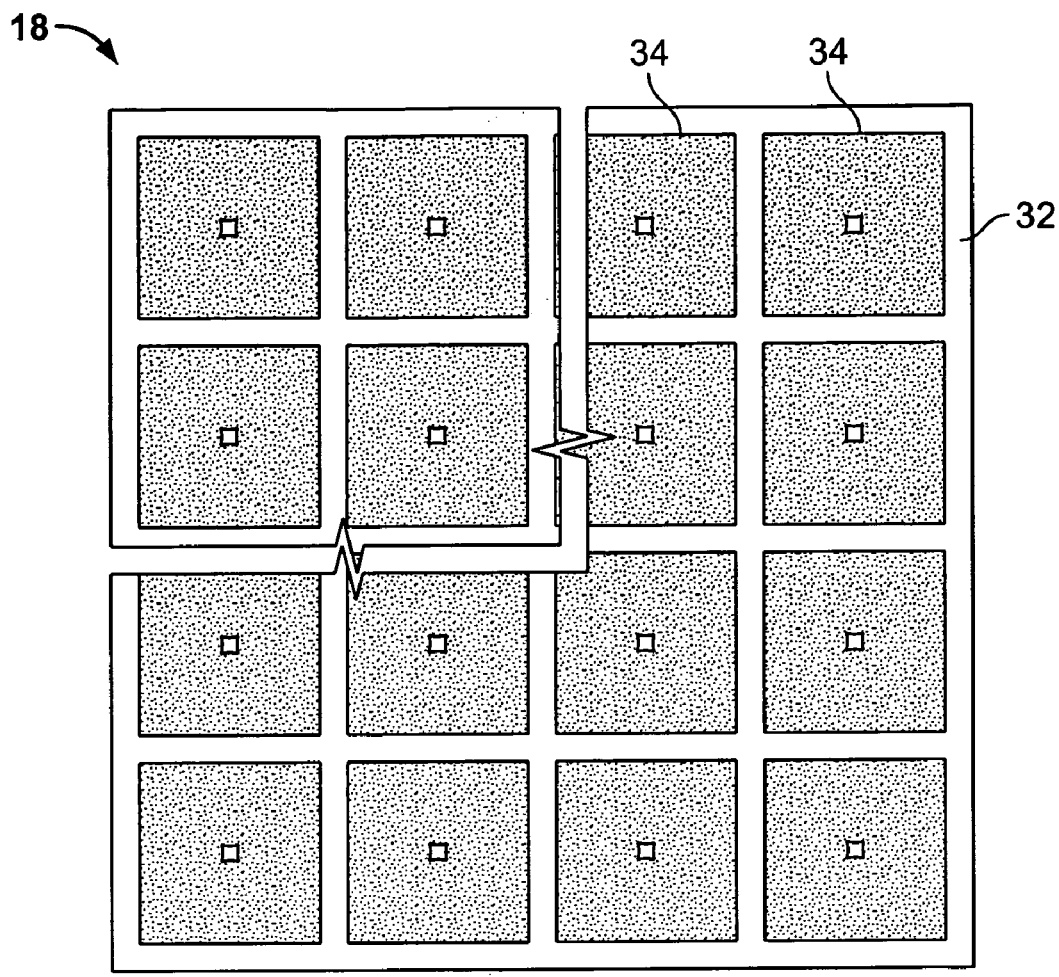
FIG. 2 is a plan view of a micro-mirror array used in the present invention.

The spatial light modulator (SLM) 18 receives radiation from the wavelength dispersing device 16, individually modulates each spectral line, and reflects the modulated lines of radiation onto the detector 20. As illustrated in FIG. 2, the SLM is implemented in a first preferred embodiment as a micro-mirror array that includes a semi-conductor chip or piezo-electric device 32 having an array of small reflecting surfaces 34 thereon that act as mirrors. One such micro-mirror array is manufactured by Texas Instruments and is described in more detail in U.S. Pat. No. 5,061,049, hereby incorporated into the present application by reference. Those skilled in the art will appreciate that other spatial light modulators, such as a magneto-optic modulator or a liquid crystal device can be used instead of the micro-mirror array. Various embodiments of such devices are discussed in more detail below.

Figure 3:
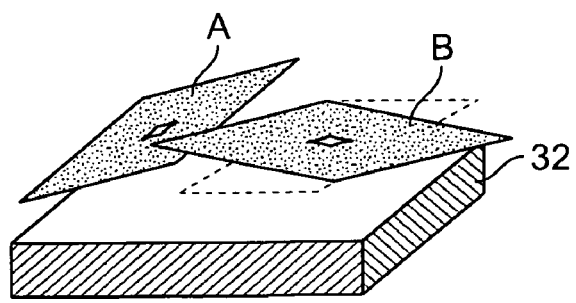
FIG. 3 is a schematic diagram of two micro-mirrors illustrating the modulations of the mirrors of the micro-mirror device of FIG. 2.

The semi-conductor 32 of the micro-mirror array 18 is operable to individually tilt each mirror along its diagonal between a first position depicted by the letter A and a second position depicted by the letter B in FIG. 3. In preferred forms, the semi-conductor tilts each mirror 10 degrees in each direction from the horizontal. The tilting of the mirrors 34 is preferably controlled by the analyzing device 22, which can communicate with the micro-mirror array 18 through an interface 37.

The micro-mirror array 18 is positioned so that the wavelength dispersing device 16 reflects each of the lines of radiation upon a separate column or row of the array. Each column or row of mirrors is then tilted or wobbled at a specific and separate modulation frequency. For example, the first row of mirrors can be wobbled at a modulation frequency of 100 Hz, the second row at 200 Hz, the third row at 300 Hz, etc.

In a specific embodiment, the mirrors are calibrated and positioned so that they reflect all of the modulated lines of radiation onto a detector 20. Thus, even though each column or row of mirrors modulates its corresponding line of radiation at a different modulation frequency, all of the lines of radiation are focused onto a single detector.

The detector 20, which can be any conventional radiation transducer or similar device, is oriented to receive the combined modulated lines of radiation from the micro-mirror array 18. The detector is operable for converting the radiation signals into a digital output signal that is representative of the combined radiation lines that are reflected from the micro-mirror array. A reflector 36 can be interposed between the micro-mirror array 18 and the detector 20 to receive the combined modulated lines of radiation from the array and to focus the reflected lines onto the detector.

The analyzing device 22 is operably coupled with the detector 20 and is operable to receive and analyze the digital output signal from the detector. The analyzing device uses digital processing techniques to demodulate the signal into separate signals each representative of a separate line of radiation reflected from the micro-mirror array. For example, the analyzing device can use discrete Fourier transform processing to demodulate the signal to determine, in real time, the intensity of each line of radiation reflected onto the detector. Thus, even though all of the lines of radiation from the micro-mirror array are focused onto a single detector, the analyzing device can separately analyze the characteristics of each line of radiation for use in analyzing the composition of the sample.

Figure 4:
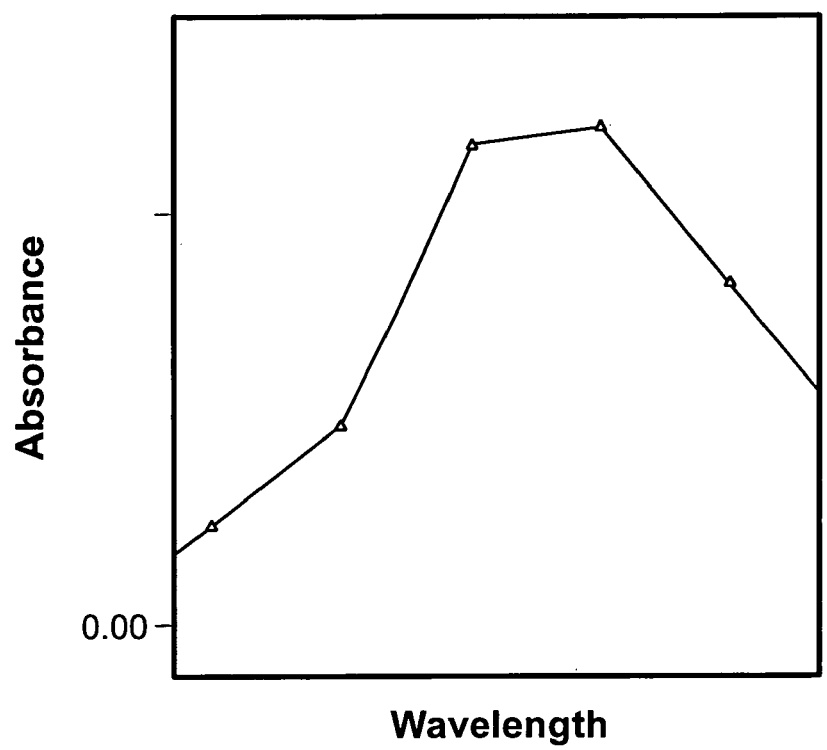
FIG. 4 is a graph illustrating an output signal of the spectrometer when used to analyze the composition of a sample.

In accordance with one embodiment of this invention, the analyzing device is preferably a computer that includes spectral analysis software. FIG. 4 illustrates an output signal generated by the analyzing device in accordance with one embodiment. The output signal illustrated in FIG. 4 is a plot of the absorption characteristics of five wavelengths of radiation from a radiation source that has passed through a sample.

Figure 5:
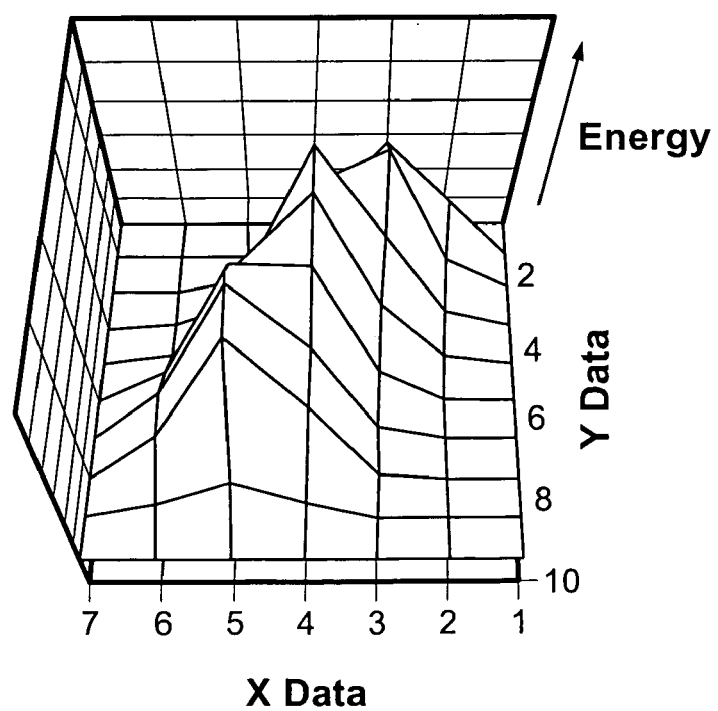
FIG. 5 is a graph illustrating an output signal of the imager when used for imaging purposes.
Figure 6:
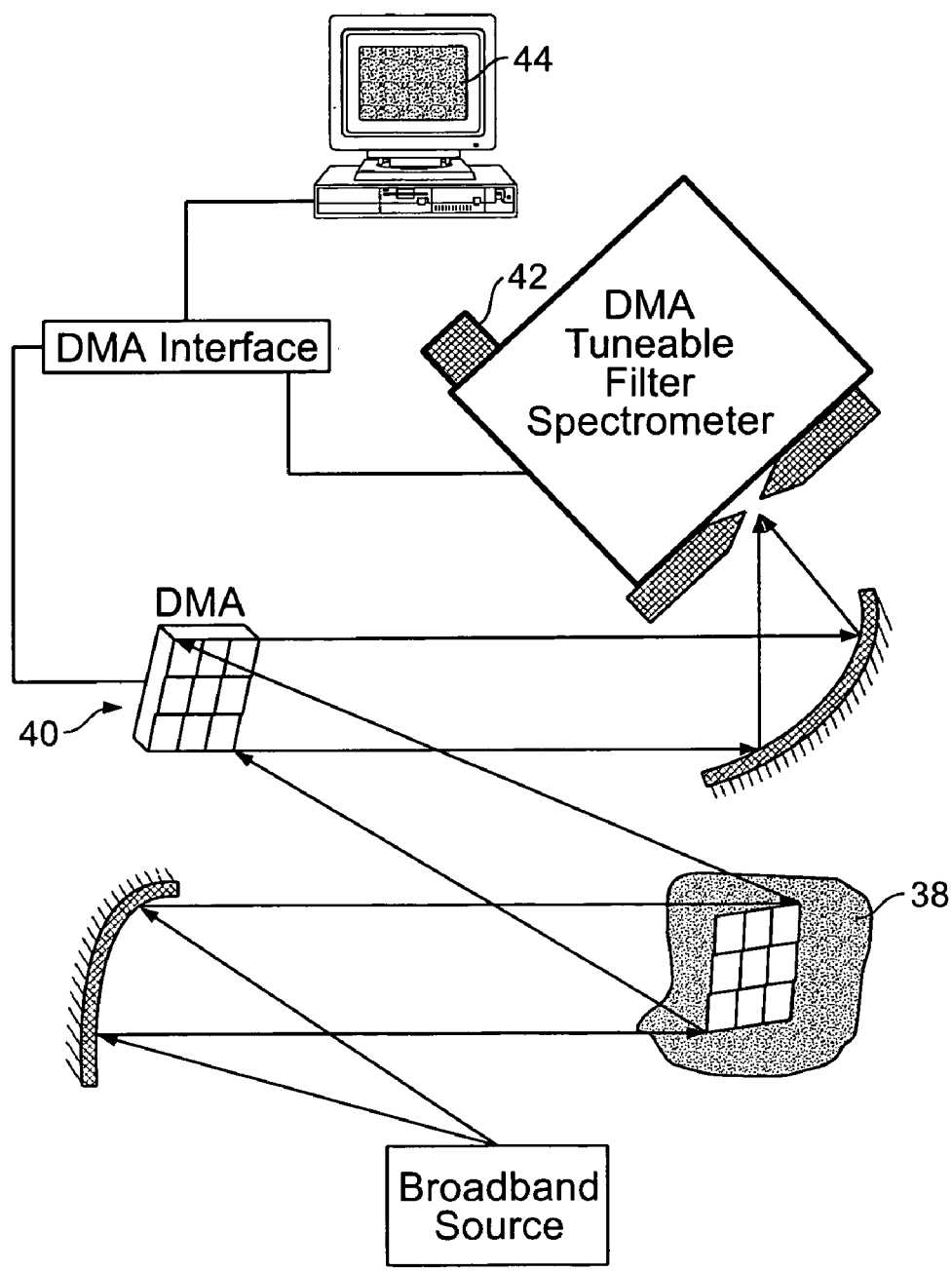
FIG. 6 is a schematic diagram illustrating an imager constructed in accordance with a preferred embodiment of the invention.
Figure 6A:
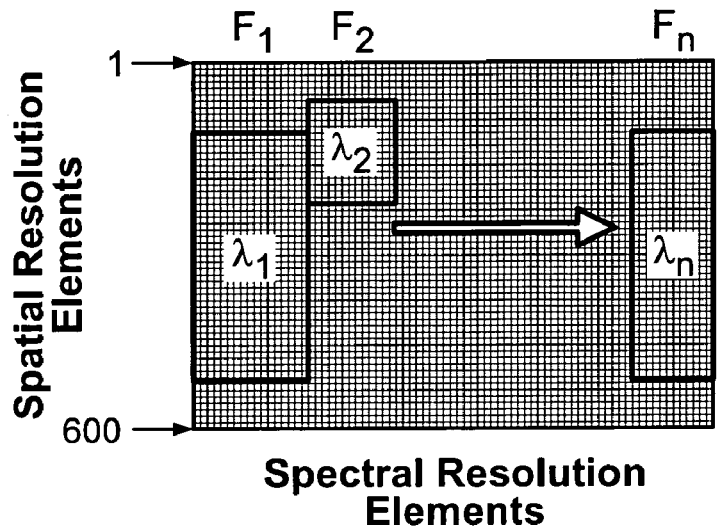
FIG. 6A illustrates spatio-spectral distribution of a DMA, where individual elements can be modulated.

In one embodiment of the system of this invention illustrated in FIG. 6, it is used for digital imaging purposes. In particular, when used as an imaging device, an image of a sample 38 is focused onto a micro-mirror array 40 and each micro-mirror in the array is modulated at a different modulation rate. The micro-mirror array geometry is such that some or all of the reflected radiation impinges upon a single detector element 42 and is subsequently demodulated to reconstruct the original image improving the signal-to-noise ratio of the imager. Specifically, an analyzing device 44 digitally processes the combined signal to analyze the magnitude of each individual pixel. FIG. 6A illustrates spatio-spectral distribution of the DMA, where individual elements can be modulated. FIG. 5 is a plot of a three dimensional image showing the magnitude of each individual pixel.

Figure 7:
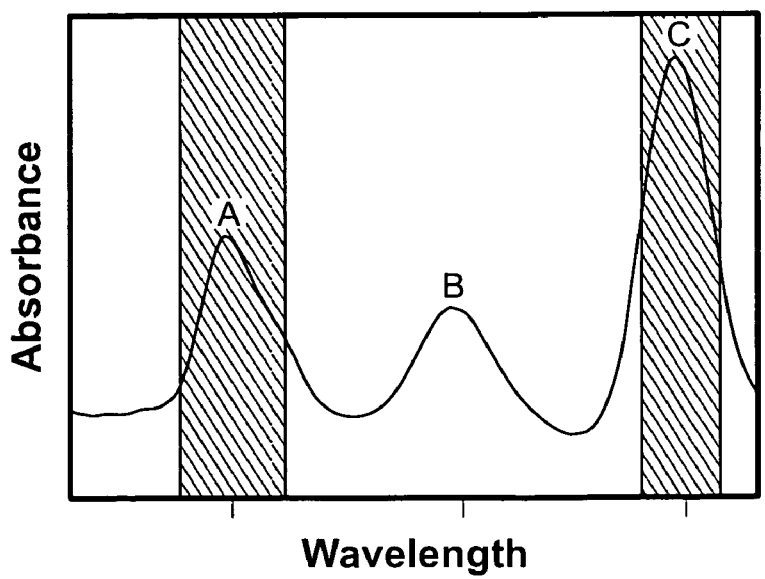
FIG. 7 is an illustration of the input to the DMA Filter Spectrometer and its use to pass or reject wavelengths of radiation specific to constituents in a sample.

FIG. 7 illustrates the output of a digital micro-mirror array (DMA) filter spectrometer used as a variable band pass filter spectrometer, variable band reject filter spectrometer, variable multiple band pass filter spectrometer or variable multiple band reject filter spectrometer. In this embodiment, the combined measurement of the electromagnetic energy absorbed by sample constituents A and C is of interest. The shaded regions in FIG. 7 illustrate the different regions of the electromagnetic spectrum that will be allowed to pass to the detector by the DMA filter spectrometer. The wavelengths of electromagnetic radiation selected to pass to the detector correspond to the absorption band for compound A and absorption band for compound C in a sample consisting of compounds A, B, and C. The spectral region corresponding to the absorption band of compound B and all other wavelengths of electromagnetic radiation are rejected. Those skilled in the art will appreciate that the DMA filter spectrometer is not limited to the above example and can be used to pass or reject any combination of spectral resolution elements available to the DMA. Various examples and modifications are considered in detail below.

As a DMA filter imager the spatial resolution elements (pixels) of an image can be selectively passed or rejected (filtered) according to the requirements of the image measurement. The advantages of both the DMA filter spectrometer and DMA filter imager are:

All spectral resolution elements or spatial resolution elements corresponding to the compounds of interest in a particular sample can be directed simultaneously to the detector for measurement. This has the effect of increasing the signal-to-noise ratio of the measurement.

The amount of data requiring processing is reduced. This reduces storage requirements and processing times.

Figure 8:
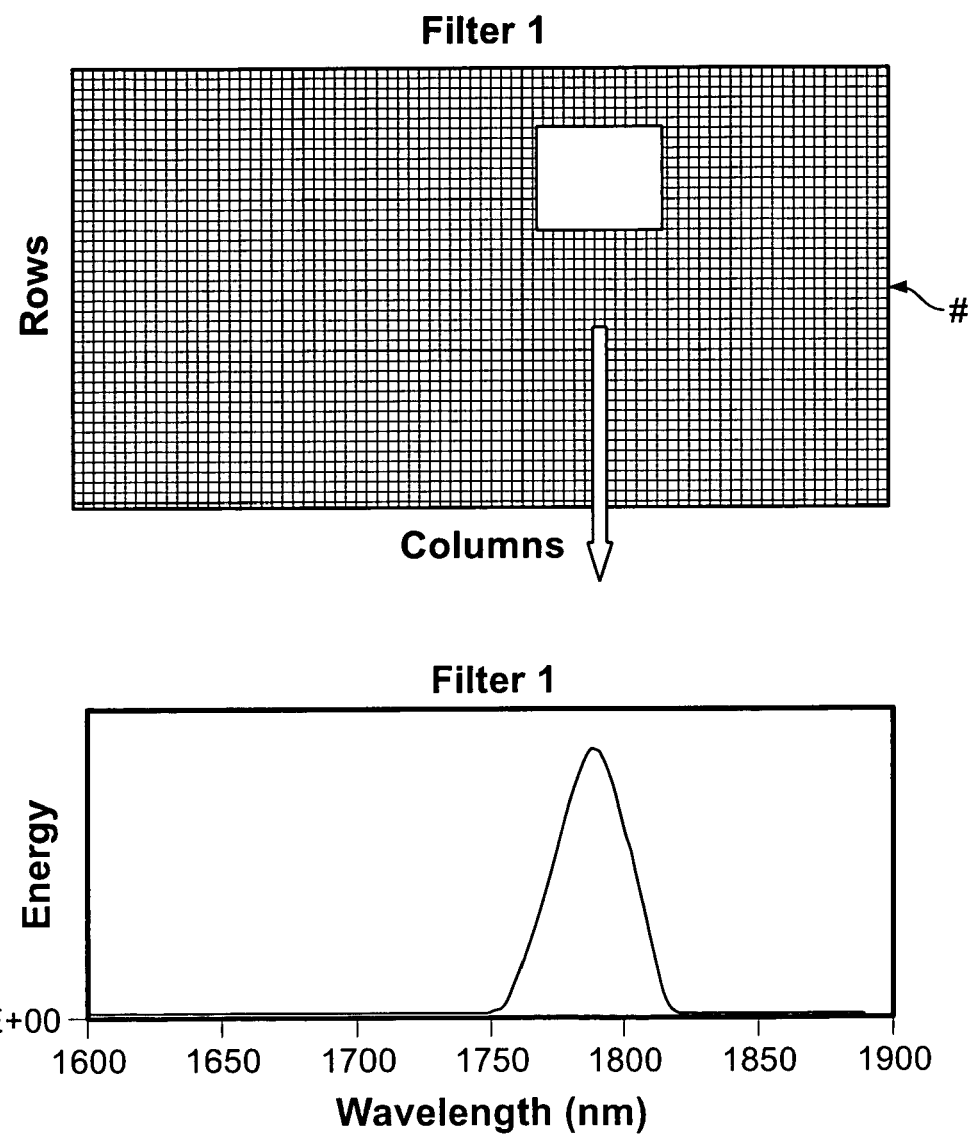
FIG. 8 illustrates the design of a band pass filter in accordance with the present invention (top portion) and the profile of the radiation passing through the filter (bottom portion)

As noted above, using a DMA one can provide one or more spectral band pass or band-reject filter(s) with a chosen relative intensity. In particular, in accordance with the present invention the radiation wavelengths that are reflected in the direction of the detector are selected by specific columns of micro-mirrors of the DMA, as illustrated in FIG. 8. The relative intensity of the above spectral band is controlled by the selection of specific area of micro-mirrors on the DMA, represented by the dark area designated "A" in FIG. 8. Thus, the dark area shown in FIG. 8 is the mirrors that direct specific wavelength radiation, i.e., spectral band, to the detector. Clearly, the "on" mirrors in the dark area create a band-pass filter, the characteristics of which are determined by the position of the "on" area in the DMA. The bottom portion of the figure illustrates the profile of the radiation reaching the detector.

FIG. 8 also demonstrates the selection of specific rows and columns of mirrors in the DMA used to create one spectral band filter with a single spectral mode. It should be apparent, however, that using the same technique of blocking areas in the DMA one can obtain a plurality of different specific spectral band filters, which can have multi-modal characteristics. The design of such filters is illustrated in FIG. 9.

As shown in FIG. 9, a multitude of different specific filters can be designed on one DMA using simple stacking. FIG. 9 illustrates the creation of several filters by selective reflection from specific micro-mirrors. In particular, the left side of the figure illustrates the creation of three different filters, designated 1, 2, and 3. This is accomplished by the selection of specific mirrors on the DMA, as described above with reference to FIG. 8. The total collection of spectral band filters is shown at the bottom-left of this figure. The spectral band provided by each filter is shown on the right-hand side of the figure. The bottom right portion illustrates the radiation passing through the combination of filters 1, 2 and 3.

The above discussion describes how the relative intensity of each spectral band can be a function of the DMA area used in the reflection. The following table illustrates the linear relationship between areas of the DMA occupied by individual filters, and the resulting filter. Clearly, if the entire DMA array is in the "on" position, there will be no filtering and in principle the input radiation passes through with no attenuation.

| FIG. 9, left side Reflected radiation from micro-mirrors | FIG. 9, right side Filter created |
|---|---|
| area A | 1 |
| area B | 2 |
| area C | 3 |
| areas a + b + c | 1 + 2 + 3 |

FIG. 10 illustrates the means for the intensity variation of a spectral filter built in accordance with this invention, and is summarized in the table below.

| | |
|---|---|
| Example A | Example B |
| Reflection from a DMA See FIGS. 8 and 9. Reflection areas 1, 2, and 3 create spectral filter 1, 2 and 3 respectively. area 1 = area 2 = area 3 | The intensity recorded at the detector for example A for the combination filter 1, 2, and 3, Intensity, I, $I_1 = I_2 = I_3$ |
| Example C | Example D |
| The reflection of area 2 of the DMA is increased. area 1 = area 3 < area 2 | The intensity recorded at the detector for filters 1, 2, and 3 is $I_1 \approx I < I_2$ |
| Example E | Example F |

-continued

| The reflection of area 2 of the DMA is decreased area 1 = area 3 > area 2 | The intensity recorded at the detector for filter 1, 2, and 3 is $I_1 \approx I_3 > I_2$ |

FIGS. 9 and 10 illustrate the ability to design spectral filters with different characteristics using a DMA. A point to keep in mind is that different spectral components of the radiation from the sample have been separated in space and can be filtered individually. The ability to process individual spectral components separately should be retained. To this end, in accordance with the present invention, spectral components are modulated.

The basic idea is to simply modulate the output from different filters differently, so one can identify and process them separately. In a preferred embodiment, different modulation is implemented by means of different modulation rates. Thus, with reference to FIG. 9, the output of filter 1 is modulated at rate $M_1$; output of filter 2 is modulated at rate $M_2$, and filter 3 is modulated using rate $M_3$, where $M_1 \neq M_2 \neq M_3$. In different embodiments, modulation can be achieved by assigning a different modulation encodement to each filter, with which it is modulated over time.

As a result, a system built in accordance with the present invention is capable of providing: a) Spectral bandwidth by selection of specific columns of micro-mirrors in an array; b) Spectral intensity by selection of rows of the array; and c) Spectral band identification by modulation.

FIGS. 11–14 illustrate alternative embodiments of a modulating spectrometer in accordance with this invention, where the DMA is replaced with different components. In particular, FIG. 11A and B show an embodiment in which the DMA is replaced with fixed elements, in this case concave mirrors. The idea is to use fixed spectral grating, which masks out spectrum block components that are not needed and passes those which are.

The idea here is that the broadly illuminated dispersive element distributes spectral resolution elements in one dimension so that in the orthogonal dimension one can collect light of the same wavelengths. With reference to FIG. 6A one can see that at a particular plane, herein called the focal plane, one has a wavelength axis(x or columns) and a spatial axis(y or rows). If one were to increase the number of spatial resolution elements (y) that are allowed to pass energy through the system and out of the exit aperture for any given wavelength (x), or spectral resolution element (x), this would have the effect of increasing the intensity of the particular spectral resolution elements' intensity at the detector.

Figure 11A:
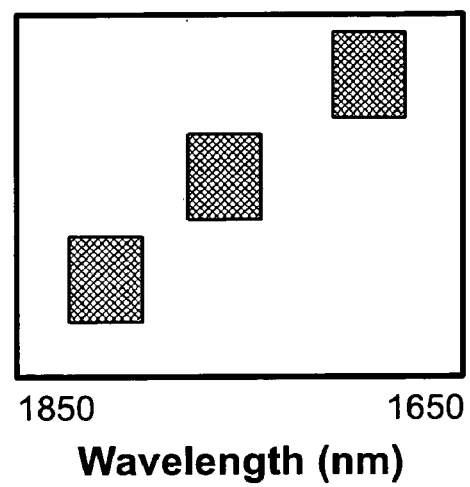
FIGS. 11A and 11B show embodiments in which the DMA is replaced with concave mirrors.
Figure 11B:
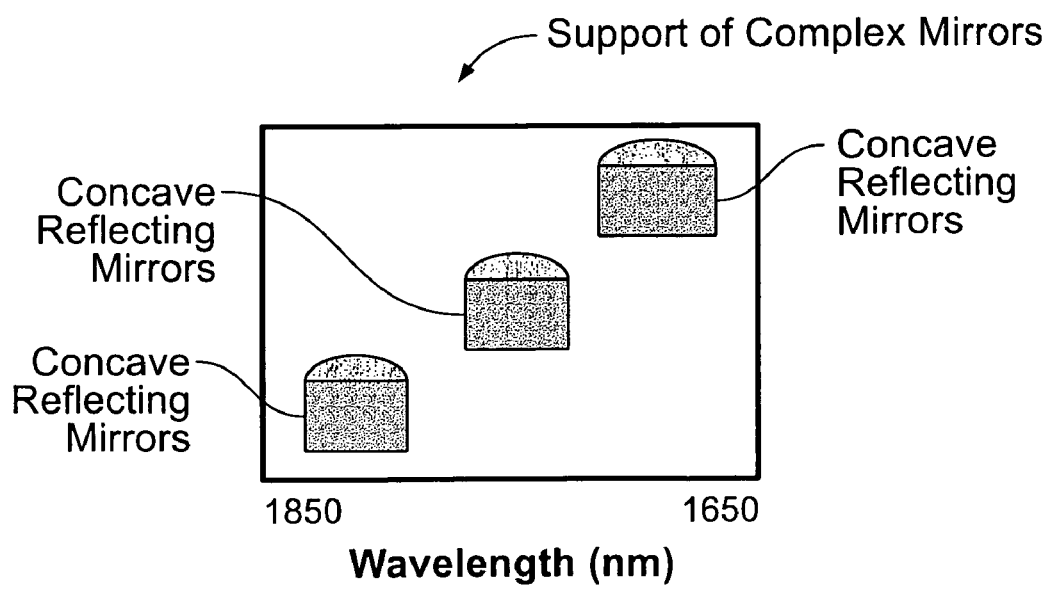

If the array of spatio/spectral resolution elements at the focal plane as shown in FIG. 6A is replaced with fixed elements, such as the concave mirrors in FIG. 11B, one can have a different device configured to perform a particular signal processing task—in this case pass the predetermined spectrum components at the desired intensity levels. FIG. 11A shows the spatio/spectral resolution elements at the focal plane to be used. The fixed optical elements are placed to interact with predetermined spatio/spectral resolution elements provided by the grating and entrance aperture geometry and to direct the specific assortment of spatio/spectral elements to specific spatial locations for modulation encoding (possibly using the barber pole arrangement, shown next).

Figure 12:
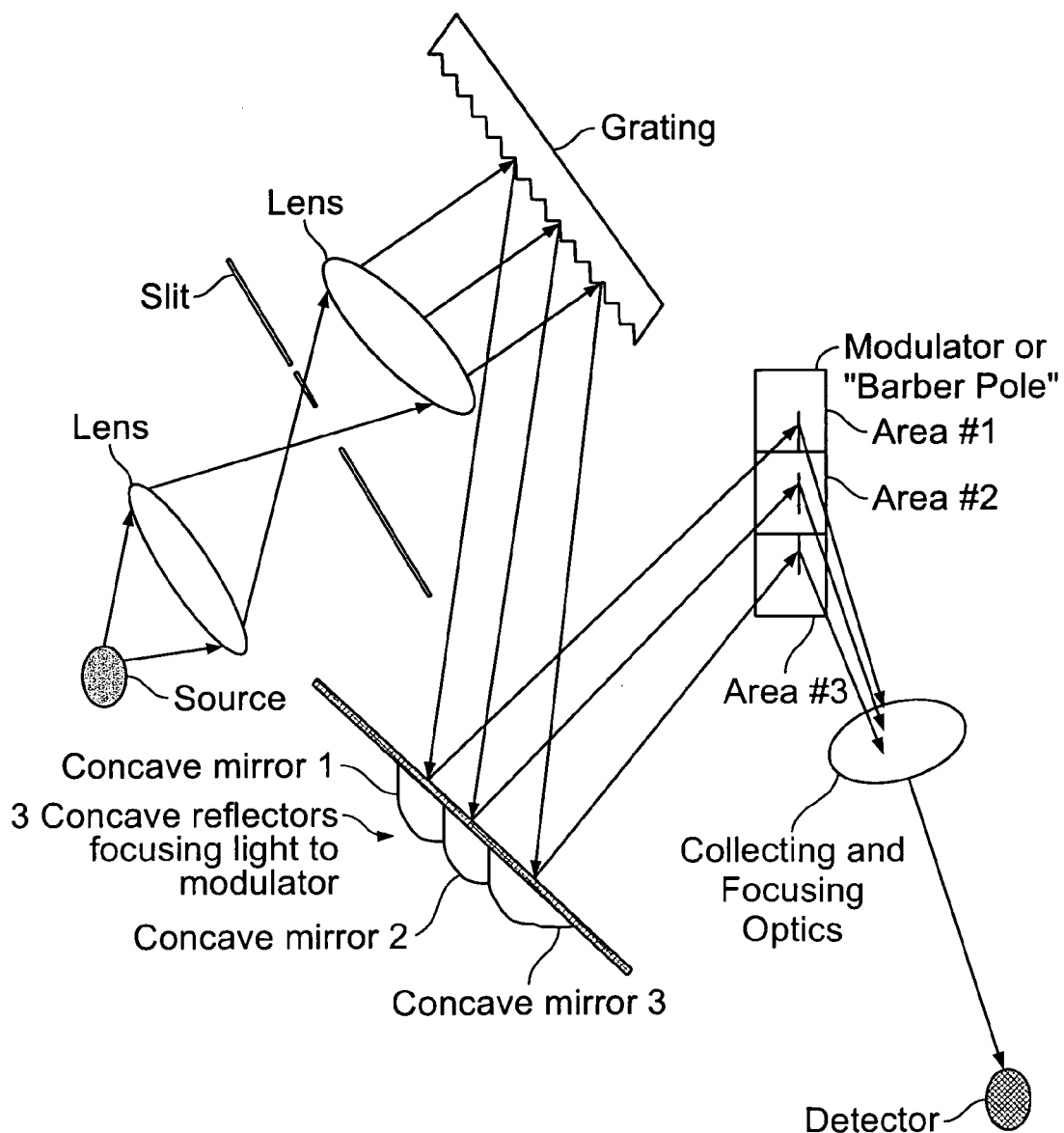

FIG. 12 illustrates an embodiment of a complete modulating spectrometer in which the DMA element is replaced by the concave mirrors of FIG. 11. FIG. 13 illustrates a modulating lens spectrometer using lenses instead of DMA, and a "barber pole" arrangement of mirrors to implement variable modulation. The "barber pole" modulation arrangement is illustrated in FIG. 14.

With reference to FIG. 14, modulation is accomplished by rotating this "barber pole" that has different number of mirrors mounted for reflecting light from the spatially separated spectral wavelengths. Thus, irradiating each vertical section will give the reflector its own distinguishable frequency. In accordance with this embodiment, light from the pole is collected and simultaneously sent to the detector. Thus, radiation from concave mirror 1 impinges upon the four-mirror modulator; concave mirror 2 radiation is modulated by the five-mirror modulator, and concave mirror 3 directs radiation to the six-mirror modulator. In the illustrated embodiment, the modulator rate is four, five, or six times per revolution of the "barber pole."

The operation of the device is clarified with reference to FIG. 12, tracing the radiation from the concave mirrors 12 to the detector of the system. In particular, concave mirror 1 reflects a selected spectral band with chosen intensity. This radiated wave impinges upon a modulator, implemented in this embodiment as a rotation barber pole. The modulating rates created by the barber pole in the exemplary embodiment shown in the figure are as shown in the table below.

| Area in Figure | Number of mirrors Per 360° rotation | Modulation Per 360° of barber pole |
|---|---|---|
| Area A | 4 | 4/360° |
| Area B | 5 | 5/360° |
| Area C | 6 | 6/360° |

Accordingly, this arrangement yields a modulation rate of 4/360° for the radiation from Area A, FIG. 12.

By a analogy, the mirrors of Areas B and C are modulated at the rate of 5/360° and 6/360°, respectively. As illustrated, all radiation from mirrors A, B, and C is simultaneously directed to the detector. This radiation is collected by either a simple mirror lens or a toroidal mirror, which focuses the radiation onto a single detector. The signal from the detector now goes to electronic processing and mathematical analyses for spectroscopic results.

In the discussion of modulating spectrometers, a single light source of electromagnetic radiation was described. There exist yet another possibility for a unique optical design—a modulating multi-light source spectrometer. FIGS. 15 and 16 illustrate an embodiment of this invention in which a light source 12 provides several modulated spectral bands, e.g., light emitting diodes (LED), or lasers (shown here in three different light sources). The radiation from these light sources impinges upon the sample 24. One possible illumination design is one in which light from a source, e.g., LED, passes through a multitude of filters, impinging upon the sample 24. The radiation from the sample is transmitted to a detector 20, illustrated as a black fiber. The signal from the detector is electronically processed to a quantitative and qualitative signal describing the sample chemical composition.

In this embodiment, a plurality of light sources is used at differed modulating rates. FIG. 15 and 16 illustrate the combination of several light sources in the spectrometer. The choice of several different spectral bands of electromagnetic radiation can be either light emitting diodes, LED, lasers, black body radiation and/or microwaves. Essentially the following modulation scheme can be used to identify the different light sources, in this example LED's of different spectral band wavelength.

| No. of Source | Spectral band Wavelength, rim | Modulation Rate |
|---|---|---|
| 1 | 1500–1700 | $m_1$ |
| 2 | 1600–1800 | $m_2$ |
| 3 | 1700–1900 | $m_3$ |
| . | . | . |
| . | . | . |

Note:
$m_1 \neq m_2 \neq m_3 \neq \ldots$

It should be noted that either the radiation will be scattered or transmitted by the sample 24. This scattered or transmitted radiation from the sample is collected by an optical fiber. This radiation from the sample is conducted to the detector. The signal from the detector is electronically processed to yield quantitative and qualitative information about the sample.

In a particular embodiment the radiation path consists of optical fibers. However, in accordance with alternate embodiments, mirrors and lenses could also constitute the optical path for a similar modulating multi-light source spectrometer.

The spectrometer described herein records spectral information about one unique area on a single detector. In a similar manner, the spectral characteristic of a multitude of areas in a sample can be recorded with a multitude of detectors in accordance with different embodiments of the invention. Such a multitude of detectors exists in an array detector. Array detectors are known in the art and include, for example Charge coupled devices (CCD), in the ultraviolet, and visible portions of the spectrum; InSb-array in near infrared; InGaAs-array in near infrared; Hg—Cd—Te-array in mid-infrared and other array detectors.

Array detectors can operate in the focal plane of the optics. Here each detector of the array detects and records the signal from a specific area, x,y. Practical Example B described herein on the gray-level camera provides a further illustration. Different aspects of the embodiments discussed herein are considered in more detail. As is understood by one skilled in the art, standard optical duality implies that each of the preceding configurations can be operated in reverse, exchanging the position of the source and the detector.

The postsample processing, i.e., signal processing performed after a sample had been irradiated, describes an aspect of the present invention. In accordance with another aspect of this invention, significant benefits can result from irradiating a sample with pre-processed radiation, in what is referred to as pre-sample processing. In accordance with an embodiment of the present invention, one or more light sources, capable of providing modulated temporal and/or spatial patterns of input radiation, should be used. These sources are referred to next as controllable source(s) of radiation, which in general are capable of generating arbitrary combinations of spectral radiation components within a predetermined spectrum range.

Several types of prior art devices are known that are capable of providing controllable radiation. Earlier prior art devices primarily relied upon various "masking" techniques, such as electronically alterable masks interposed in the optical pathway between a light source and a detector. More recent prior art devices use a combination of two or more light-emitting diodes (LEDs) as radiation sources. Examples are provided in U.S. Pat. Nos. 5,257,086 and 5,488,474, the content of which is hereby incorporated by reference for all purposes. As discussed in the above patents, an array of LEDs or light-emitting lasers is configured for activation using a particular encoding pattern, and can be used as a controllable light source. A disadvantage of this system is that it relies on an array of different LED elements, each operating in a different, relatively narrow spectrum band. In addition, there are technological problems associated with having an array of discrete radiation elements with different characteristics.

These and other problems associated with the prior art are addressed in accordance with the present invention using a device that in a specific embodiment can be thought of as the reverse of the setup illustrated in FIG. 1A. In particular, one or more broadband radiation sources illuminate the digital micro-mirror array (DMA) 18 and the modulations of the micro-mirrors in the DMA encode the source radiation prior to impinging upon the sample. The reflected radiation is then collected from the sample and directed onto a detector for further processing.

Figure 17:
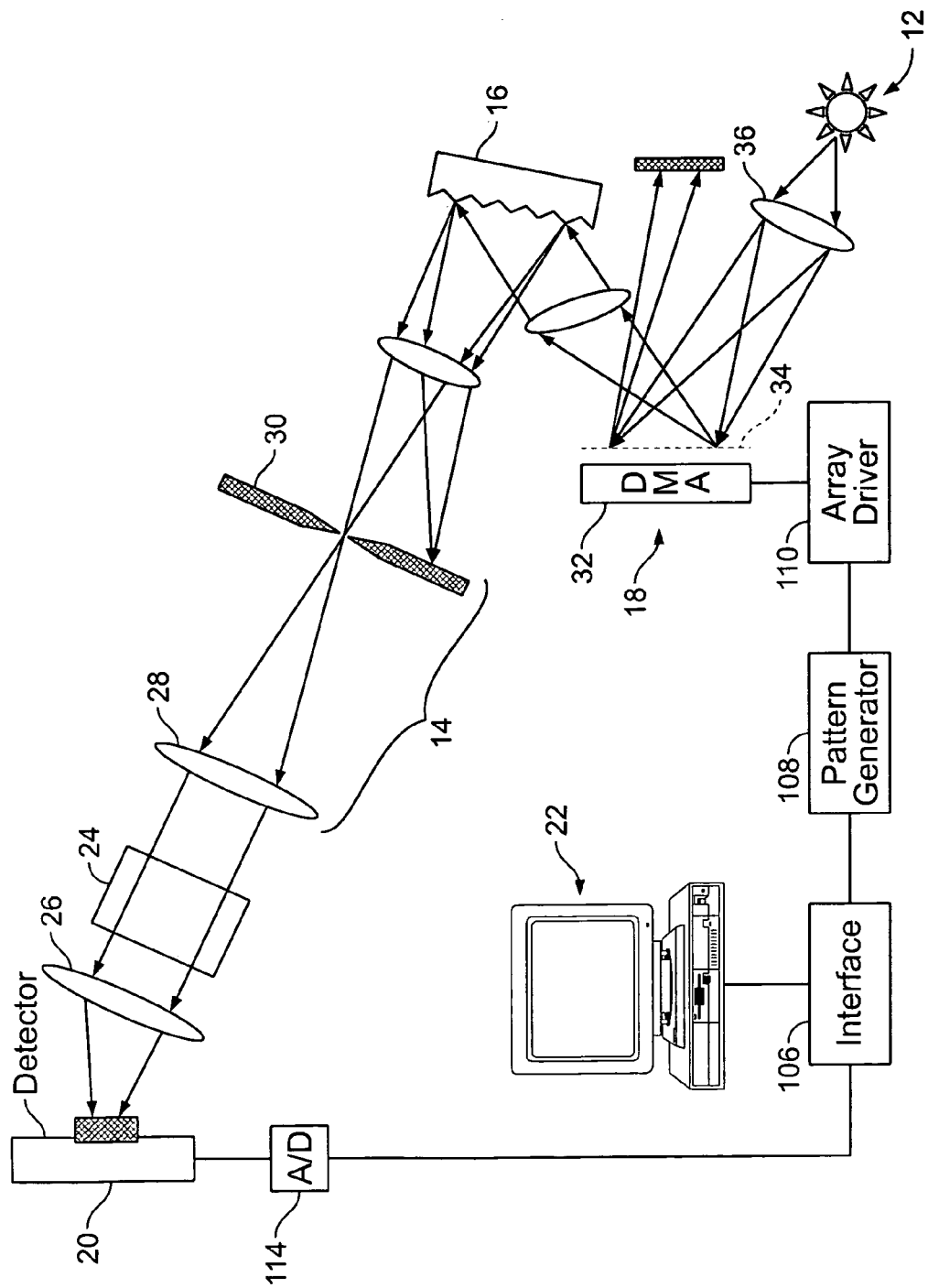
FIG. 17 illustrates in diagram form an apparatus using controllable radiation source.

FIG. 17 illustrates a schematic representation of an apparatus in accordance with the present invention using a controllable radiation source. Generally, the system includes a broadband radiation source 12, DMA 18, wavelength dispersion device 16, slit assembly 30, detector 20 and control assembly 22.

In particular, control assembly 22 can include a conventional personal computer 104, interface 106, pattern generator 108, DMA driver 110, and analog to digital (A/D) converter 114. Interface 106 operates as a protocol converter enabling communications between the computer 22 and devices 108–114.

Pattern generator 108 can include an EPROM memory device (not shown) which stores the various encoding patterns for array 18, such as the Hadamard encoding pattern discussed below. In response to control signals from computer 22, generator 108 delivers signals representative of successive patterns to driver 110. More particularly, generator 108 produces output signals to driver 110 indicating the activation pattern of the mirrors in the DMA 18. A/D converter 114 is conventional in nature and receives the voltage signals from detector 20, amplifies these signals as analog input to the converter in order to produce a digital output representative of the voltage signals.

Radiation source 12, grating 16, DMA 18 slit assembly 30 and detector 20 cooperatively define an optical pathway. Radiation from source 12 is passed through a wavelength dispersion device, which separates in space different spectrum bands. The desired radiation spectrum can them be shaped by DMA 18 using the filter arrangement outlined herein. In accordance with a preferred embodiment, radiation falling on a particular micro-mirror element can also be encoded with a modulation pattern applied to it. In a specific mode of operating the device, DMA 18 is activated to reflect radiation in a successive set of encoding patterns, such as Hadamard, Fourier, wavelet or others. The resultant set of spectral components is detected by detector 20, which provides corresponding output signals. Computer 22 then processes these signals.

Computer 22 initiates an analysis by prompting pattern generator 108 to activate the successive encoding patterns. With each pattern, a set of wavelength components are resolved by grating 16 and after reflection from the DMA 18 is directed onto detector 20. Along with the activation of encoding patterns, computer 22 also takes readings from A/D converter 114, by sampling data. These readings enable computer 22 to solve a conventional inverse transform, and thereby eliminate background noise from the readings for analysis.

In summary, the active light source in accordance with the present invention consists of one or more light sources, from which various spectral bands are selected for transmission, while being modulated with a temporal and/or spatial patterns. The resulting radiation is then directed at a region (or material) of interest to achieve a variety of desired tasks. A brief listing of these tasks include: (a) Very precise spectral coloring of a scene, for purposes of enhancement of display and photography; (b) Precise illumination spectrum to correspond to specific absorption lines of a compound that needs to be detected, (see FIGS. 40–44 on protein in wheat as an illustration) or for which it is desirable to have energy absorption and heating, without affecting neighboring compounds (This is the principle of the microwave oven for which the radiation is tuned to be absorbed by water molecules allowing for heating of moist food only); (c) The procedure in (b) could be used to imprint a specific spectral tag on ink or paint, for watermarking, tracking and forgery prevention, acting as a spectral bar code encryption; (d) The process of light curing to achieve selected chemical reactions is enabled by the tunable light source.

Various other applications are considered herein. Duality allows one to reverse or "turn inside out" any of the post-sample processing configurations described previously, to yield a pre-sample processing configuration. Essentially, in the former case one takes post sample light, separates wavelengths, encodes or modulates each, and detects the result. The dualized version for the latter case is to take source light, separates wavelengths, encode or modulate each, interact with a sample, and detect the result.

Various embodiments of systems for performing post- and pre-sample processing were discussed herein. In a specific embodiment, the central component of the system is a digital micro-mirror array (DMA), in which individual elements (micro-mirrors) can be controlled separately to either pass along or reject certain radiation components. By the use of appropriately selected modulation patterns, the DMA array can perform various signal processing tasks. In a accordance with a preferred embodiment of this invention, the functionality of the DMAs discussed above can be generalized using the concept of Spatial Light Modulators (SLMs), devices that broadly perform spatio-spectral encoding of individual radiation components, and of optical synapse processing units (OSPUs), basic processing blocks. This generalization is considered herein as well as the Hadamard processing, spatio-spectral tagging, data compression, feature extraction and other signal processing tasks.

In accordance with the present invention, one-dimensional (1D), two-dimensional (2D) or three-dimensional (3D) devices capable of acting as a light valve or array of light valves are referred to as spatial light modulators (SLMs). More broadly, an SLM in accordance with this invention is any device capable of controlling the magnitude, power, intensity or phase of radiation or which is otherwise capable of changing the direction of propagation of such radiation. This radiation can either have passed through, or be reflected or refracted from a material sample of interest. In a preferred embodiment, an SLM is an array of elements, each one capable of controlling radiation impinging upon it. Note that in accordance with this definition an SLM placed in appropriate position along the radiation path can control either spatial or spectral components of the impinging radiation, or both. Furthermore, "light" is used here in a broad sense to encompass any portion of the electromagnetic spectrum and not just the visible spectrum. Examples of SLM's in accordance with different embodiments of the invention include liquid crystal devices, actuated micro-mirrors, actuated mirror membranes, di-electric light modulators, switchable filters and optical routing devices, as used by the optical communication and computing environments and optical switches. In a specific embodiment, the use of a DMA as an example of spatial light modulating element is discussed herein. U.S. Pat. No. 5,037,173 provides examples of technology that can be used to implement SLM in accordance with this invention, and is hereby incorporated by reference.

In a preferred embodiment, a 1D, 2D, or 3D SLM is configured to receive any set of radiation components and functions to selectively pass these components to any number of receivers or image planes or collection optics, as the application can require, or to reject, reflect or absorb any input radiation component, so that either it is or is not received by one or more receivers, image planes or collection optics devices. It should be clear that while in the example discussed herein, the SLM is implemented as a DMA, virtually any array of switched elements can be used in accordance with the present invention.

Generally, an SLM in accordance with the invention is capable of receiving any number of radiation components, which are then encoded, tagged, identified, modulated or otherwise changed in terms of direction and/or magnitude to provide a unique encodement, tag, identifier or modulation sequence for each radiation component in the set of radiation components, so that subsequent optical receiver(s) or measuring device(s) have the ability to uniquely identify each of the input radiation components and its properties. In a relevant context, such properties include, but are not limited to, irradiance, wavelength, band of frequencies, intensity, power, phase and/or polarization. The tagging of individual radiation components can be accomplished using rate modulation. Thus, different spectral components of the input radiation that have been separated in space using a wavelength dispersion device are then individually encoded by modulating the micro-mirrors of the DMA array at different rates. The encoded radiation components are directed to a single detector, but nevertheless can be analyzed individually using Fourier analysis of the signal from the detector. Other examples for the use of "tagging" are discussed below.

In accordance with this invention, various processing modalities can be realized with an array of digitally controlled switches (an optical synapse), which function to process and transmit signals between different components of the system. In the context of the above description, the basic OSPU can be thought of as a data acquisition unit capable of scanning an array of data, such as an image, in various modes, including raster, Hadamard, multiscale wavelets, and others, and transmitting the scanned data for further processing. Thus, a synapse is a digitally controlled array of switches used to redirect image (or generally data) components or combinations of light streams, from one location to one or more other locations. In particular it can perform Hadamard processing, as defined below, on a plurality of radiation elements by combining subsets of the elements (i.e., binning) before conversion to digital data. A synapse can be used to modulate light streams by modulating temporally the switches to impose a temporal bar code (by varying in time the binning operation). This can be built in a preferred embodiment from a DMA, or any of a number of optical switching or routing components, used for example in optical communications applications.

Figure 18A:
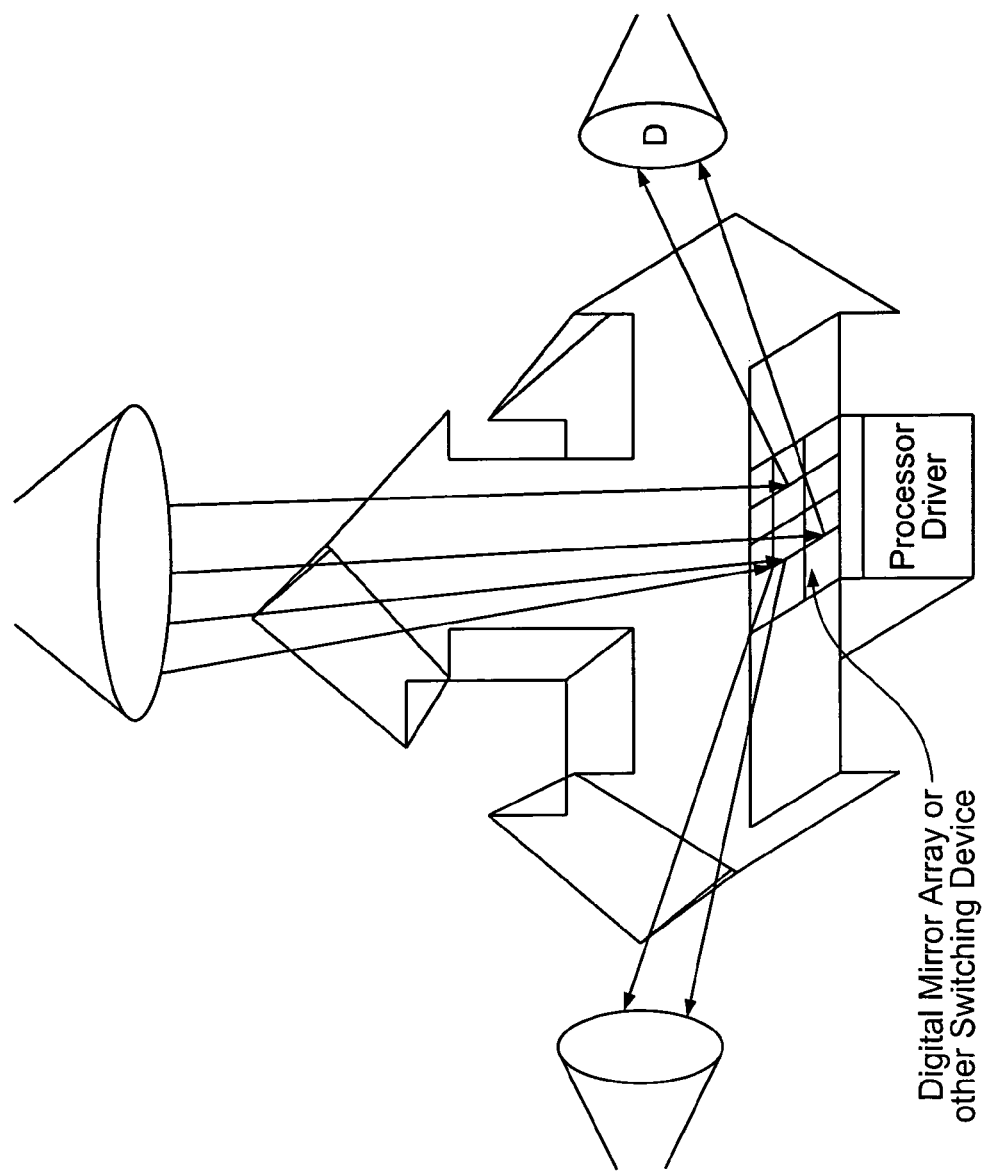

An OSPU unit in accordance with the present invention is shown in diagram form in FIG. 18A and 18B, as three-port device taking input from a radiation source S, and distributing it along any of two other paths, designated C (short for camera) and D (for detector). Different scanning modes of the OSPU are considered in more detail herein.

In the above disclosure and in one preferred embodiment of the invention an OSPU is implemented using a DMA, where individual elements of the array are controlled digitally to achieve a variety of processing tasks while collecting data. In accordance with the present invention, information bearing radiation sources could be, for example, a stream of photons, a photonic wavefront, a sound wave signal, an electrical signal, a signal propagating via an electric field or a magnetic field, a stream of particles, or a digital signal. Example of devices that can act as a synapse include spatial light modulators, such as LCDs, MEMS mirror arrays, or MEMS shutter arrays; optical switches; optical add-drop multiplexers; optical routers; and similar devices configured to modulate, switch or route signals. Clearly, DMAs and other optical routing devices, as used by the optical communication industry can be used to this end. It should be apparent that liquid crystal displays (LCD), charge coupled devices (CCD), CMOS logic, arrays of microphones, acoustic transducers, or antenna elements for electromagnetic radiation and other elements with similar functionality that will be developed in the future, can also be driven by similar Methods.

Applicants' contribution in this regard is in the novel process of performing pretransduction digital computing on analog data via adaptive binning means. Such novelty can be performed in a large number of ways. For example, one can implement adaptive current addition using a parallel/serial switch and wire networks in CMOS circuits. Further, in the acoustic processing domain, one or more microphones can be used in combination with an array of adjustable tilting sound reflectors (like a DMD for sound). In each case, one can "bin" data prior to transduction, in an adaptive way, and hence measure some desired computational result that would traditionally be obtained by gathering a "data cube" of data, and subsequently digitally processing the data. The shift of paradigm is clear: in the prior art traditionally analog signals are captured by a sensor, digitized, stored in a computer as a "data cube", and then processed. Considerable storage space and computational requirements are extended to do this processing. In accordance with the present invention, data from one or more sensors is processed directly in the analogue domain, the processed result is digitized and sent to a computer, where the desired processing result can be available directly, or following reduced set of processing operations.

In accordance with the present invention, the digitally controlled array is used as a hybrid computer, which through the digital control of the array elements performs (analog) computation of inner products or more generally of various correlations between data points reaching the elements of the array and prescribed patterns. The digital control at a given point (i.e., element) of the array can be achieved through a variety of different mechanisms, such as applying voltage differences between the row and column intersecting at the element; the modulation is achieved by addressing each row and column of the array by an appropriately modulated voltage pattern. For example, when using DMA, the mirrors are fluctuating between two tilted positions, and modulation is achieved through the mirror controls, as known in the art. The specifics of providing to the array element of signal(s) following a predetermined pattern will depend on the design implementation of the array and are not considered in further detail. Broadly, the OSPU array is processing raw data to extract desired information.

In accordance with the present invention, various assemblies of OSPU along with other components can be used to generalize the ideas presented above and enable new processing modalities. For example, FIG. 19 illustrates in block diagram form the design of a spectrograph using OSPU. As shown, the basic design brings reflected or transmitted radiation from a line in the sample or source onto a dispersing device 16, such as a grating or prism, onto the imaging fiber into the OSPU to encode and then forward to a detector 20.

FIG. 20 illustrates in a diagram form an embodiment of a tunable light source, which operates as the spectrograph in FIG. 19, but uses a broadband source. In this case, the switching elements of the OSPU array, for example the mirrors in a DMA, are set to provide a specified energy in each row of the mirror, which is sent to one of the outgoing imaging fiber bundles. This device can also function as a spectrograph through the other end, i.e., fiber bundle providing illumination, as well as spectroscopy.

Figure 21:
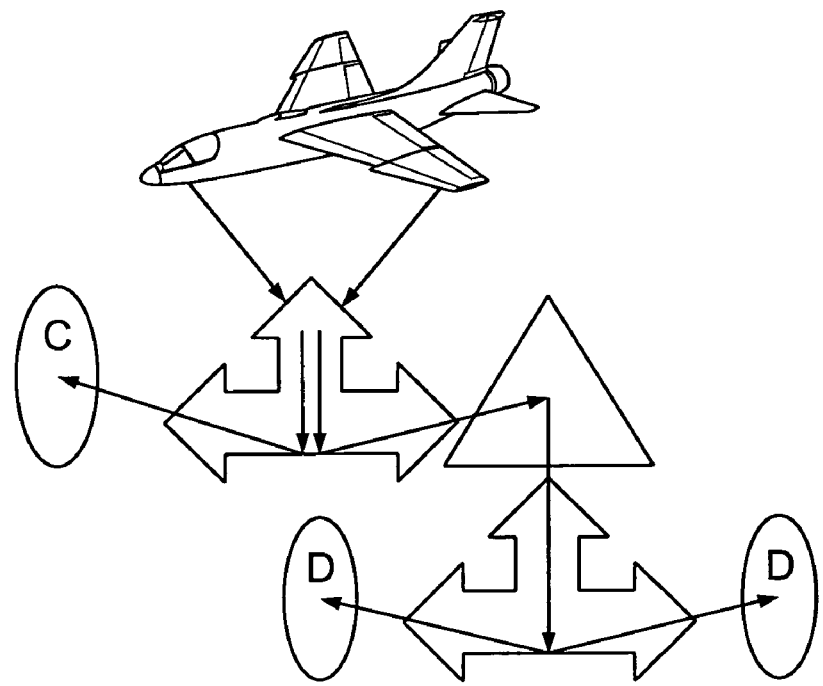
FIG. 21 illustrates in a diagram form an embodiment of the spectral imaging device, which is built using two OSPUs.
Figure 22:
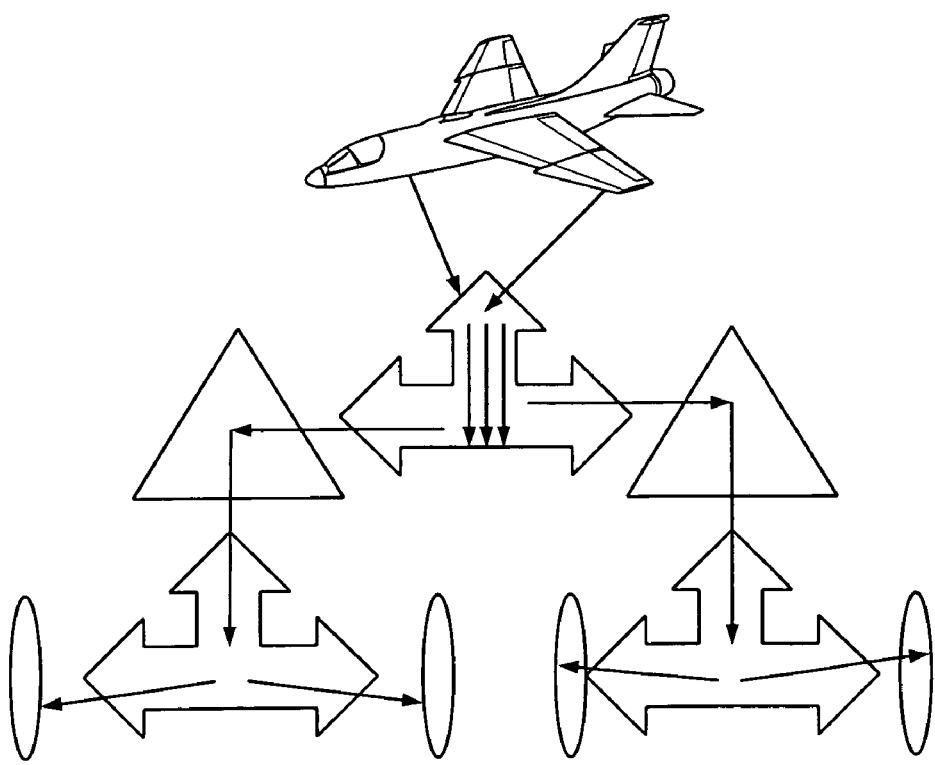
FIGS. 22 and 23 illustrate different devices built using OSPUs.
Figure 23:
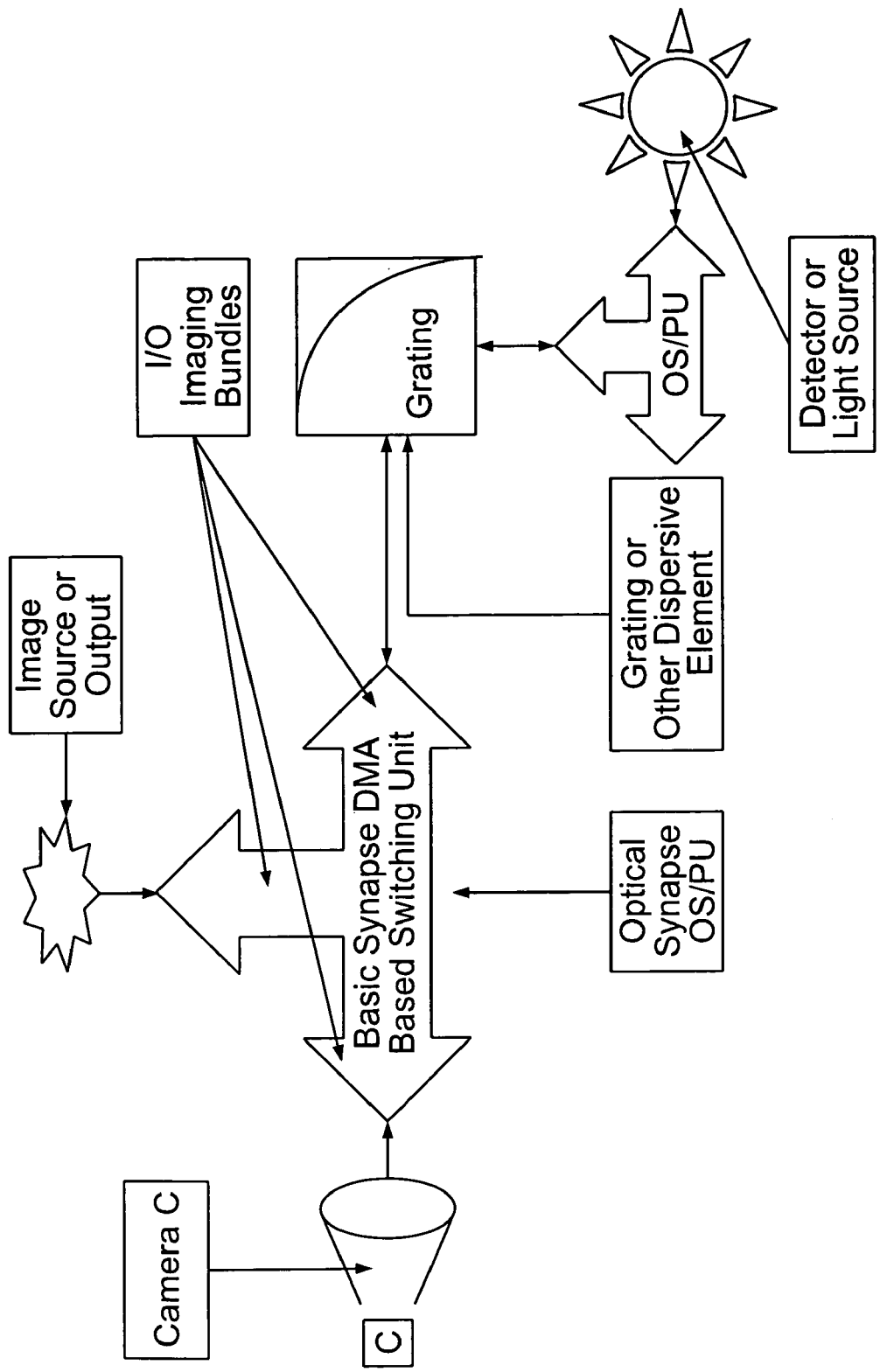

FIG. 21 illustrates in a diagram form an embodiment of the spectral imaging device discussed herein, which is built with two OSPUs. Different configurations of generalized processing devices are illustrated in FIG. 22, in which each side is imaging in a different spectral band, and FIG. 23, which illustrates the main components of a system for processing input radiation using an OSPU.

Figure 24:
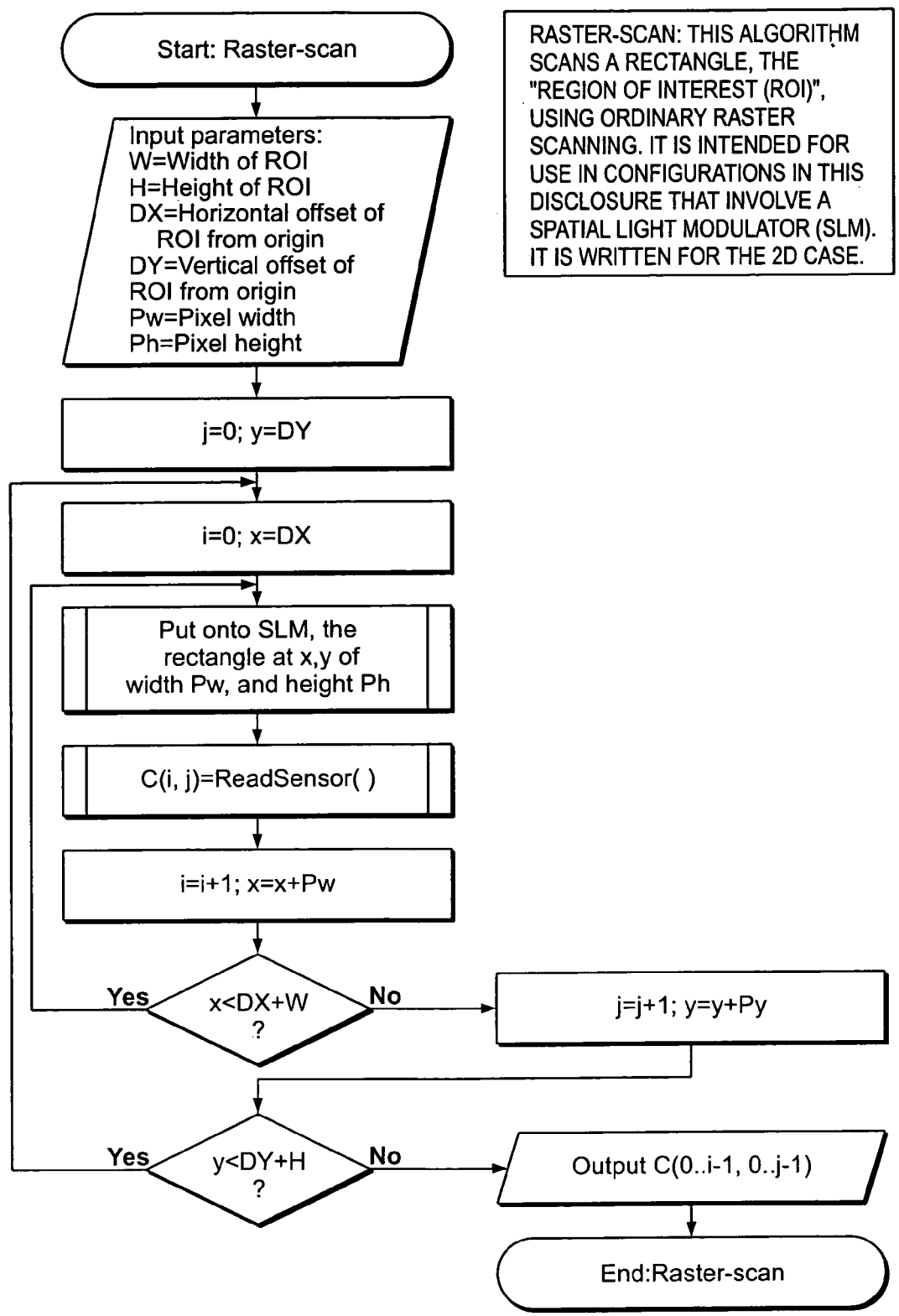
FIGS. 24–26 are flow charts of various scans used in accordance with the present invention. Specifically.
Figure 25:
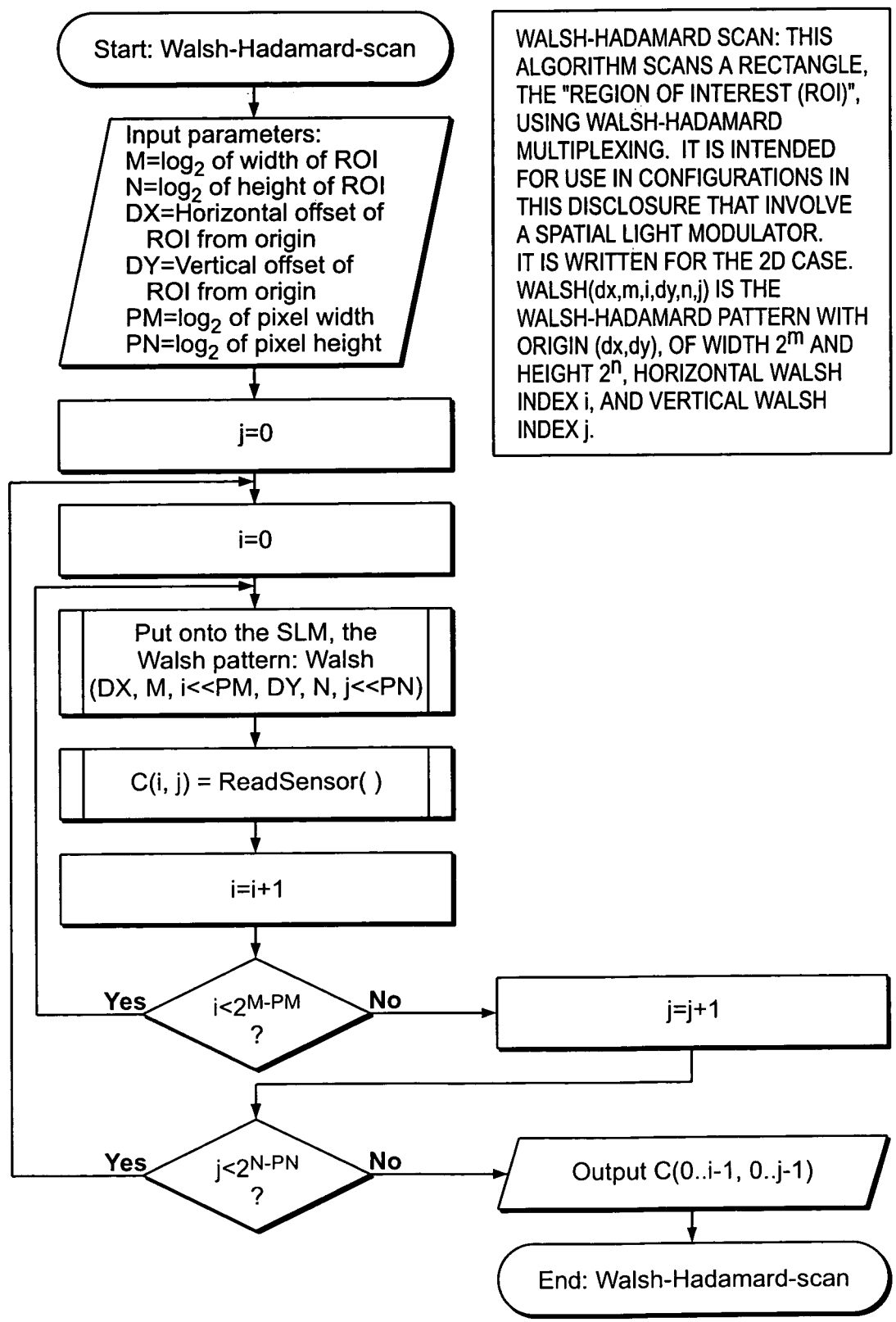
Figure 26:
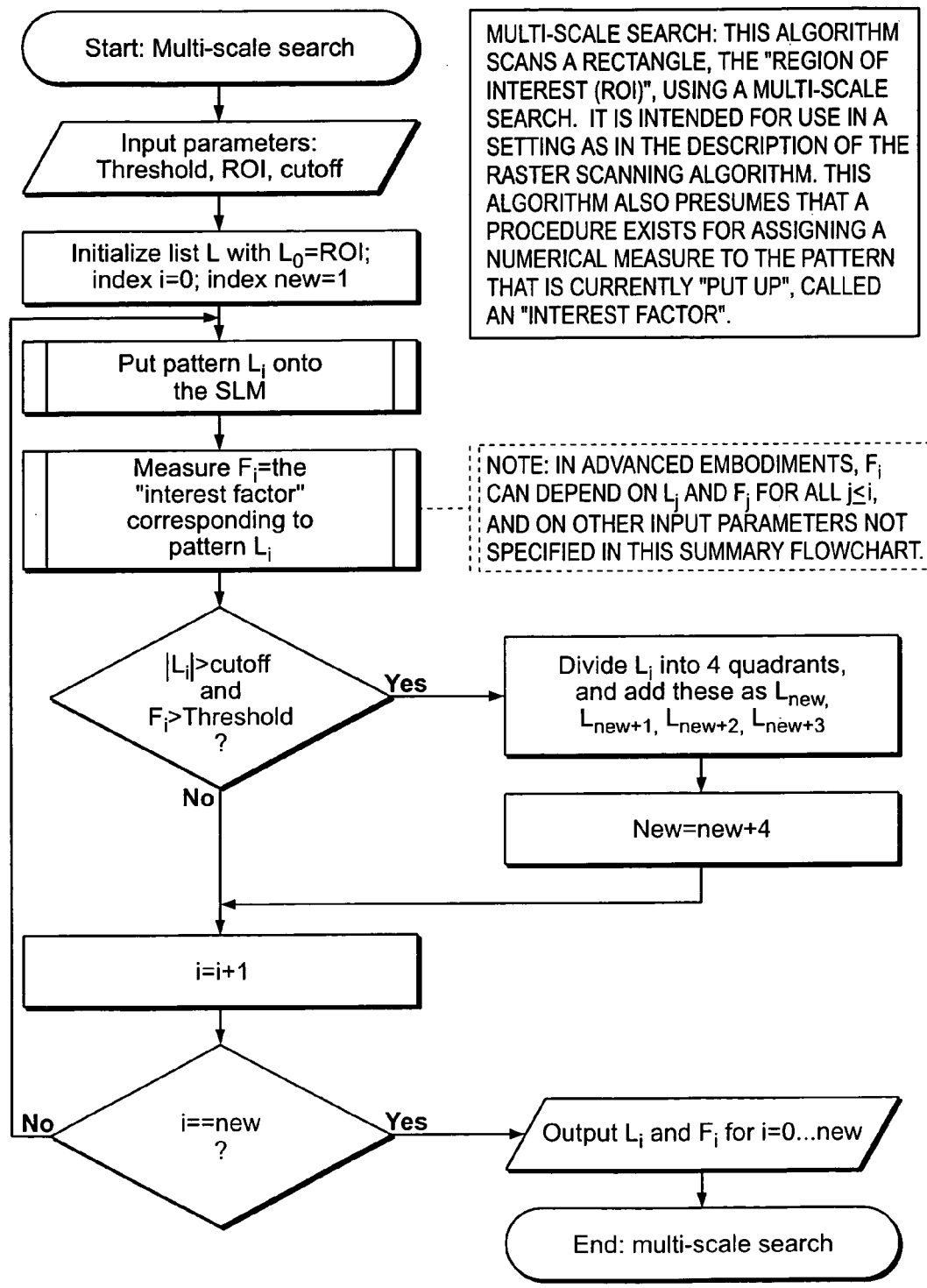

In accordance with the present invention, different scanning modes can be used in different applications, as illustrated in FIG. 24, FIG. 25 and FIG. 26. These algorithms are of use, for example, when one is using an OSPU in conjunction with a single sensor, and the OSPU is binning energy into that sensor, the binning being determined by the pattern that is put onto the SLM of the OSPU.

In particular, FIG. 24 is a flow chart of a raster-scan using in one embodiment of the present invention. This algorithm scans a rectangle, the "Region Of Interest (ROI)," using ordinary raster scanning. It is intended for use in configurations in this disclosure that involve a spatial light modulator (SLM). It is written for the 2D case, but the obvious modifications will extend the algorithm to other dimensions, or restrict to 1D.

FIG. 25 is a flowchart of a Walsh-Hadamard scan used in accordance with another embodiment of the invention. This algorithm scans a rectangle, the "Region Of Interest (ROI)", using Walsh-Hadamard multiplexing. Walsh(dx, m, i, dy, n, j) is the Walsh-Hadamard pattern with origin (dx, dy), of width $2^m$ and height $2^n$, horizontal Walsh index i, and vertical Walsh index j.

FIG. 26 is a flowchart of a multi-scale scan. This algorithm scans a rectangle, the "Region Of Interest (ROI)", using a multi-scale search. It is intended for use in a setting as in the description of the raster scanning algorithm. The algorithm also presumes that a procedure exists for assigning a numerical measure to the pattern that is currently on is called an "interest factor."

Figure 26A:
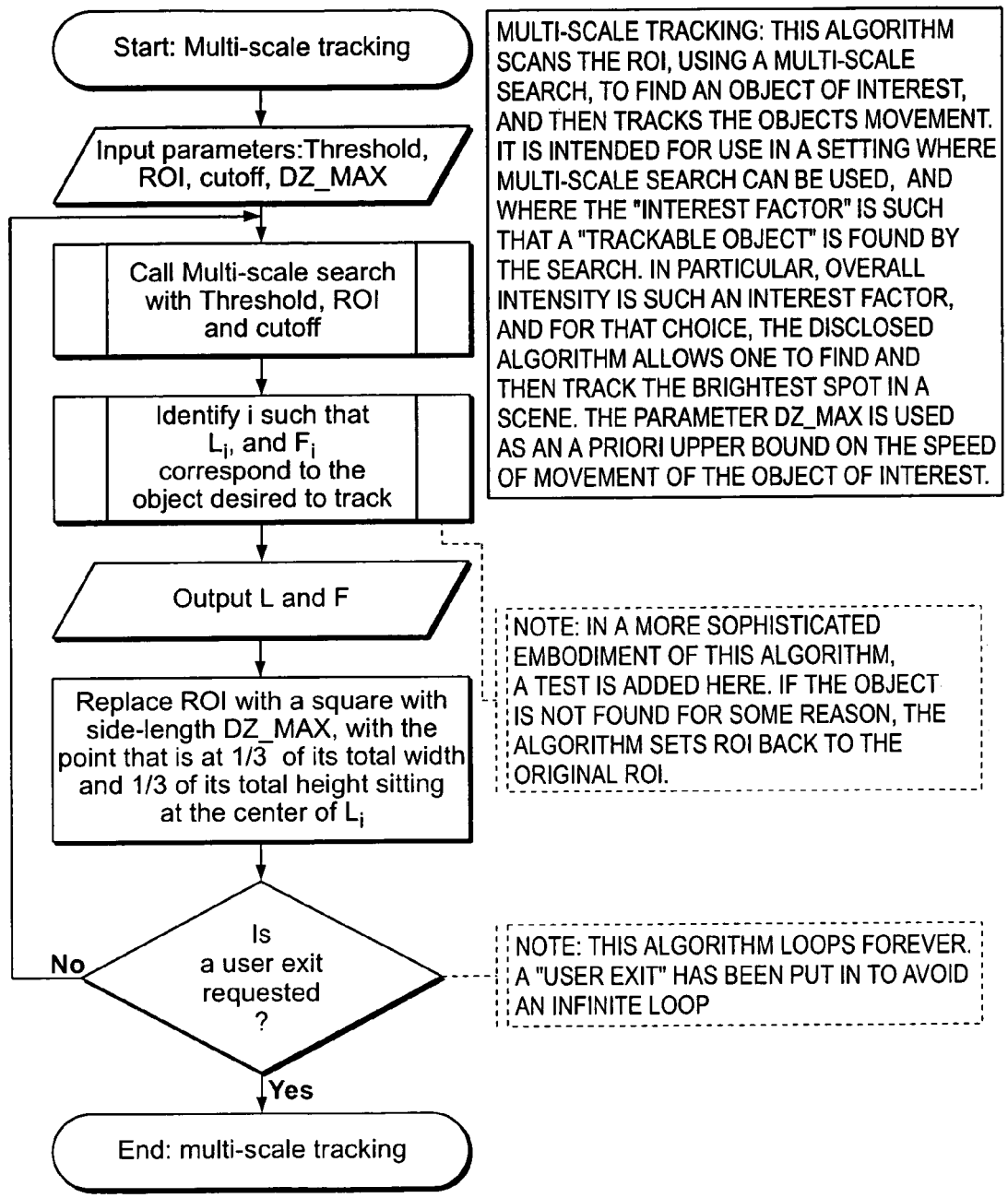
FIG. 26A illustrates a multi-scale tracking algorithm in a preferred embodiment of the present invention.

FIG. 26A illustrates a multi-scale tracking algorithm in a preferred embodiment of the present invention. The algorithm scans the region of interest, (using multi-scan search), to find an object of interest and then tracks the object's movement across the scene. It is intended for use in a setting where multi-scale search can be used, and where the "interest factor" is such that a trackable object can be found. Three examples of interest factors used in accordance with a preferred embodiment are given below, (when pattern $L_i$ is put onto the SLM, the sensor reads $C_i$ and we are defining the "interest factor" $F_i$). In the preceding scan algorithms a single sensor is assumed. Thus three examples
1. $F(L_i)=C_i$
2. $F(L_i)=C_i/\text{area}(L_i)$
3. $F(L_i)=C_i/C_k$, where $L_k$ is the rectangle that contains $L_i$, and that has N times the area of $L_i$, (for example, N=4), and which has already been scanned by the algorithm (there will always be exactly one such).

A modification of the algorithm is possible, where instead of putting up the pattern $L_i$, one can put up a set of a few highly oscillatory Walsh patterns fully supported on exactly $L_i$, and take the mean value of the sensor reading as $F_i$. This estimates the total variation within $L_i$ and will yield an algorithm that finds the edges within a scene. In different examples the sensor is a spectrometer. $F(L_i)$=distance between the spectrum read by the sensor, and the spectrum of a compound of interest. (distance could be, e.g., Euclidean distance of some other standard distance). This will cause the algorithm to zoom in on a substance of interest.

In another embodiment, $F(L_i)$=distance between the spectrum read by the sensor, and the spectrum already read for $L_k$, where $L_k$ is the rectangle that contains $L_i$, and that has N (N=4) times the area of $L_i$, and which has already been scanned by the algorithm (there will always be exactly one such). This will cause the algorithm to zoom in on edges between distinct substances.

In yet another embodiment, $F(L_i)$=distance between the spectrum read by the sensor, and the spectrum already read for $L_o$. This will cause the algorithm to zoom in on substances that are anomalous compared to the background.

In derived embodiments, $F(L_i)$ can depend on a priori data from spectral or spatiospectral libraries.

By defining the interest factor appropriately, one can thus cover a range of different applications. In a preferred embodiment, the interest factor definitions can be pre-stored so a user can analyze a set of data using different interest factors.

It is also clear that, in the case of Walsh functions, because of the multi-scale nature of the Walsh patterns, one can combine raster and Walsh-Hadamard scanning (raster scanning at large scales, and using Walsh-Hadamard to get extra signal to noise ratio at fine scales, where it is needed most). This allows one to operate within the linear range of the detector.

Also, one can used the combined raster/Walsh idea in variations of the Multi-scale search and tracking algorithms. For this, whenever one is studying the values of a sensor associated with the sub-rectangles of a bigger rectangle, one could use the Walsh patterns at the relevant scale, instead of scanning the pixels at that scale. This will provide for an improvement in SNR. One could again do this only at finer scales, to stay in the detectors linearity range.

Several signal processing tasks, such as filtering, signal enhancement, feature extraction, data compression and others can be implemented efficiently by using the basic ideas underlying the present invention. The concept is first illustrated in the context of one-dimensional arrays for Hadamard spectroscopy and is then extended to hyper-spectral imaging and various active illumination modes. The interested reader is directed to the book "Hadamard Transform Optics" by Martin Harwit, et al., published by Academic Press in 1979, which provides an excellent overview of the applied mathematical theory and the degree to which common optical components can be used in Hadamard spectroscopy and imaging applications.

Hadamard processing refers generally to analysis tools in which a signal is processed by correlating it with strings of 0 and 1 (or +/−1). Such processing does not require the signal to be converted from analogue to digital, but permits direct processing on the analogue data by means of an array of switches (synapse). In a preferred embodiment of the invention, an array of switches, such as a DMA, is used to provide spatio-spectral tags to different radiation components. In alternative embodiments it can also be used to impinge spatio/spectral signatures, which directly correlate to desired features.

A simple way to explain Hadamard spectroscopy is to consider the example of the weighing schemes for a chemical scale. Assume that we need to weigh eight objects, $x_1, x_2, \ldots, x_8$, on a scale. One could weigh each object separately in a process analogous to performing a raster scan, or balance two groups of four objects. Selecting the second approach, assuming that the first four objects are in one group, and the second four in a second group, balancing the two groups can be represented mathematically using the expression:

$$m = x_1+x_2+x_3+x_4-(x_5+x_6+x_7+x_8)=(x, w),$$

where x is a vector, the components of which correspond to the ordered objects $x_i$=(1, 1, 1, 1, −1, −1, −1, −1) and (x, w) designates the inner product of the two vectors. Various other combinations of object groups can be obtained and mathematically expressed as the inner product of the vector x and a vector of weights w, which has four +1 and four −1 elements.

For example, w=(1, −1, 1, 1, −1, −1, 1, −1) indicates that $x_1, x_3, x_4, x_7$ are on the left scale while $x_2, x_5, x_6, x_8$ are on the right. The inner product, or weight M=(x, w) is given by expression:

$$m=(x,w)=x_1-x_2+x_3+x_4-x_5-x_6+x_7-x_8.$$

It is well known that if one picks eight mutually orthogonal vectors w, which correspond, for example, to the eight Walsh patterns, one can recover the weight $x_i$ of each object via the orthogonal expansion method $$x=[(x, w_1)w_1+(x, w_2)w_2+\ldots+(x, w_8)w_8],$$

or in matrix notation $$[W]x=m;\ x=[W]^{-1}m$$

where [W] is the matrix of orthogonal vectors, m is the vector of measurements, and $[W]^{-1}$ is the inverse of matrix [W].

It is well known that the advantage of using the method is its higher-accuracy, more precisely if the error for weighing measurement is $\epsilon$, the expected error for the result calculated from the combined measurements is reduced by the square root of the number of samples. This result was proved by Hotteling to provide the best reduction possible for a given number of measurements.

Figure 27:
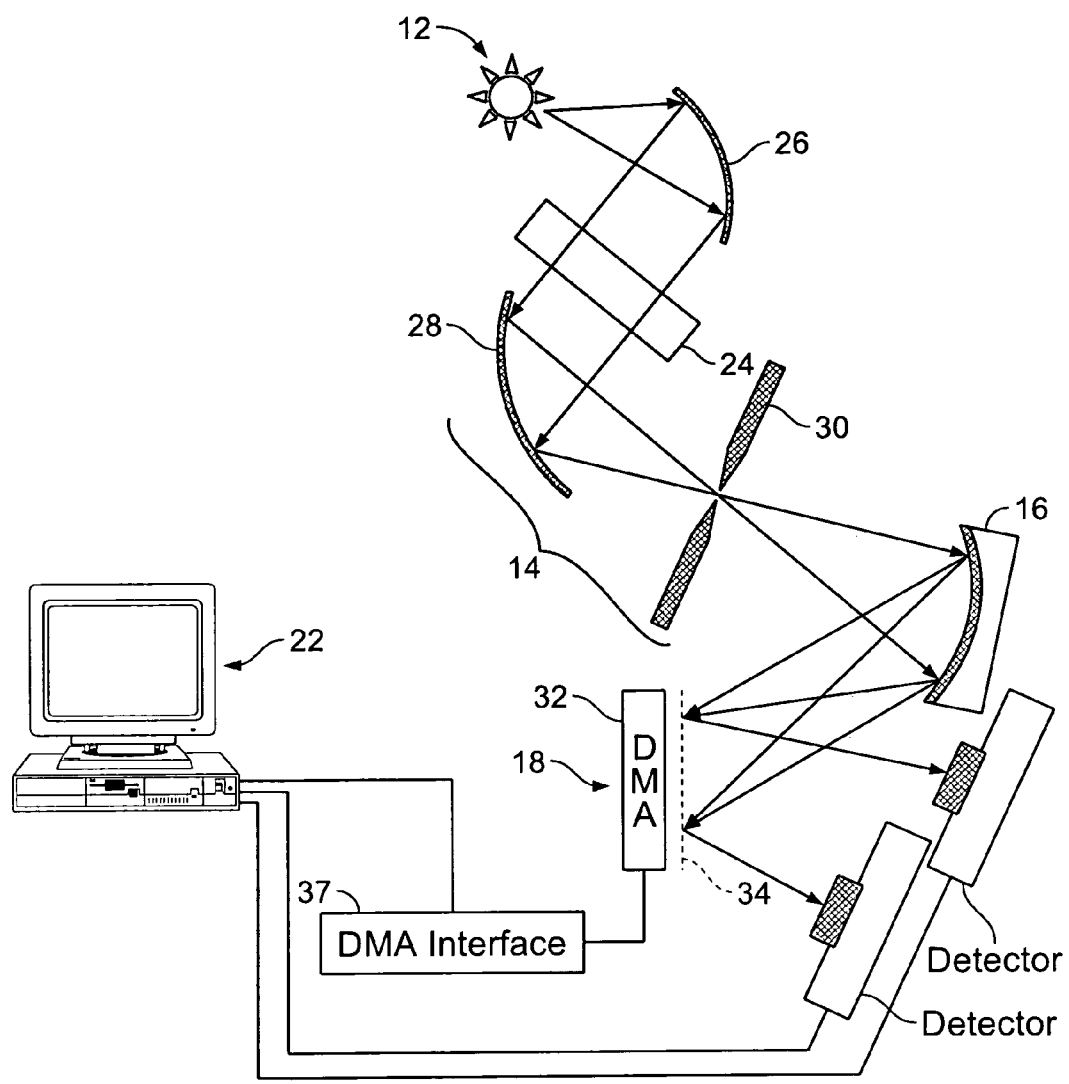
FIG. 27 is a block diagram of a spectrometer with two detectors.

In accordance with the present invention, this signal processing technique finds simple and effective practical application in spectroscopy, if we consider a spectrometer with two detectors (replacing the two arms of the scales). With reference to FIG. 27, the diffraction grating sends different spectral lines into an eight mirror array, which redistributes the energy to the 2 detectors in accordance with a given pattern of +1/−1 weights, i.e., $w_i$=(1, −1, 1, 1, −1, −1, 1, −1) Following the above analogy, the difference between the output values of the detectors corresponds to the inner product m=(x,$w_1$). If one is to redistribute the input spectrum energy to the 2 spectrometers using eight orthogonal vectors of weights, (following the pattern by alternating the mirror patterns to get eight orthogonal configurations), an accurate measurement of the source spectrum can be obtained. This processing method has certain advantages to the raster scan in which the detector measures one band at a time.

Clearly, for practical applications a precision requiring hundreds of bands can be required to obtain accurate chemical discrimination. However, it should be apparent that if once knows in advance which bands are needed to discriminate two compounds, the turning of the mirrors to only detect these bands could provide such discrimination with a single measurement.

Following is a description of a method for selecting efficient mirror settings to achieve discrimination using a minimum number of measurements. In matrix terminology, the task is to determine a minimum set of orthogonal vectors.

In accordance with the present invention, to this end one can use the Walsh-Hadamard Wavelet packets library. As known, these are rich collections of ±1, 0 patterns which will be used as elementary analysis patterns for discrimination. They are generated recursively as one follows: (a) first, double the size of the pattern w in two ways either as (w,w) or as (w,−w). It is clear that if various n patterns $w_i$ of length n are orthogonal, then the 2n patterns of length 2n are also orthogonal. This is the simplest way to generate Hadamard-Walsh matrices.

Figure 28:
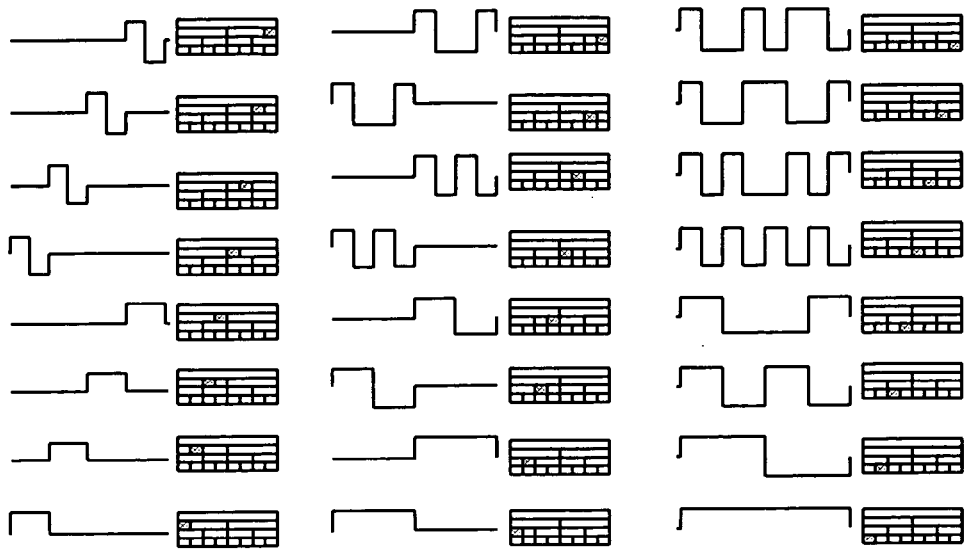
FIG. 28 illustrates a Walsh packet library of patterns for N=8.

The wavelet packet library consists of all sequences of length N having broken up in $2^m$ blocks, all except one are 0 and one block is filled with a Walsh pattern (of ±1) of length $2^l$ where l+m=n. As known, a Walsh packet is a localized Walsh string of ±1. FIG. 28 illustrates all 24 library elements for N=8.

A correlation of a vector x with a Walsh packet measures a variability of x at the location where the packet oscillates. The Walsh packet library is a simple and computationally efficient analytic tool allowing sophisticated discrimination with simple binary operations. It can be noted that in fact, it is precisely the analog of the windowed Fourier transform for binary arithmetic.

As an illustration, imagine two compounds A and B with subtle differences in their spectrum. The task is to discriminate among them in a noisy environment and design efficient mirror configurations for DMA spectroscope. In accordance with a preferred embodiment, the following procedure can be used:

(1) Collect samples for both A and B, the number of samples collected should be representative of the inherent variability of the measurements. A sample in this context is a full set x of the spectrum of the compound.

(2) Compute the inner product (x, w) for all samples X of A and (y, w) for all samples Y of B for each fixed Walsh product w.

Measure the discrimination power pw of the pattern w to distinguish between compound A and B. This could be done by comparing the distribution of the numbers {(x, w)} to the distribution of the numbers {(y, w)}, where the farther apart these distributions, the better they can be distinguished.

Select an orthogonal basis of patterns w maximizing the total discrimination power and order them in decreasing order.

Pick the top few patterns as an in put to a multidimensional discrimination method.

As an additional optional step in the above procedure, experiments can be run using data on which top few selected patterns failed, and repeat steps 3, 4 and 5.

Because of the recursive structure of the W-packet library, it is possible to achieve 2+3+4 in $N\log_2 N$ computations per sample vector of length N, i.e., essentially at the rate data collection. It should be noted that this procedure of basis selection for discrimination can also be used to enhance a variety of other signal processing tasks, such as data compression, empirical regression and prediction, adaptive filter design and others. It allows to define a simple orthogonal transform into more useful representations of the raw data. Further examples are considered below and illustrated herein, such as the wheat protein example.

The use of Hadamard processing was considered herein to provide simple, computationally efficient and robust signal processing. In accordance with the present invention, the concept of using multiple sensors and/or detectors can be generalized to what is known as hyper-spectral processing.

As known, current spectroscopic devices can be defined broadly into two categories—point spectroscopy and hyper-spectral imaging. Point spectroscopy in general involves a single sensor measuring the electromagnetic spectrum of a single sample (spatial point). This measurement is repeated to provide a point-by-point scan of a scene of interest. In contrast, hyper-spectral imaging generally uses an array of sensors and associated detectors. Each sensor corresponds to the pixel locations of an image and measures a multitude of spectral bands. The objective of this imaging is to obtain a sequence of images, one for each spectral band. At present, true hyper-spectral imaging devices, having the ability to collect and process the full combination of spectral and spatial data are not really practical as they require significant storage space and computational power.

Figure 29:
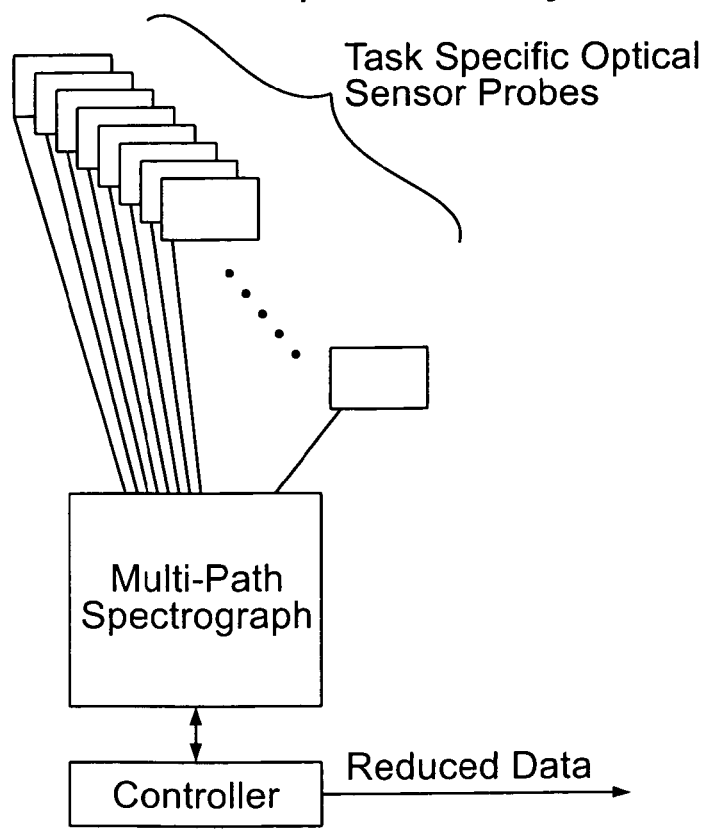
FIG. 29 is a generalized block diagram of hyperspectral processing in accordance with the invention.
Figure 30:
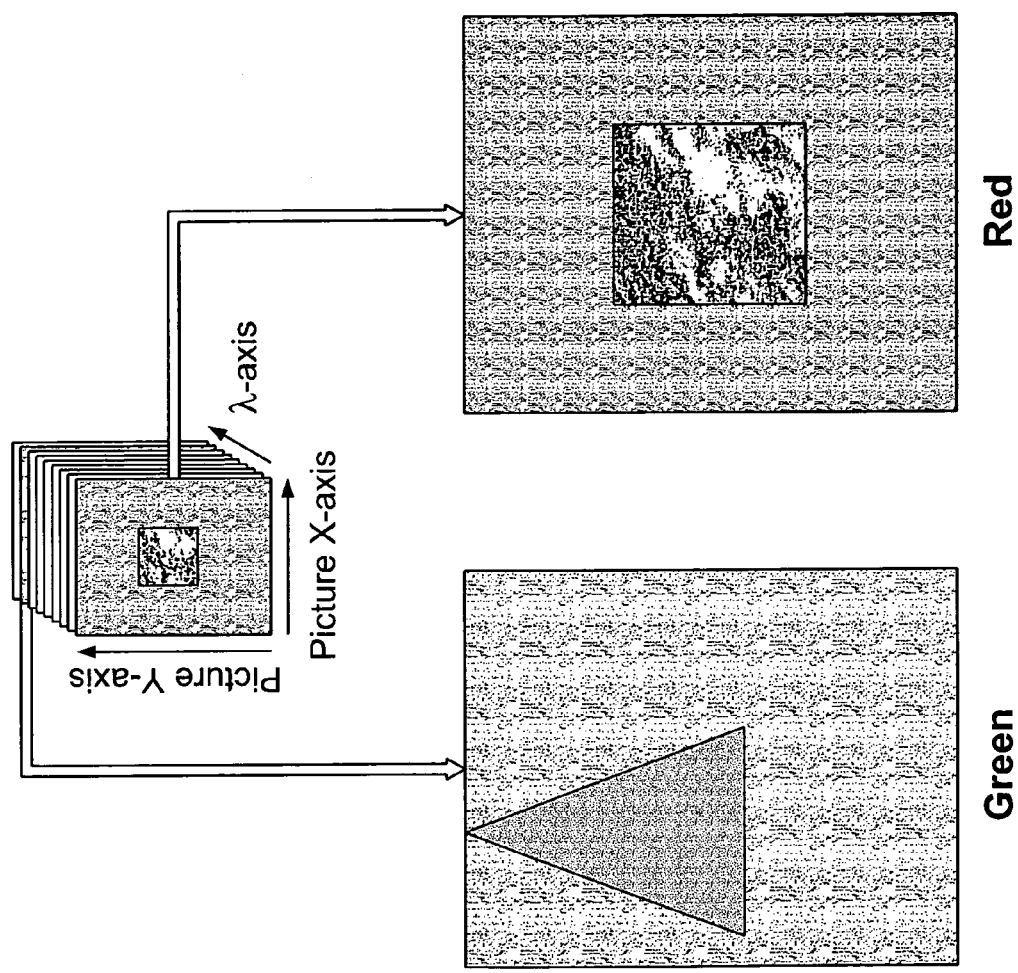
FIG. 30 illustrates the difference in two spectral components (red and green) of a data cube produced by imaging the same object in different spectral bands.
Figure 31A:
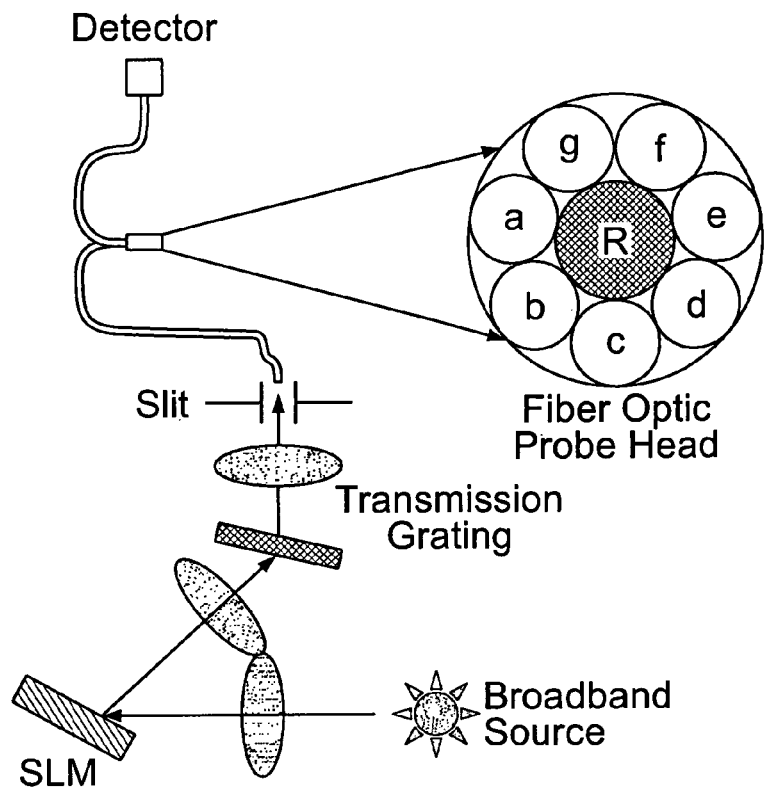
FIGS. 31A–E illustrate different embodiments of an imaging spectrograph used in accordance with this invention in de-dispersive mode.
Figure 31B:
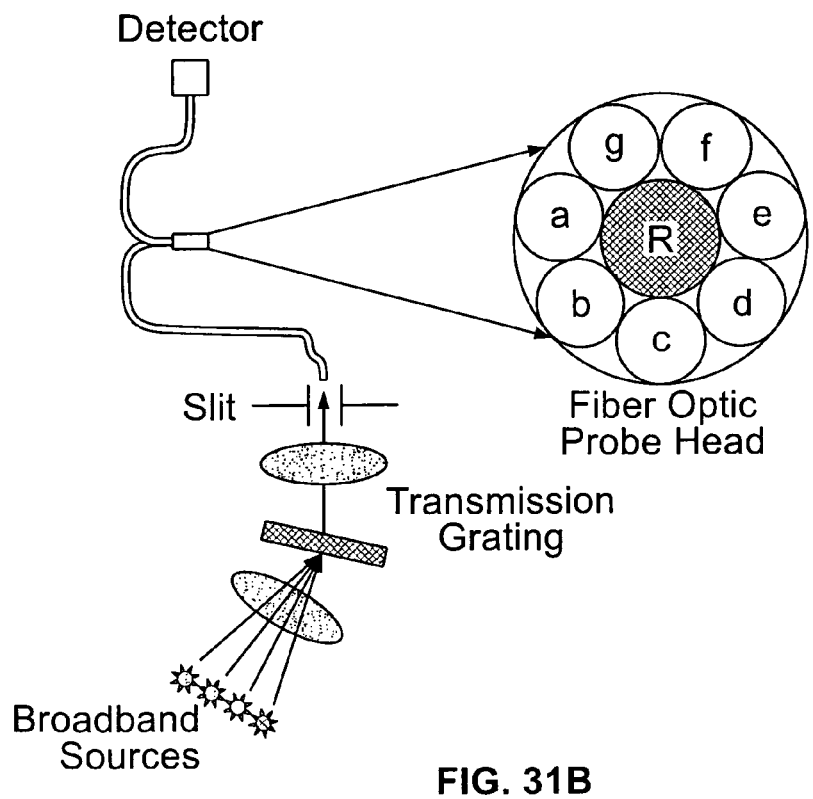
Figure 31C:
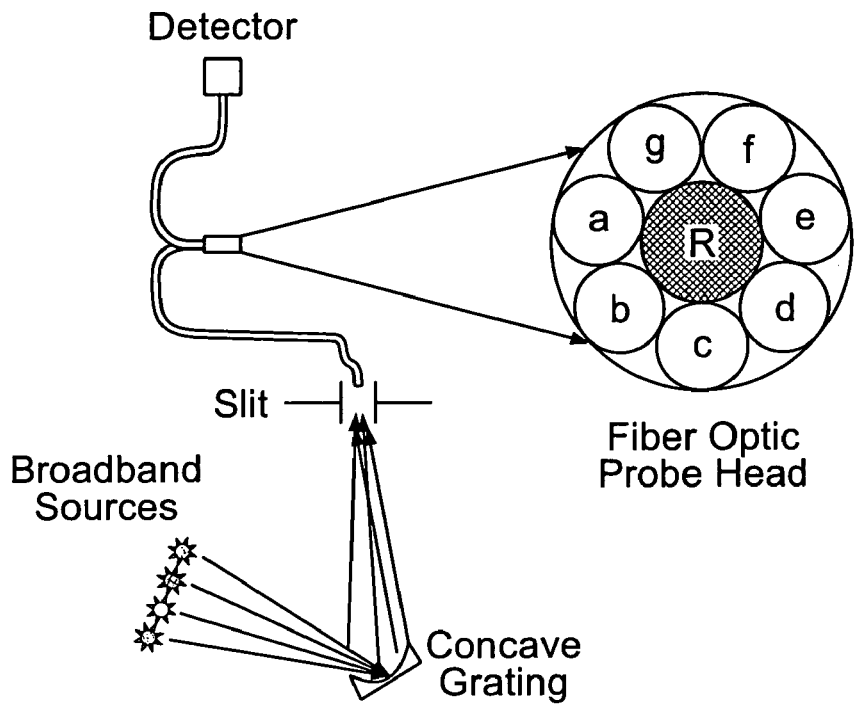
Figure 31D:
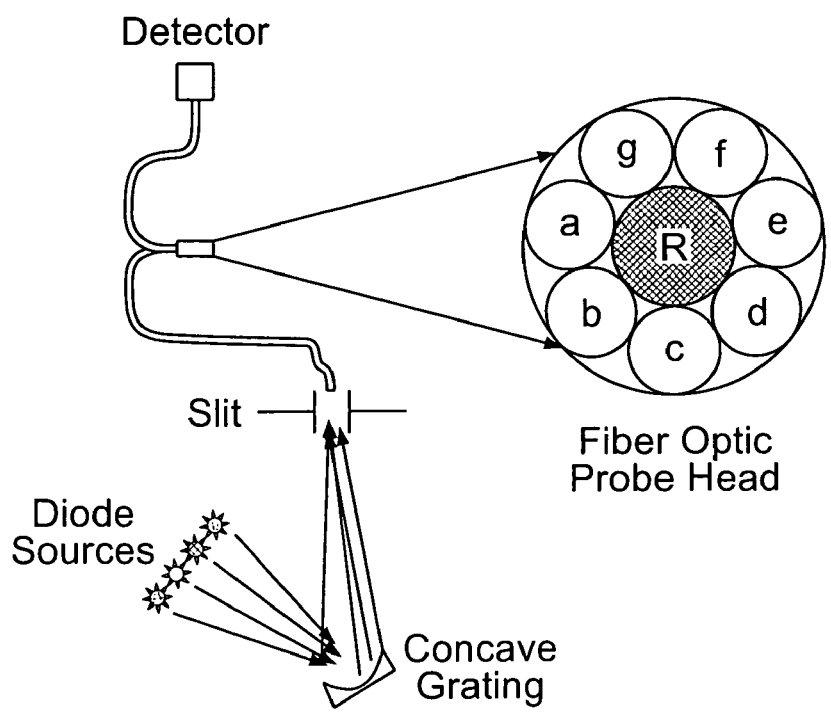
Figure 31E:
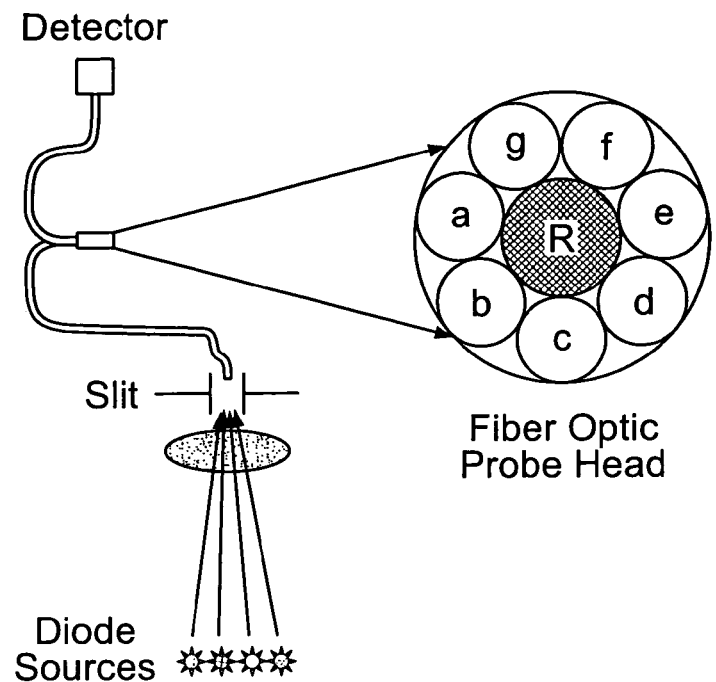

In accordance with the present invention, significant improvement over the prior art can be achieved using hyper-spectral processing that focuses of predefined characteristics of the data. For example, in many cases only a few particular spectral lines or bands out of the whole data space are required to discriminate one substance over another. It is also often the case that target samples do not possess very strong or sharp spectral lines, so it can not be necessary to use strong or sharp bands in the detection process. A selection of relatively broad bands can be sufficient to discriminate between the target object and the background. It should be apparent that the ease with which different spatio-spectral bands can be selected and processed in accordance with the present invention is ideally suited for such hyperspectral applications. A generalized block diagram of hyper-spectral processing in accordance with the invention is shown in FIG. 29. FIG. 30 illustrates two spectral components (red and green) of a data cube produced by imaging the same object in different spectral bands. It is quite clear that different images contain completely different kinds of information about the object.

FIGS. 31A–E illustrate different embodiments of an imaging spectrograph in de-dispersive mode, that can be used in accordance with this invention for hyper-spectral imaging in the UV, visual, near infrared and infrared portions of the spectrum. For illustration purposes, the figures show a fiber optic probe head with a fixed number of optical fibers. As shown, the fiber optic is placed at an exit slit. It will be apparent that a multitude of fiber optic elements and detectors can be used in alternate embodiments.

Figure 32:
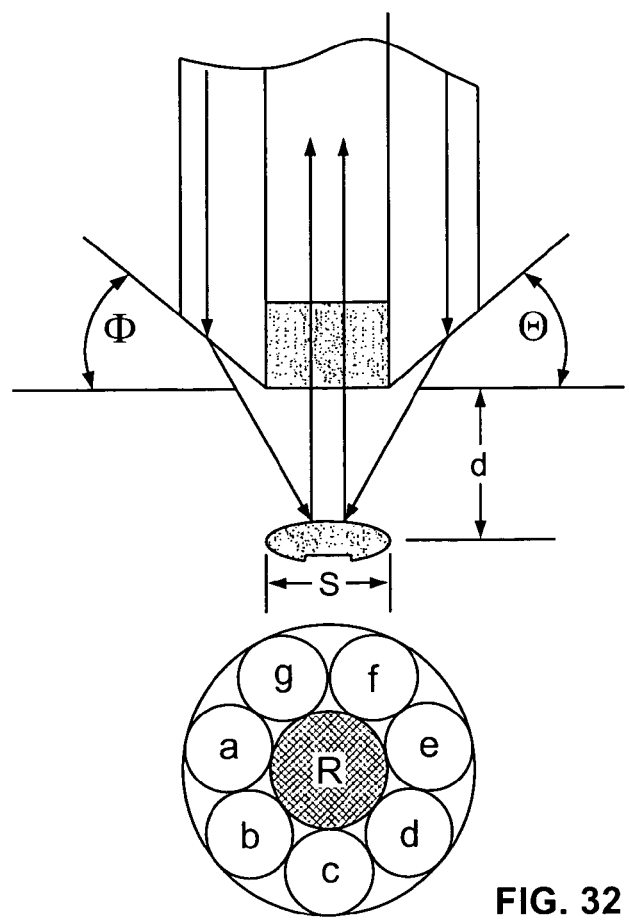
FIG. 32 shows an axial and a cross-sectional views of a fiber optic assembly.

FIG. 32 shows an axial and cross-sectional view of the fiber optic assembly illustrated in FIGS. 31A–E.

Figure 33:
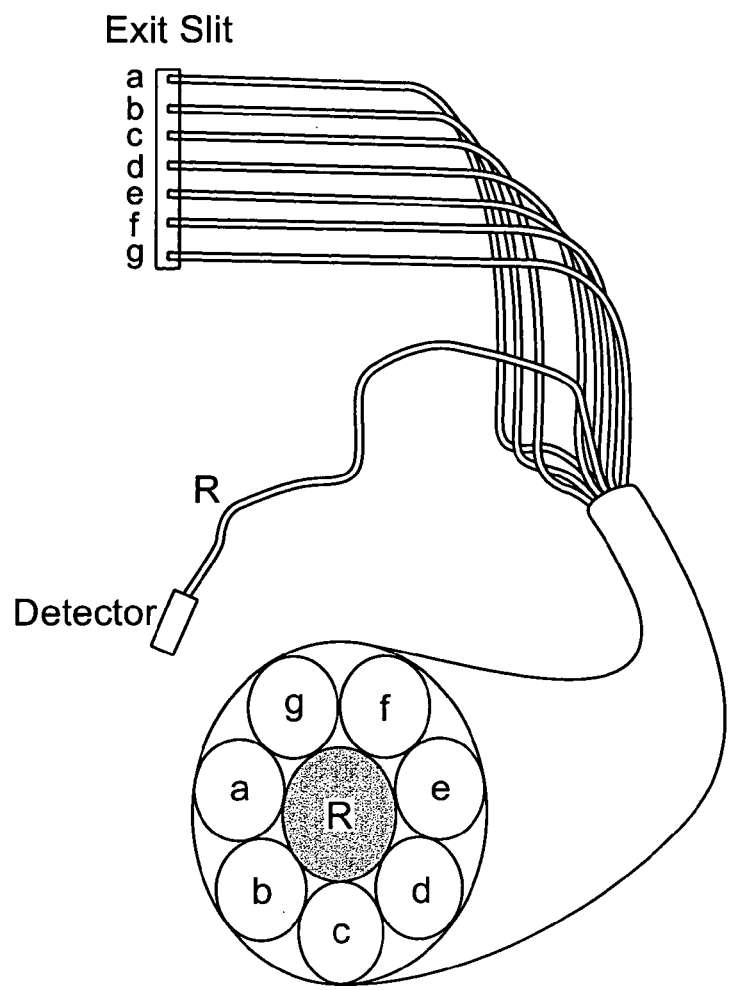
FIG. 33 shows a physical arrangement of the fiber optic cable, detector and the slit.
Figure 34:
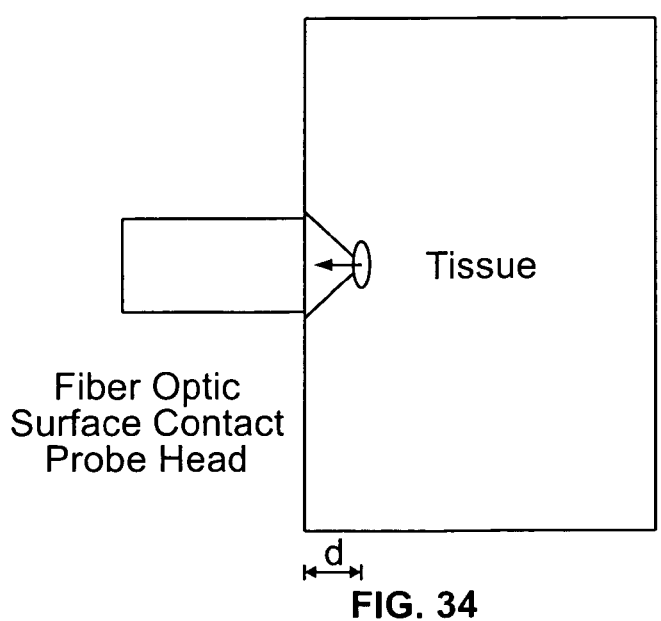
FIG. 34 illustrates a fiber optic surface contact probe head abutting tissue to be examined.

FIG. 33 shows a physical arrangement of the fiber optic cable, detector and the slit. FIG. 34 illustrates a fiber optic surface contact probe head abutting tissue to be examined.

Figure 35A:
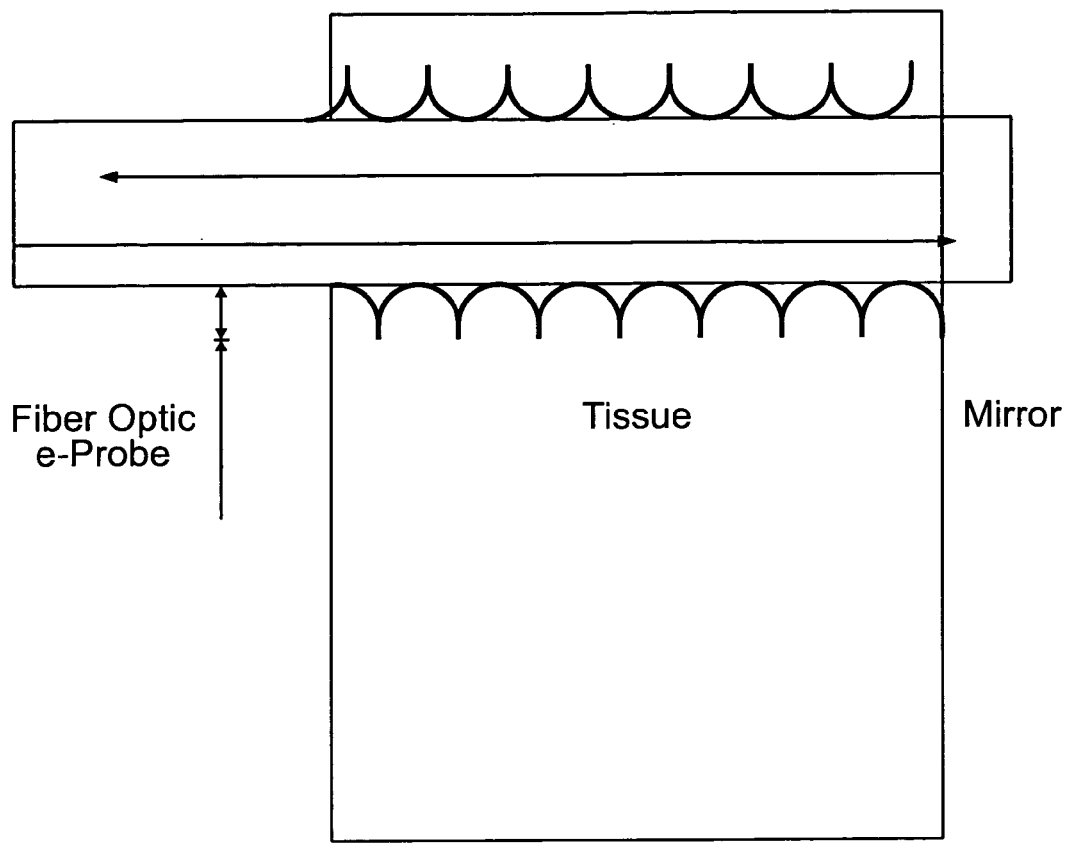
FIGS. 35A and 35B illustrate a fiber optic E-Probe for pierced ears that can be used for medical monitoring applications in accordance with the present invention.
Figure 35B:
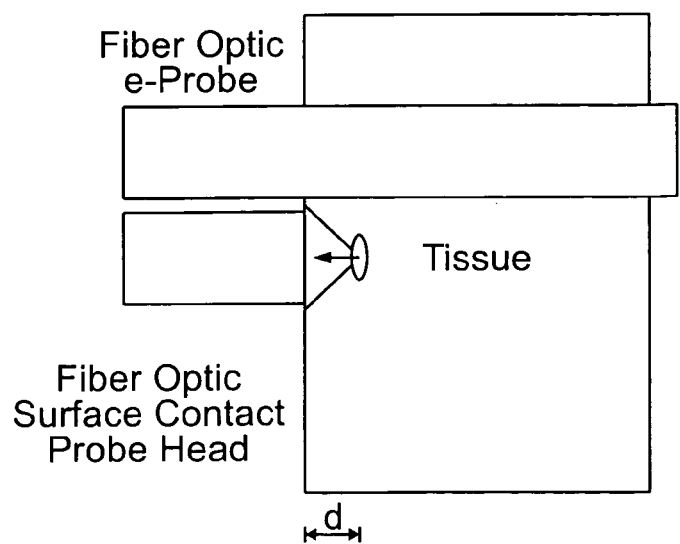

FIGS. 35A and 35B illustrate a fiber optic e-Probe for pierced ears that can be used for medical monitoring applications in accordance with the present invention.

Figure 36A:
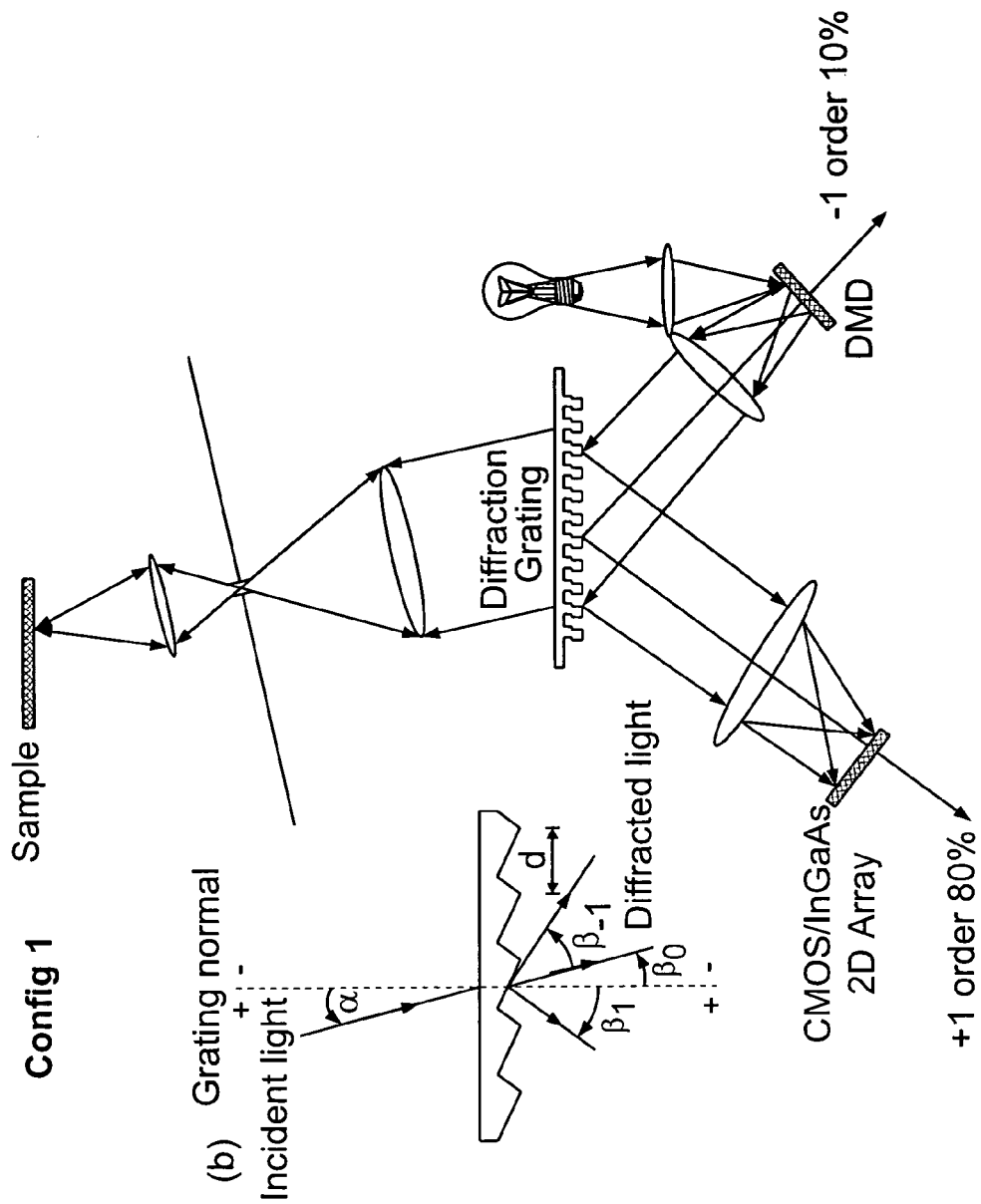
FIGS. 36A, 36B and 36C illustrate different configurations of a hyperspectral adaptive wavelength advanced illuminating imaging spectrograph (HAWAIIS) in accordance with this invention.
Figure 36B:
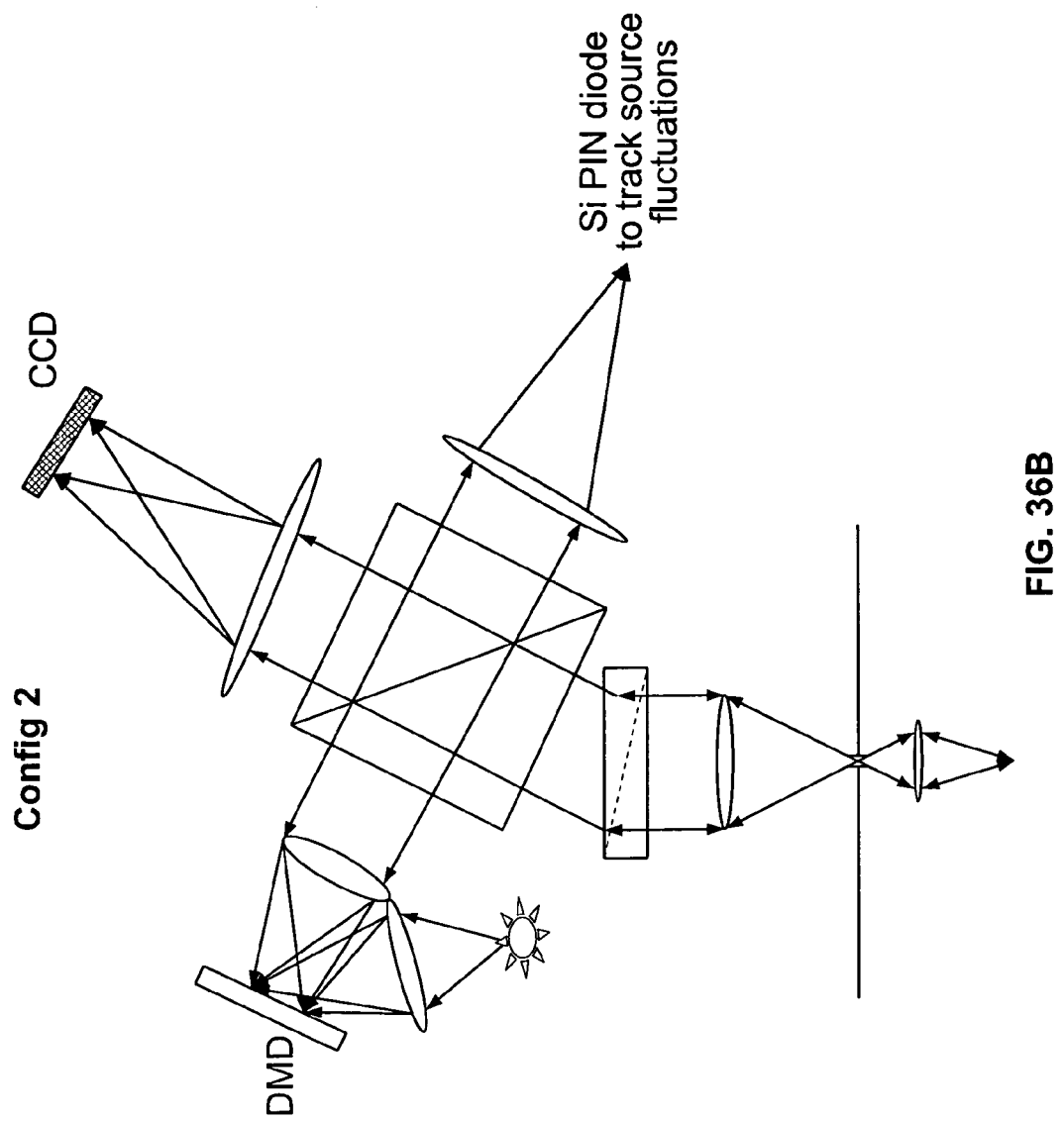
Figure 36C:
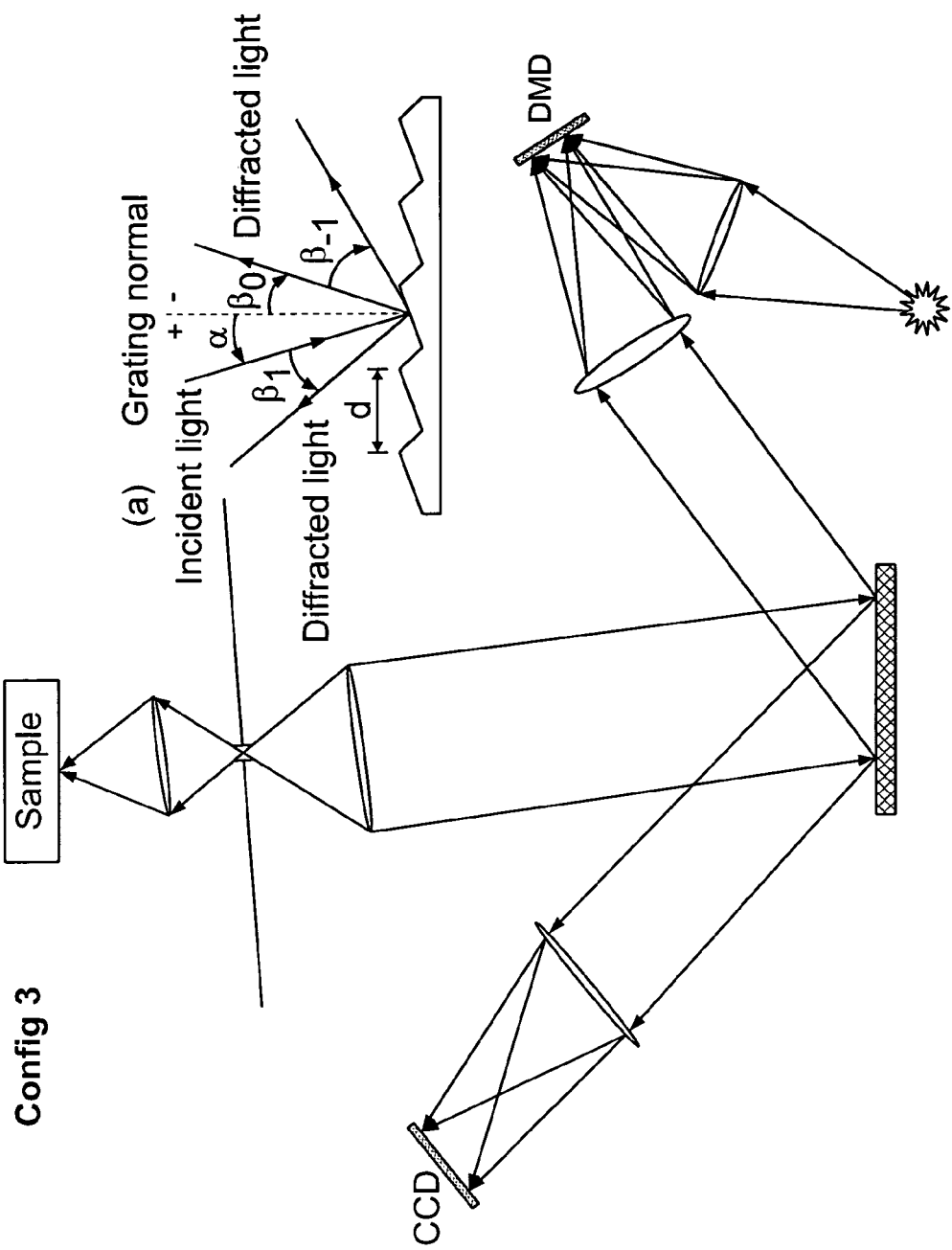

FIG. 36A, 36B and 36C illustrate different configurations of a hyper-spectral adaptive wavelength advanced illuminating imaging spectrograph (HAWAIIS).

In FIG. 36A, DMD (shown illuminating the −1 order) is a programmable spatial light modulator that is used to select spatio/spectral components falling upon and projecting from the combined entrance/exit slit. The illumination is fully programmable and can be modulated by any contiguous or non-contiguous combination at up to 50KHz. The corresponding spatial resolution element located at the Object/sample is thus illuminated and is simultaneously spectrally imaged by the CCD (located in order +1 with efficiency at 80%) as in typical CCD imaging spectrographs used for Raman spectral imaging.

With reference to FIGS. 36, the output of a broadband light source such as a TQH light bulb(1001) is collected by a collection optic (lens 1002) and directed to a spatial light modulator such as the DMA used in this example(1003). Specific spatial resolution elements are selected by computer controlled DMA driver to propagate to the transmission diffraction grating(1005) via optic (lens 1004). The DMA (1003) shown illuminating the −1 order of the transmission diffraction grating(1005) is a programmable spatial light modulator that is used to select spatio/spectral resolution elements projecting through the entrance/exit slit(#1007) collected and focused upon the sample(1009) by optic (lens 1008). The spatio/spectral resolution elements illuminating the sample are fully programmable. The sample is thus illuminated with specific and known spectral resolution elements. The reflected spectral resolution elements from specific spatial coordinates at the sample plane are then collected and focused back through the entrance/exit slit by optic (lens 1008). Optic (lens 1006) collimates the returned energy and presents it to the transmission diffraction grating (1005). The light is then diffracted preferentially into the +1 order and is subsequently collected and focused by the optic (lens 1010) onto a 2D detector array (1011). This conjugate spectral imaging device has the advantage of rejecting out of focus photons from the sample. Spectral resolution elements absorbed or reflected are measured with spatial specificity by the device.

FIGS. 43–47(A–D) illustrate hyperspectral processing in accordance with the present invention, including data maps, encodement mask, DMA programmable resolution using different numbers of mirrors and several encodegrams.

One aspect of the present invention is the use of modulation of single array elements or groups of array elements to "tag" radiation impinging on these elements with its own pattern of modulation. In essence, this aspect of the invention allows to combine data from a large number of array elements into a few processing channels, possibly a single channel, without losing the identity of the source and/or the spatial or spectral distribution of the data.

As known in the art, combination of different processing channels into a smaller number of channels is done using signal multiplexing. In accordance with the present invention, multiplexing of radiation components which have been "tagged" or in some way encoded to retain the identity of their source, is critical in various processing tasks, and in particular enables simple, robust implementations of practical devices. Thus, for example, in accordance with the principles of the present invention, using a micro mirror array, an optical router, an on-off switch (such as an LCD screen), enables simplified and robust image formation with a single detector and further makes possible increasing the resolution of a small array of sensors to any desired size.

In accordance with this invention, methods for digitally-controlled modulation of sensor arrays are used to perform signal processing tasks while collecting data. Thus, the combination and binning of a plurality of radiation sources is manipulated in accordance with this invention to perform calculations on the analog data, which is traditionally done in the digital data analysis process. As a result, a whole processing step can be eliminated by preselecting the switching modulation to perform the processing before the A/D conversion, thereby only converting data quantities of interest. This aspect of the present invention enables real-time representation of the final processed data, which in processing intense applications can be critical.

By modulating the SLM array used in accordance with this invention, so as to compute inner products with elements of an orthogonal basis, the raw data can be converted directly on the sensor to provide the data in transform coordinates, such as Fourier transform, Wavelet transform, Hadamard, and others. This is because the amount of data collected is so large that it can swamp the processor or result in insufficient bandwidth for storage and transmission. As known in the art, without some compression an imaging device can become useless. As noted above, for hyper-spectral imaging a full spectrum (a few hundred data points) is collected for each individual pixel resulting in a data glut. Thus, compression and feature extraction are essential to enable a meaningful image display. It will be appreciated that the resulting data file is typically much smaller, providing significant savings in both storage and processing requirements. A simple example is the block 8×8 Walsh expansion, which is automatically computed by appropriate mirror modulation, the data measured is the actual compressed parameters.

In another related aspect of the present invention, data compression can also be achieved by building an orthogonal basis of functions. In a preferred embodiment, this can be achieved by use of the best basis algorithm. See, for example, Coifman, R. R. and Wickerhauser, M. V., "Entropy-based Algorithms for Best Basis Selection", IEEE Trans. Info. Theory 38 (1992), 713–718, and U.S. Pat. Nos. 5,526,299 and 5,384,725 to one of the inventors of this application. The referenced patents and publications are incorporated herein by reference.

By means of background, it is known that the reduction of dimensionality of a set of data vectors can be accomplished using the projection of such a set of vectors onto a orthogonal set of functions, which are localized in time and frequency. In a preferred embodiment, the projections are defined as correlation of the data vectors with the set of discretized re-scaled Walsh functions, but any set of appropriate functions can be used instead, if necessary.

The best basis algorithm to one of the co-inventors of this application provides a fast selection of an adapted representation for a signal chosen from a large library of orthonormal bases. Examples of such libraries are the local trigonometric bases and wavelet packet bases, both of which consist of waveforms localized in time and frequency. An orthonormal basis in this setting corresponds to a tiling of the time-frequency plane by rectangles of area one, but an arbitrary such tiling in general does not correspond to an orthonormal basis. Only in the case of the Haar wavelet packets is there a basis for every tiling, and a fast algorithm to find that basis is known. See, Thiele, C. and Villemoes, L., "A Fast Algorithm for Adapted Time-Frequency Tilings", *Applied and Computational Harmonic Analysis* 3 (1996), 91–99, which is incorporated by reference.

Walsh packet analysis is a robust, fast, adaptable, and accurate alternative to traditional chemometric practice. Selection of features for regression via this method reduces the problems of instability inherent in standard methods, and provides a means for simultaneously optimizing and automating model calibration.

The Walsh system $\{W_n\}_{n=0}^{\infty}$ is defined recursively by $$W_{2n}(t) = W_n(2t) + (-1)^n W_n(2t-1)$$

$$W_{2n+1}(t) = W_n(2t) - (-1)^n W_n(2t-1)$$

With $W_0(t)=1$ on $0 \leq t < 1$. If $[0,1] \times [0,\infty]$ is the time frequency plane, dyadic rectangles are subsets of the form $$I \times \omega = [2^{-j}k, 2^{-j}(k+1)] \times [2^m n, 2^m (n+1)],$$

with j, k, m and n non-negative integers, and the tiles are the rectangles of area one (j=m). A tile p is associated with a rescaled Walsh function by the expression $$w_p(t) = 2^{j/2} W_n(2^j t - k)$$

Fact: The function $w_p$ and $w_q$ are orthogonal if and only if the tiles p and q are disjoint. Thus, any disjoint tiling will give rise to an orthonormal basis of $L^2(0,1)$ consisting of rescaled Walsh functions. For any tiling B, we may represent a function f as $$f = \sum_{p \in B} <f, w_p> w_p$$

$p \varepsilon B$ and may find an optimal such representation for a given additive cost functional by choosing a tiling minimizing the cost evaluated on the expansion coefficients.

An example contrasting the use of adaptive Walsh packet methods with standard chemometrics for determining protein concentration in wheat is discussed herein. The data consists of two groups of wheat spectra, a calibration set with 50 samples and a validation set of 54 samples. Each individual spectrum is given in units of log(1/R) where R is the reflectance and is measured at 1011 wavelengths, uniformly spaced from 1001 nm to 2617 nm. Standard chemometric practice involves computing derivative-like quantities at some or all wavelengths and building a calibration model from this data using least squares or partial least squares regression.

To illustrate this, let $Y_i$ be the percent protein for the i-th calibration spectrum $S_i$, and define the feature $X_i$ to be $$X_i = \frac{S_i(2182 \text{ nm}) - S_i(2134 \text{ nm})}{S_i(2183 \text{ nm}) - S_i(2160 \text{ nm})}$$

where $S_i(WL \text{ nm})$ is log(1/R) for the i-th spectrum at wavelength WL in nanometers. This feature makes use of 4 of the 1011 pieces of spectral data, and may be considered an approximate ratio of derivatives. Least squares provides a linear model $AX_i + B$ yielding a prediction $\hat{Y}_i$ of $Y_i$. An estimate of the average percentage regression error is given by:

$$\frac{100}{N} \sum_{i=1}^{N} \frac{|\hat{Y}_i - Y_i|}{|Y_i|}$$

with N being the number of sample spectra in the given data set (N is 50 for the calibration set). Retaining the same notation as for the calibration set, one can compute the feature $X_i$ for each validation spectrum $S_i$ and use the above model to predict $Y_i$ for the validation spectra. The average percentage regression error on the validation set is 0.62%, and this serves as the measure of success for the model. This model is known to be state-of-the-art in terms of both concept and performance for this data, and will be used as point of comparison.

The wavelength-by-wavelength data of each spectrum is a presentation of the data in a particular coordinate system. Walsh packet analysis provides a wealth of alternative coordinate systems in which to view the data. In such a coordinate system, the coordinates of an individual spectrum would be the correlation of the spectrum with a given Walsh packet. The Walsh packets themselves are functions taking on the values 1, −1, and 0 in particular patterns, providing a square-wave analogue of local sine and cosine expansions. Examples of Walsh packets are shown in FIG. 28.

In accordance with the present invention, such functions can be grouped together to form independent coordinate systems in different ways. In particular, the Walsh packet construction is dyadic in nature and yields functions having $N=2^k$ sample values. For N=1024, the closest value of N for the example case of spectra having 1011 sample values, the number of different coordinate systems is approximately $10^{272}$. If each individual Walsh packet is assigned a numeric cost (with some restrictions), a fast search algorithm exists, which will find the coordinate system of minimal (summed) cost out of all possible Walsh coordinate systems. Despite the large range for the search, the algorithm is not approximate, and provides a powerful tool for finding representations adapted to specific tasks.

These ideas can be applied to the case of regression for the wheat data in question. Any Walsh packet provides a feature, not unlike the $X_i$ computed above, simply by correlating the Walsh packet with each of the spectra. These correlations can be used to perform a linear regression to predict the protein concentration. The regression error can be used as a measure of the cost of the Walsh packet. A good coordinate system for performing regression is then one in which the cost, i.e., the regression error, is minimal. The fast algorithm mentioned above gives us the optimal such representation, and a regression model can be developed out of the best K (by cost) of the coordinates selected.

In a particular embodiment, for each of the calibration spectra S; first compute all possible Walsh packet features and then determine the linear regression error in predicting the Y; for each Walsh packet. Using this error as a cost measure, select a coordinate system optimized for regression, to provide a (sorted) set of features $\{X_i(1), \ldots, X_i(K)\}$ associated with each spectrum $S_i$. These features are coordinates used to represent the original data, in the same way that the wavelength data itself does. Four features were used in the standard model described above, and, hence, one can choose K=4 and use partial least squares regression to build a model for predicting $Y_i$. The average percentage regression error of this model on the validation data set is 0.7%, and this decreases to 0.6% for K=10. FIG. 41A shows a typical wheat spectrum together with one of the top 4 Walsh packets used in this model. The feature that is input to the regression model is the correlation of the Walsh packet with the wheat spectrum. (In this case the Walsh feature computes a second derivative, which suppresses the background and detects the curvature of the hidden protein spectrum in this region).

Similar performance is achieved by Walsh packet analysis using the same number of features. The benefit of using the latter becomes clear if noise is taken into account. Consider the following simple and natural experiment: add small amounts of Gaussian white noise to the spectra and repeat the calibrations done above using both the standard model and the Walsh packet model. The results of this experiment are shown in FIG. 41A, which plots the regression error versus the percentage noise energy for both models (we show both the K=4 and the K=10 model for the Walsh packet case to emphasize their similarity). A very small amount of noise takes the two models from being essentially equivalent to wildly different, with the standard model having more than three times the percentage error as the Walsh packet model. The source of this instability for the standard model is clear. The features used in building the regression model are isolated wavelengths, and the addition of even a small amount of noise will perturb those features significantly. The advantage of the Walsh packet model is clear in FIG. 42. The feature being measured is a sum from many wavelengths, naturally reducing the effect of the noise.

The Walsh packet method described here has other advantages, such as automation. The fast search algorithm automatically selects the best Walsh packets for performing the regression. If the data set were changed to, say, blood samples and concentrations of various analytes, the same algorithm would apply off the shelf in determining optimal features. The standard model would need to start from scratch in determining via lengthy experiment which wavelengths were most relevant.

Adaptability is also a benefit. The optimality of the features chosen is based on a numeric cost function, in this case a linear regression error. However, many cost functions can be used and in each case a representation adapted to an associated task will be chosen. Optimal coordinates can be chosen for classification, compression, clustering, non-linear regression, and other tasks. In each case, automated feature selection chooses a robust set of new coordinates adapted to the job in question.

In accordance with an embodiment of the present invention, a system in which a video camera is synchronized to the tunable light source modulation allowing analysis of the encoded spectral bands from a plurality of video images, thereby providing a multispectral image. Since the ambient light is not modulated it can be separated from the desired spectral information. This system is the functional equivalent of imaging the scene a number of times with a multiplicity of color filters. It allows the formation of any virtual photographic color filter with any absorption spectrum desired. A composite image combining any of these spectral bands can be formed to achieve a variety of image analysis, filtering and enhancing effects.

For example, an object with characteristic spectral signature can be highlighted by building a virtual filter transparent to this signature and not to others (which should be suppressed). In particular, for seeing the concentration of protein in a wheat grain pile (the example discussed below) it would be enough to illuminate with two different combination of bands in sequence and take the difference of the two consecutive images. More elaborate encodements can be necessary if more spectral combinations has to be measured independently, but the general principle remains.

In a different embodiment, an ordinary video camera used in accordance with this invention is equipped with a synchronized tunable light source so that odd fields are illuminated with a spectral signature which is modulated from odd field to odd field while the even fields are modulated with the complementary spectral signature so that the combined even odd light is white. Such an illumination system allows ordinary video imaging which after digital demodulation provides detailed spectral information on the scene with the same capabilities as the gray level camera.

This illumination processing system can be used for machine vision for tracking objects and anywhere that specific real time spectral information is useful In another embodiment, a gray level camera can measure several preselected light bands using, for example, 16 bands by illuminating the scene consecutively by the 16 bands and measuring one band at a time. A better result in accordance with this invention can be obtained by selecting 16 modulations, one for each band, and illuminating simultaneously the scene with all 16 colors. The sequence of 16 frames can be used to demultiplex the images. The advantages of multiplexing will be appreciated by those of skill in the art, and include: better signal to noise ratio, elimination of ambient light interference, tunability to sensor dynamic range constraints, etc.

A straightforward extension of this idea is the use of this approach for multiplexing a low resolution sensor array to obtain better image quality. For example, a 4×4 array of mirrors with Hadarnard coding could distribute a scene of 400×400 pixels on a CCD array of 100×100 pixels resulting in an effective array with 16 times the number of CCD. Further, the error could be reduced by a factor of four over a raster scan of 16 scenes.

In accordance with the present invention by irradiating a sample of material with well-chosen bands of radiation that are separately identifiable using modulation, one can directly measure constituents in the material of interest. This measurement, for example, could be of the protein quantity in a wheat pile, different chemical compounds in human blood, or others. It should be apparent that there is no real limitation on the type of measurements that can be performed, although the sensors, detectors and other specific components of the device, or its spectrum range can differ.

In the following example we illustrate the measurement of protein in wheat. The data consists of two groups of wheat spectra, a calibration set with 50 samples and a validation set of 54 samples.

Figure 37:
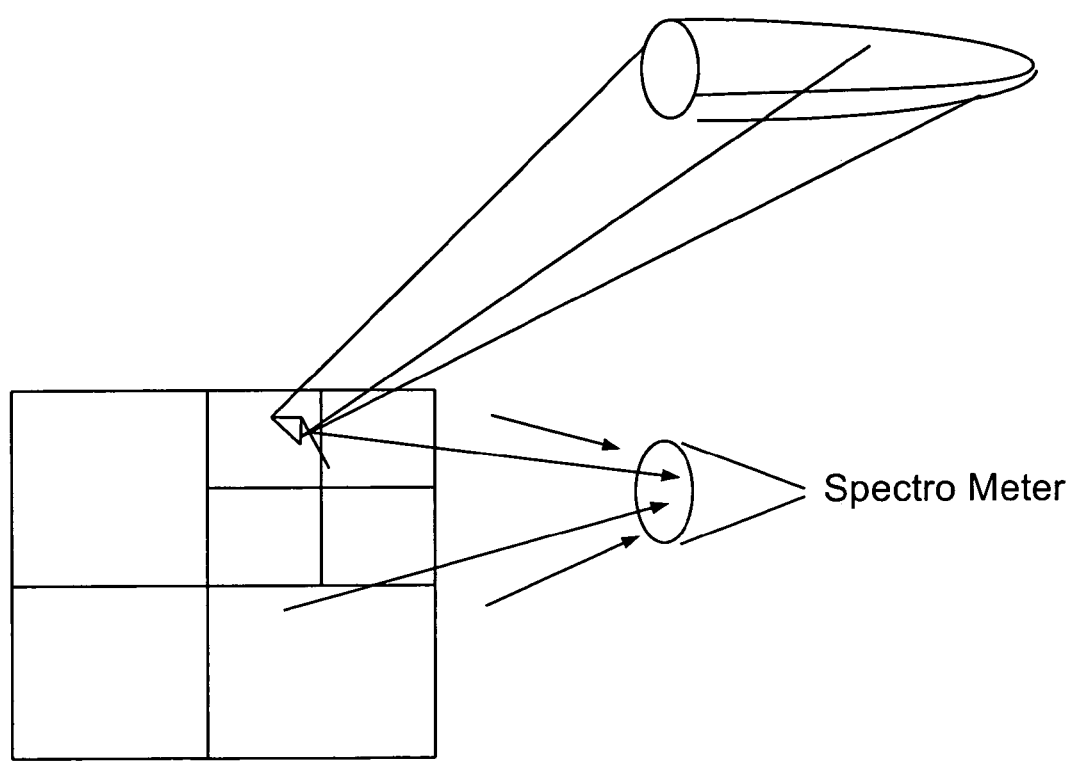
FIG. 37 illustrates a DMA search by splitting the scene.

FIG. 37 shows a DMA search by splitting the scene. The detection is achieved by combining all photons from the scene into a single detector, then splitting the scene in parts to achieve good localization. In this example, one is looking for a signal with energy in the red and blue bands. Spectrometer with two detectors, as shown in FIG. 27 can be used, so that the blue light goes to the top region of the DMA, while the red goes to the bottom.

First, the algorithm checks if it is present in the whole scene by collecting all photons into the spectrometer, which looks for the presence of the spectral energies. Once the particular spectrum band is detected, the scene is split into four quarters and each is analyzed for presence of target. The procedure continues until the target is detected.

Figure 38:
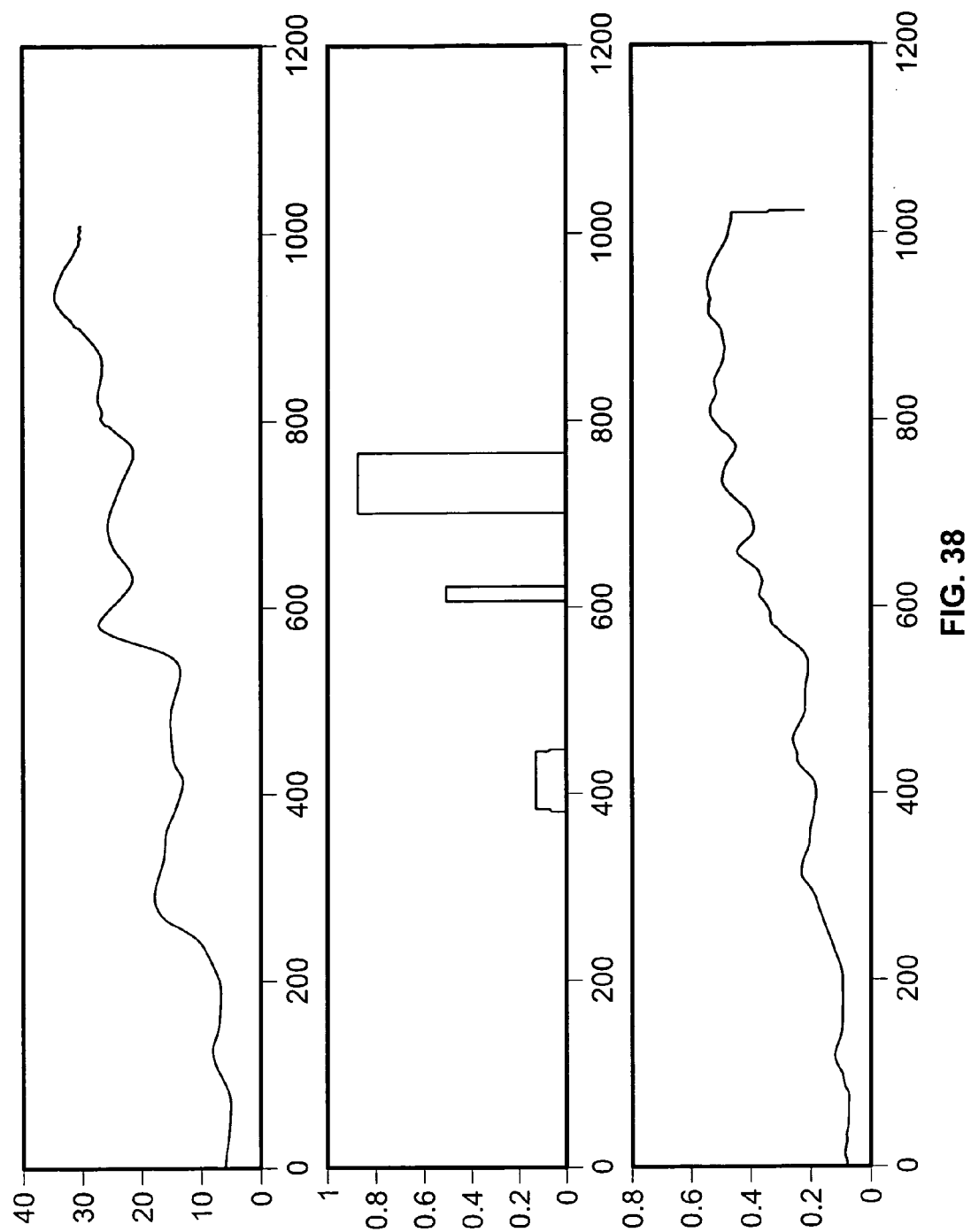
FIG. 38 illustrates wheat spectra data (training) and wavelet spectrum in an example of determining protein content in wheat.

FIG. 38 illustrates the sum of wheat spectra training data (top) Sum of |w| for top 10 wavelet packets (middle) and an example of protein spectra—soy protein (bottom). The goal is to estimate the amount of protein present in wheat. The middle portion of the figure shows the region where the Walsh packets provide useful parameters for chemo-metric estimation.

Figures 1, 39:
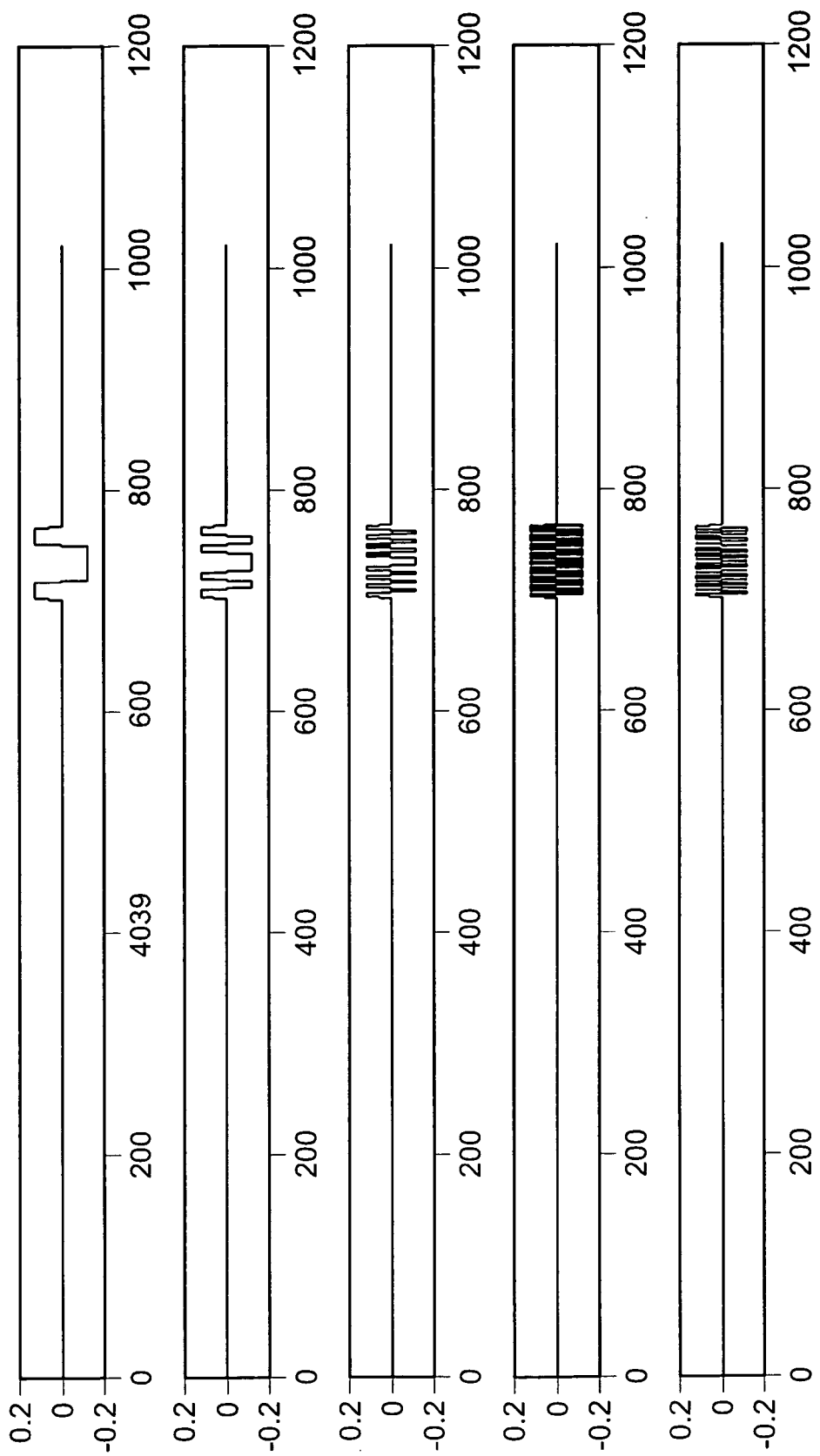
FIG. 39 illustrates the top 10 wavelet packets in local regression basis selected using 50 training samples in the example of FIG. 38.
Figures 2, 39:
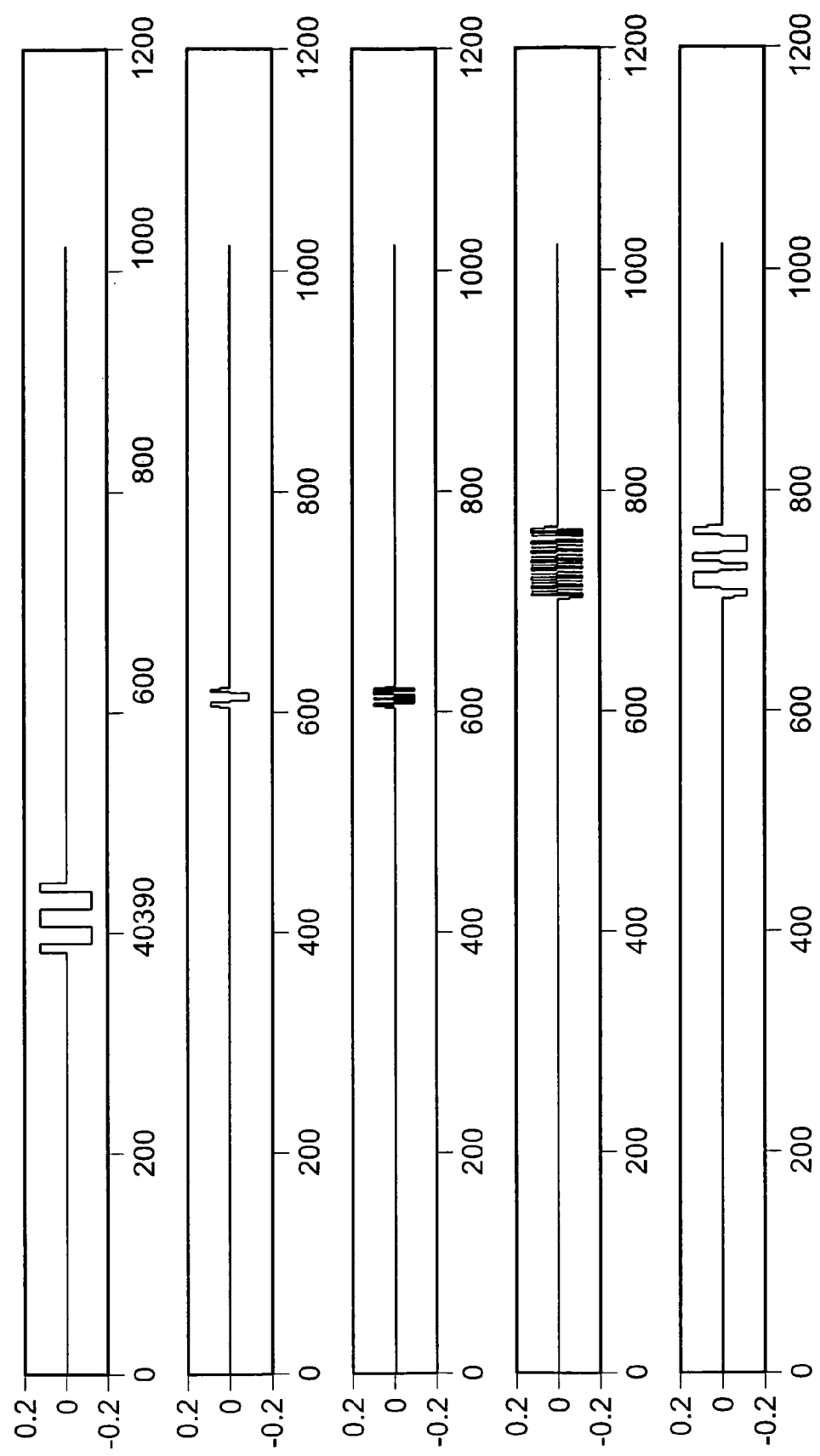
Figure 39A:
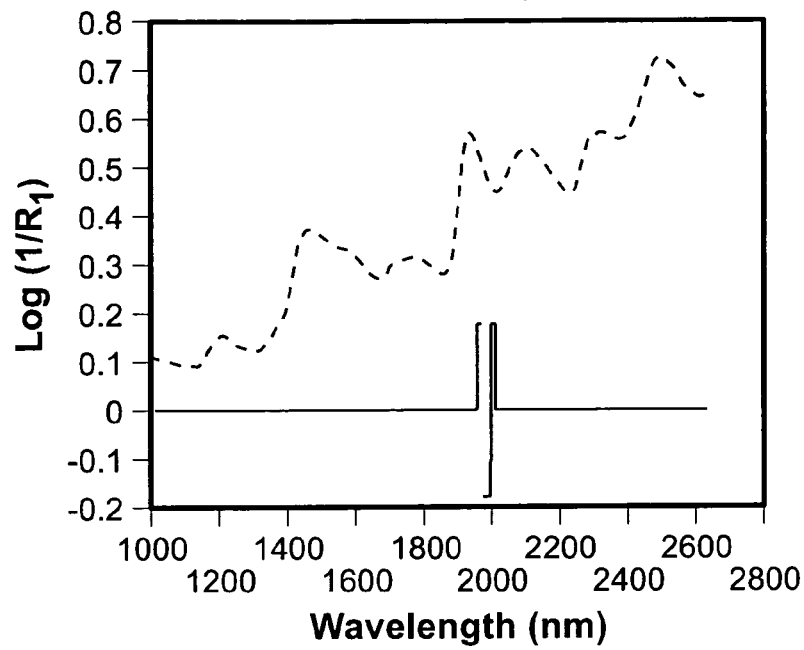
FIG. 39A shows a typical wheat spectrum together with one of the top 4 Walsh packets.
Figure 40:
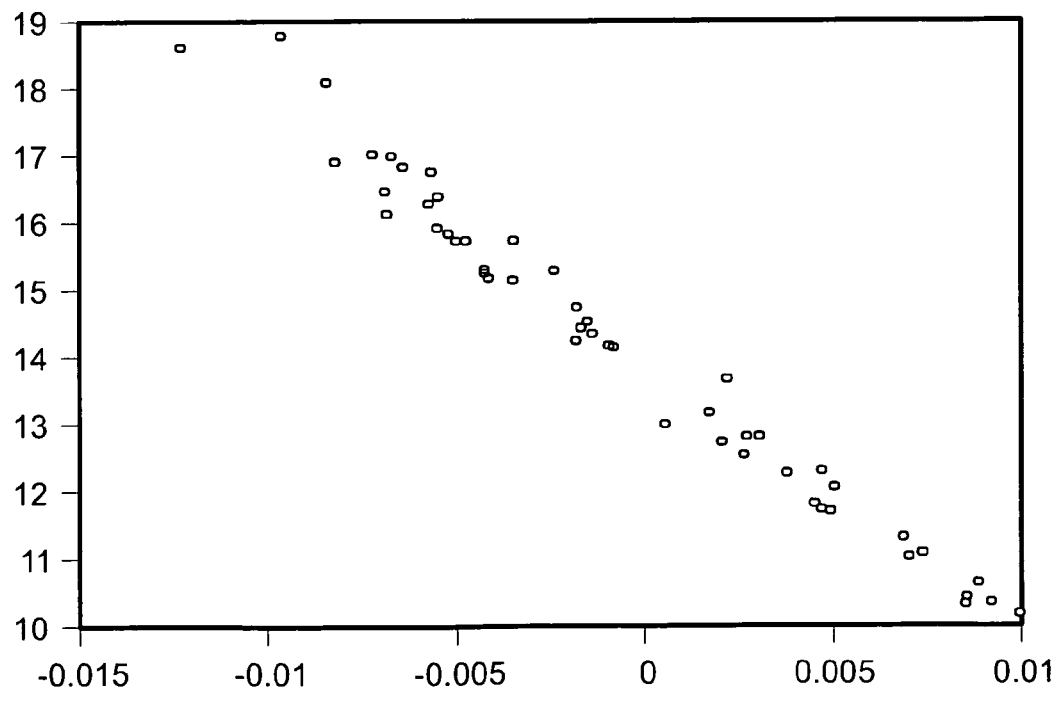
FIG. 40 is a scatter plot of protein content (test data) vs. correlation with top wavelet packet.

FIG. 39 illustrates the top 10 wavelet packets in local regression basis selected using 50 training samples. Each Walsh packet provides a measurement useful for estimation. For example, the top line indicates that by combining the two narrow bands at the ends and then subtracting the middle band we get a quantity which is linearly related to the protein concentration. FIG. 40 is a scatter plot of protein content (test data) vs. correlation with top wavelet packet. This illustrates a simple mechanism to directly measure relative concentration of desired ingredients of a mixture.

It will be appreciated that in this case one could use an LED-based flashlight illuminating in the three bands with a modulated light, which is then imaged with a CCD video camera that converts any group of consecutive three images into an image of protein concentration. Another implementation is to replace the RGB filters on a video camera by three filters corresponding to the protein bands, to be displayed after subtraction as false RGB. Various other alternative exist and will be appreciated by those of skill in the art.

Figure 41:
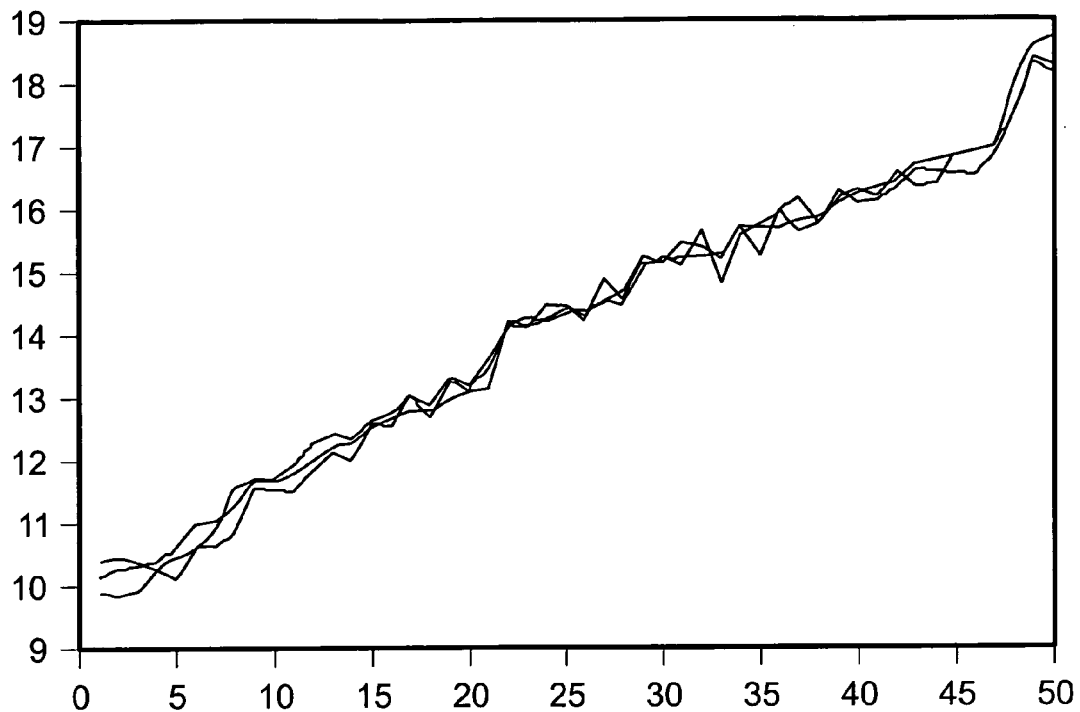
FIG. 41 illustrates PLS regression of protein content of test data.
Figure 41A:
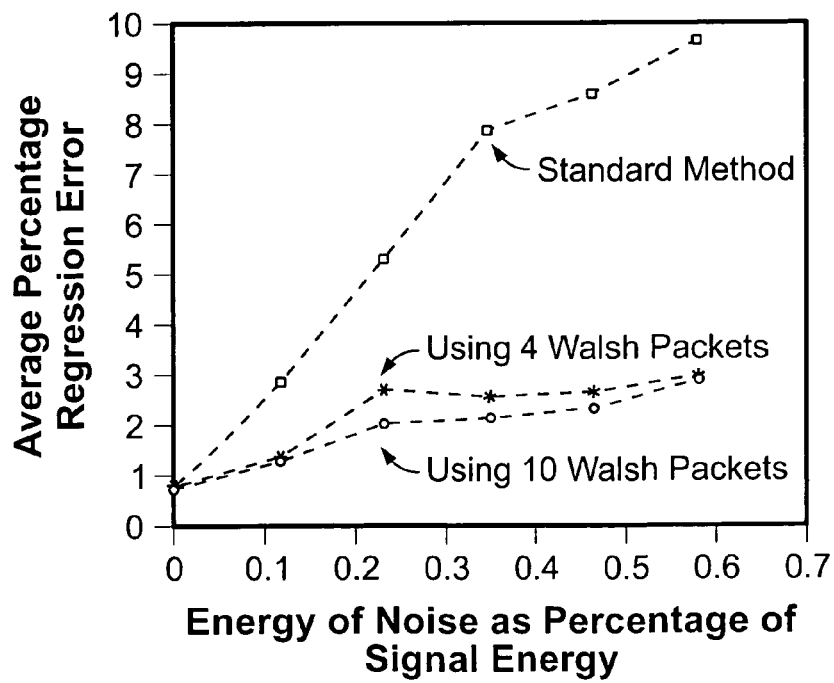
FIG. 41A shows a plot of regression error versus the percentage noise energy.

FIG. 41 illustrates PLS regression of protein content of test data: using top 10 wavelet packets (in green—1.87% error, from 6 LVs) and top 100 (in red—1.54% error from 2 LVs)—compare with error of 1.62% from 14 LVs using all original data. This graph compares the performance of the simple method described above to the true concentration values.

Figure 42:
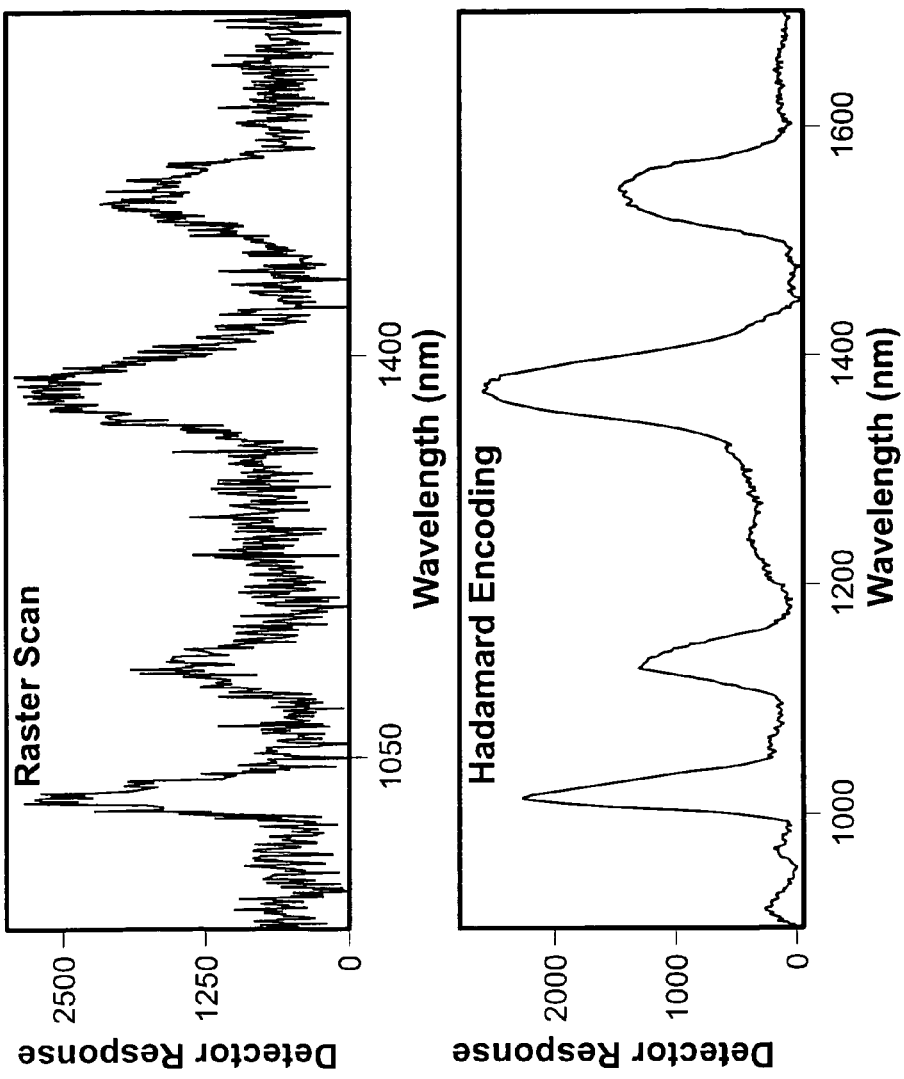
FIG. 42 illustrates the advantage of DMA-based Hadamard Spectroscopy used in accordance with the present invention over the regular raster scan.
Figure 43:
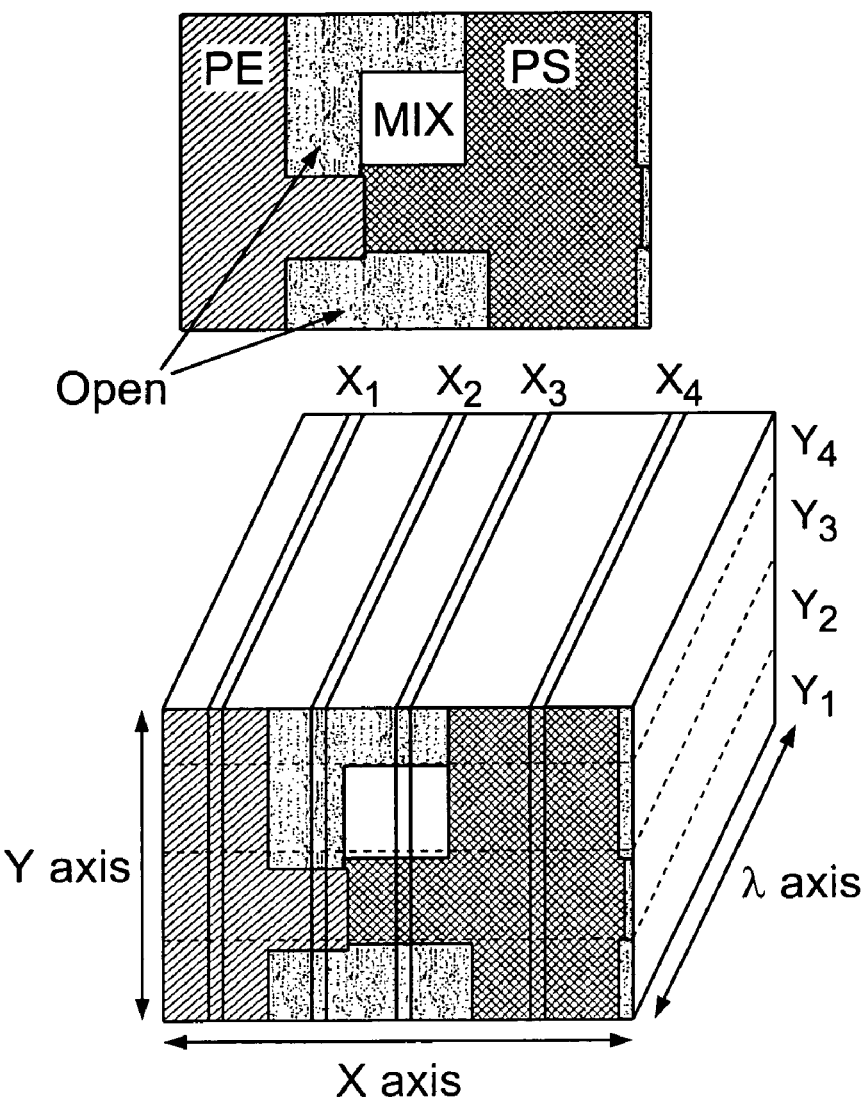
FIGS. 43–47(A–D) illustrate hyperspectral processing in accordance with the present invention.
Figure 44:
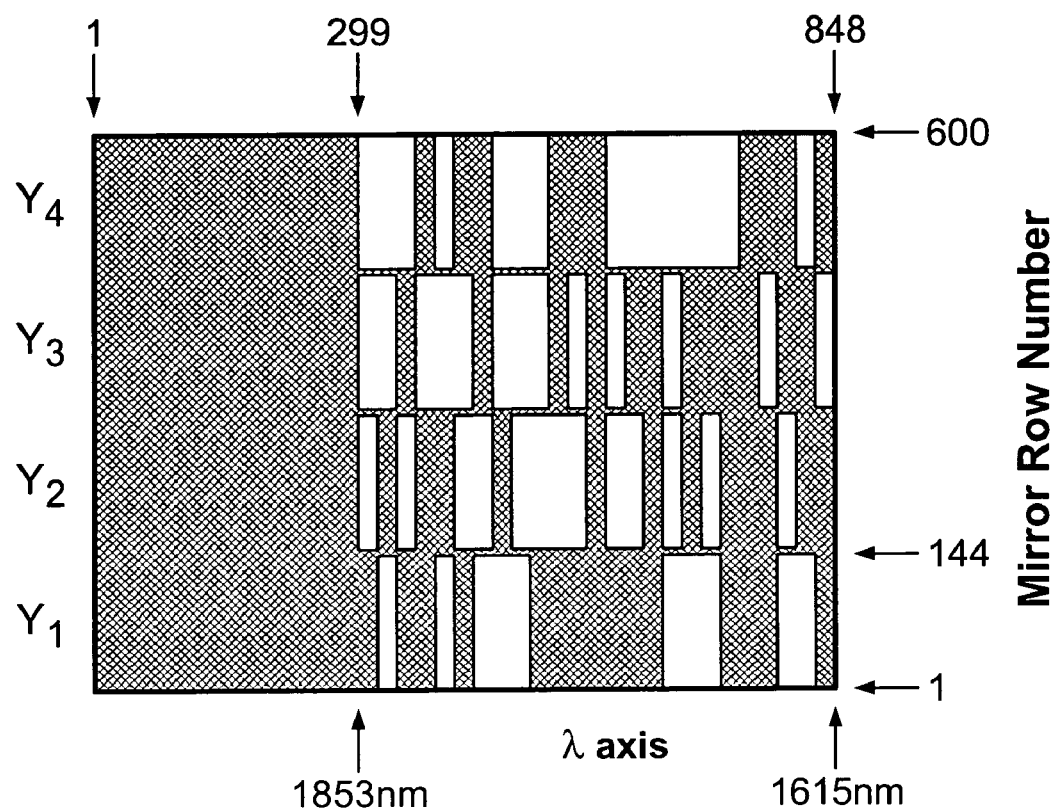
Figure 45:
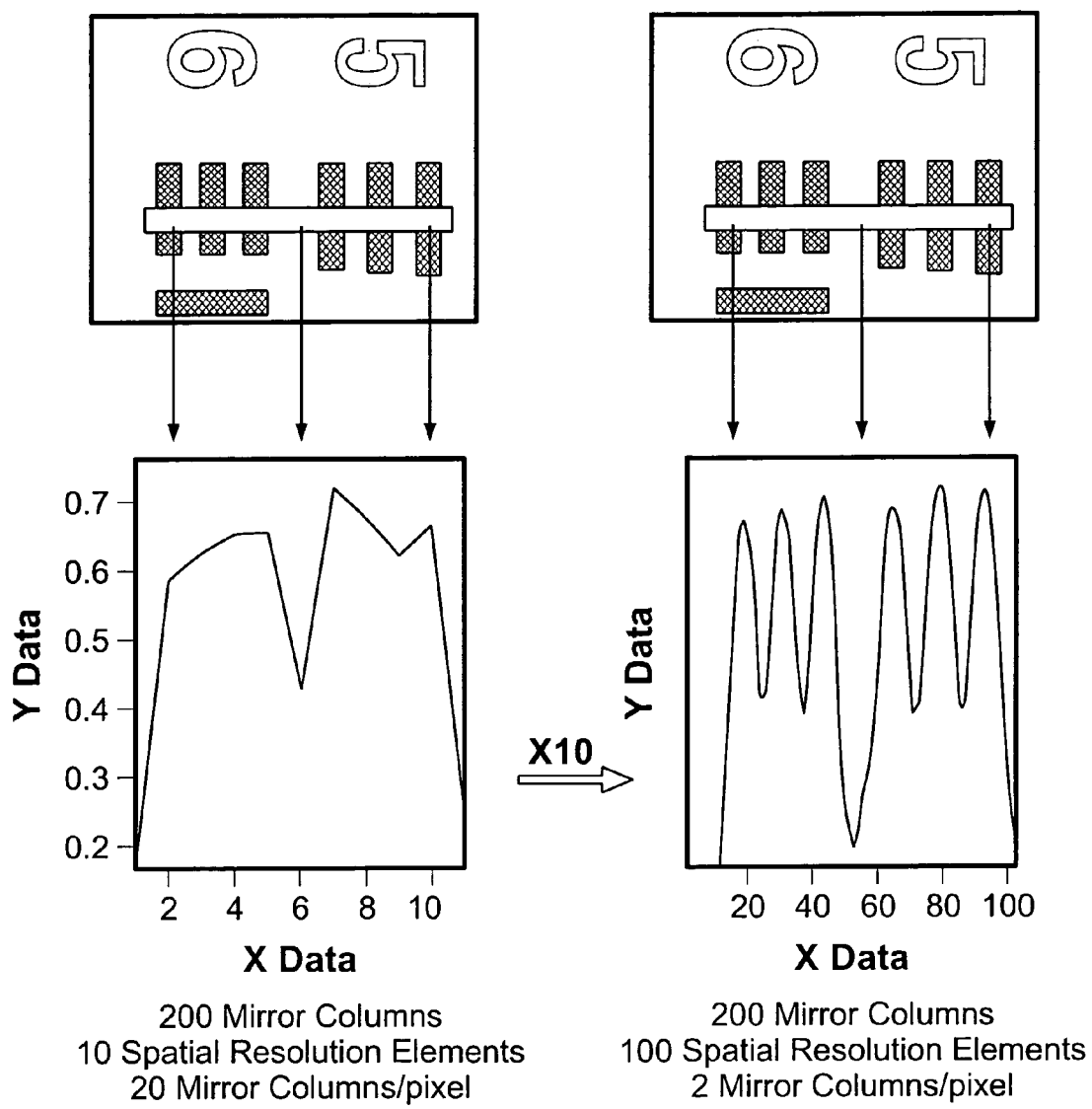
Figure 46:
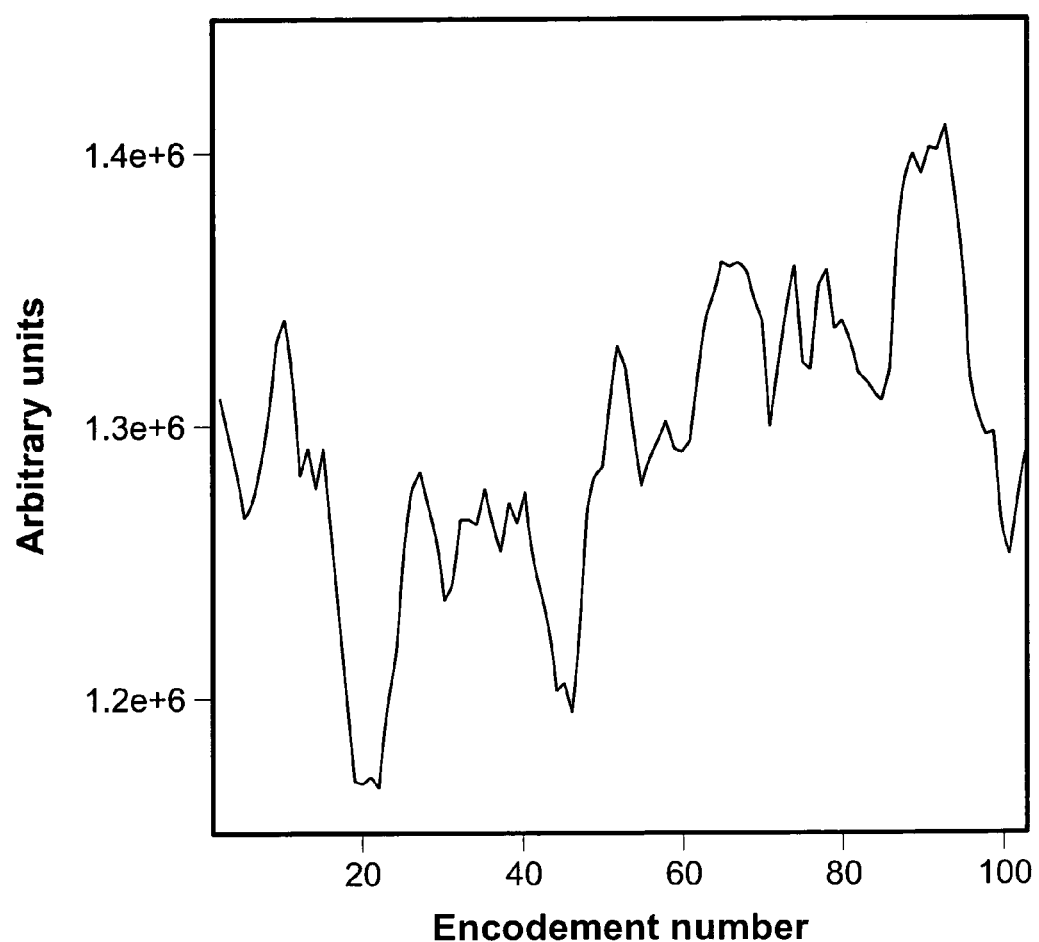
Figure 47A:
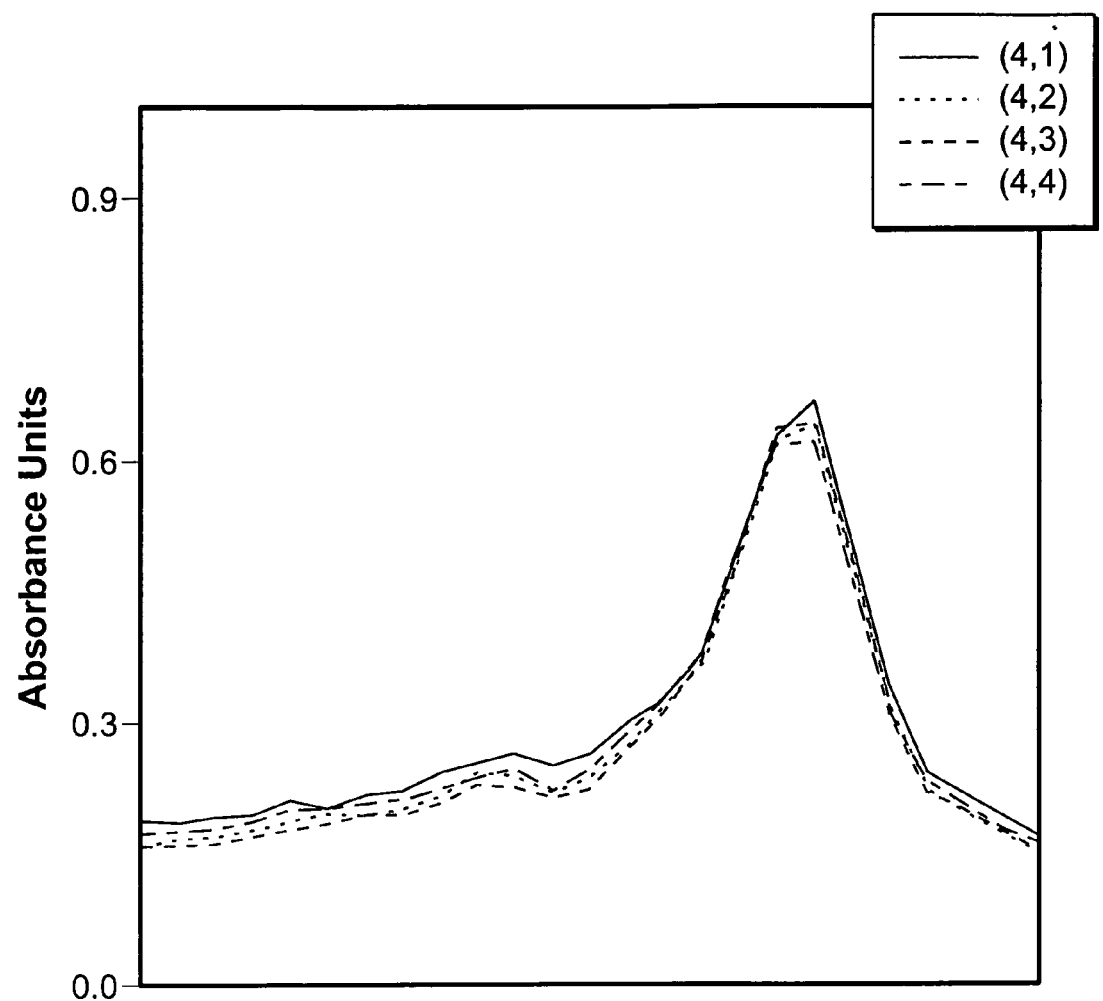
Figure 47B:
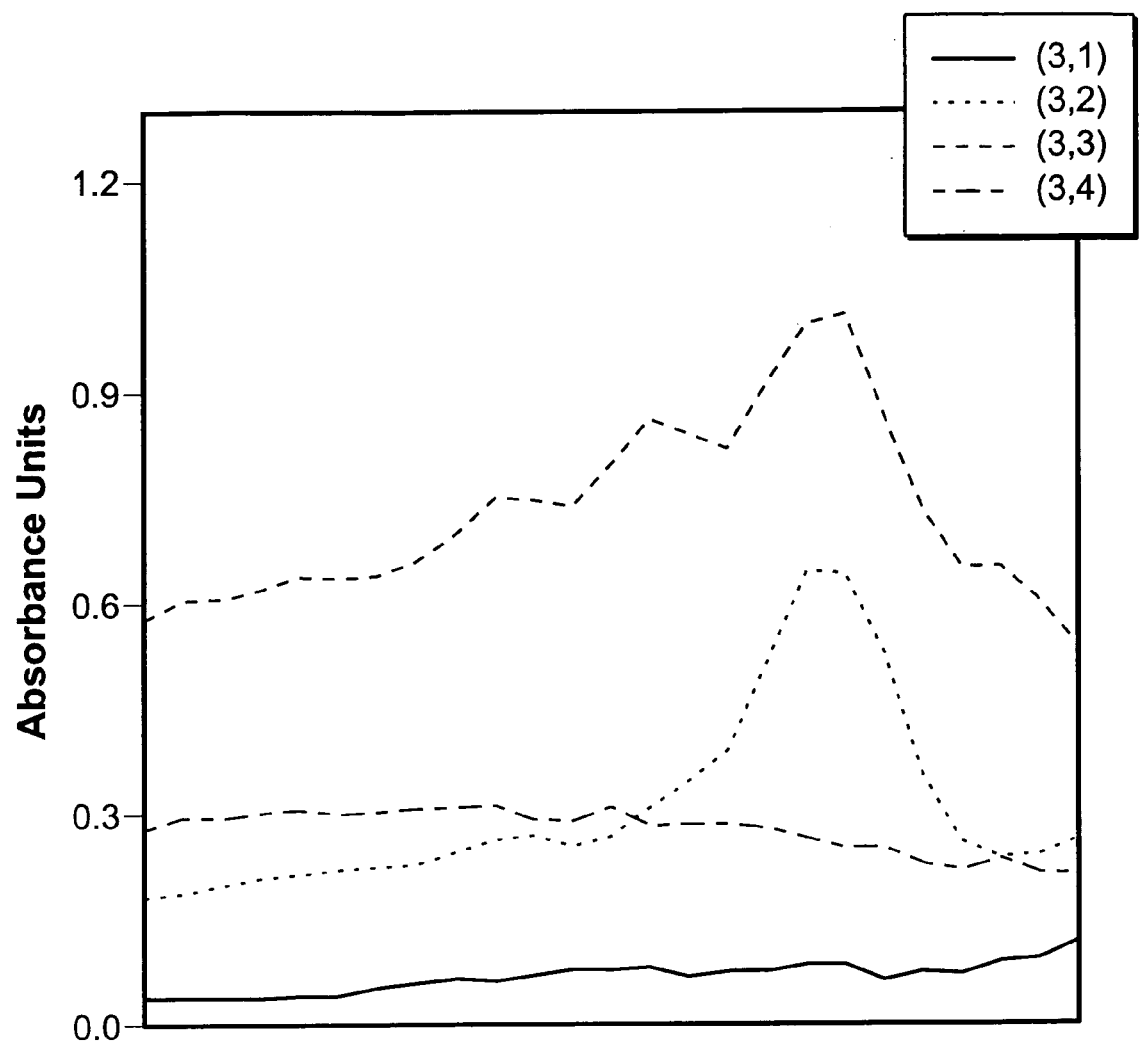
Figure 47C:
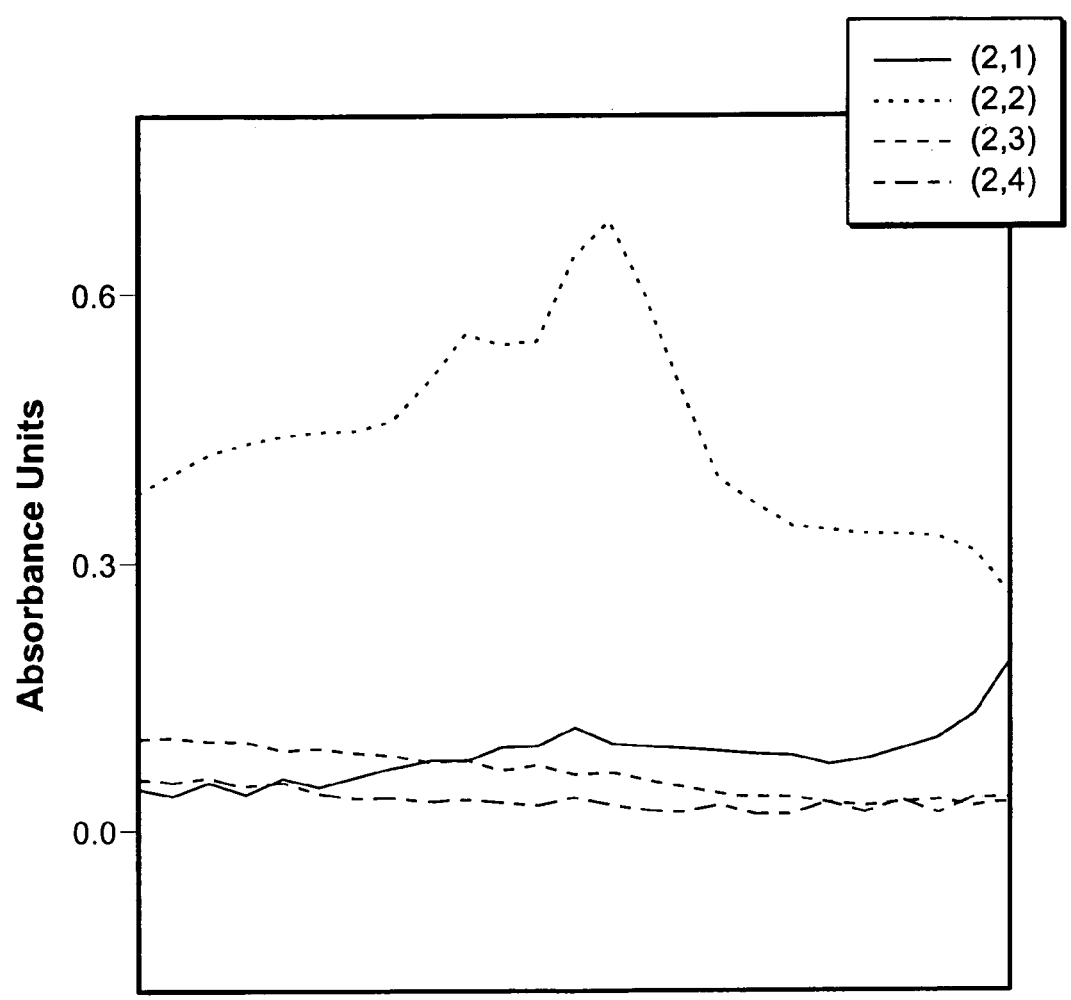
Figure 47D:
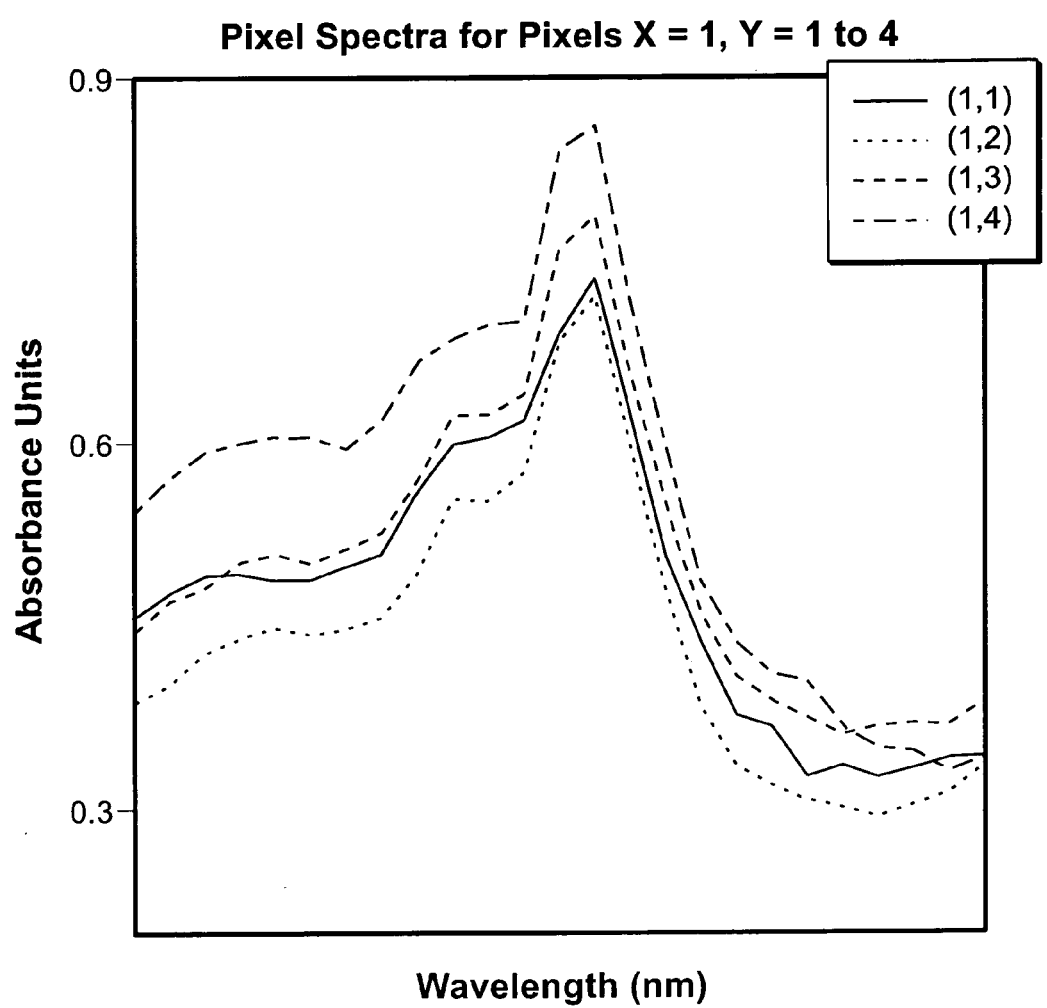

FIG. 42 illustrates the advantage of DNA-based Hadamard Spectroscopy in terms of visible improvement in the SNR of the signal for the Hadamard Encoding over the regular raster scan.

It will be appreciated that the above approach can be generalized to a method of detecting a chemical compound with known absorption lines. In particular, a simple detection mechanism for compounds with known absorption is to use an active illumination system that transmits light (radiation) only in areas of the absorption spectrum of the compound. The resulting reflected light will be weakest where the compound is present, resulting in dark shadows in the image (after processing away ambient light by, for example, subtracting the image before illumination). Clearly, this approach can be used to dynamically track objects in a video scene. For example, a red ball could be tracked in a video sequence having many other red objects, simply by characterizing the red signature of the ball, and tuning the illumination to it, or by processing the refined color discrimination. Clearly this capability is useful for interactive TV or video-gaming, machine vision, medical diagnostics, or other related applications. Naturally, similar processing can be applied in the infrared range (or UV) to be combined with infrared cameras to obtain a broad variety of color night vision or (heat vision), tuned to specific imaging tasks. To encode the received spatial radiation components one can use pulse code modulation (PCM), pulse width modulation (PWM), time division multiplexing (TDM) and any other modulation technique that has the property of identifying specific elements of a complex signal or image.

In accordance with the invention, in particular applications one can rapidly switch between the tuned light and its complement, arranging that the difference will display the analate of interest with the highest contrast. In addition, it is noted that the analate of interest will flicker, enabling detection by the eye. Applications of this approach in cancer detection in vivo, on operating table, can easily be foreseen.

Another straightforward extension of the present invention is method for initiating select chemical reactions using a tunable light source. In accordance with this aspect, the tunable light source of this invention can be tuned to the absorption profile of a compound that is activated by absorbing energy, to achieve curing, drying, heating, cooking of specific compounds in a mixture. Applications further include photodynamic therapy, such as used in jaundice treatment, chemotherapy, and others.

Yet another application is a method for conducting spectroscopy with determining the contribution of individual radiation components from multiplexed measurements of encoded spatio-spectral components. In particular a multiplicity of coded light in the UV band could be used to cause fluorescence of biological materials, the fluorescent effect can be analyzed to relate to the specific coded UV frequency allowing a multiplicity of measurements to occur in a multiplexed form. An illumination spectrum can be designed to dynamically stimulate the material to produce a detectable characteristic signature, including fluorescence effects and multiple fluorescent effects, as well as Raman and polarization effects. Shining UV light in various selected wavelengths is known to provoke characteristic fluorescence, which when spectrally analyzed can be used to discriminate between various categories of living or dead cells.

Another application of the system and method of this invention is the use of the OSPU as a correlator or mask in an optical computation device. For example, an SLM, such as DMA can act as a spatial filter or mask placed at the focal length of a lens or set of lenses. As illustrated above, the SLM can be configured to reject specific spatial resolution elements, so that the subsequent image has properties that are consistent with the spatial filtering in Fourier space. It will be apparent that the transform of the image by optical means is spatially effected, and that the spatial resolution of images produced in this manner can be altered in any desired way.

Yet another area of use is performing certain signal processing functions in analog domain. For example, spatial processing with a DMA can be achieved directly in order to acquire various combinations of spatial patterns. Thus, an array of mirrors can be arranged to have all mirrors of the center of the image point to one detector, while all the periphery goes to the other. Another useful arrangement designed to detect vertical edges will raster scan a group of, for example, 2×2 mirrors pointing left combined with an adjacent group of 2×2 mirrors pointing right. This corresponds to a convolution of the image with an edge detector. The ability to design filters made out of patterns of 0, 1, −1 i.e., mirror configurations, will enable the imaging device to only measure those features which are most useful for display, discrimination or identification of spatial patterns.

The design of filters can be done empirically by using the automatic best basis algorithms for discrimination, discussed above, which is achieved by collecting data for a class of objects needing detection, and processing all filters in the Walsh Hadamard Library of wavelet packets for optimal discrimination value. The offline default filters can then be upgraded online in real-time to adapt to filed conditions and local clutter and interferences. The predetermined spectral features are the positive and negative parts of one or more features from a set consisting of regression vectors, principal component vectors of a spectral model, and LDB vectors. Such optimal discrimination value wavelet packets, and related constructions, are known to those of skill in the art as the vectors of a Local Discrimination Basis, or simply as LDB vectors.

Figure 49:
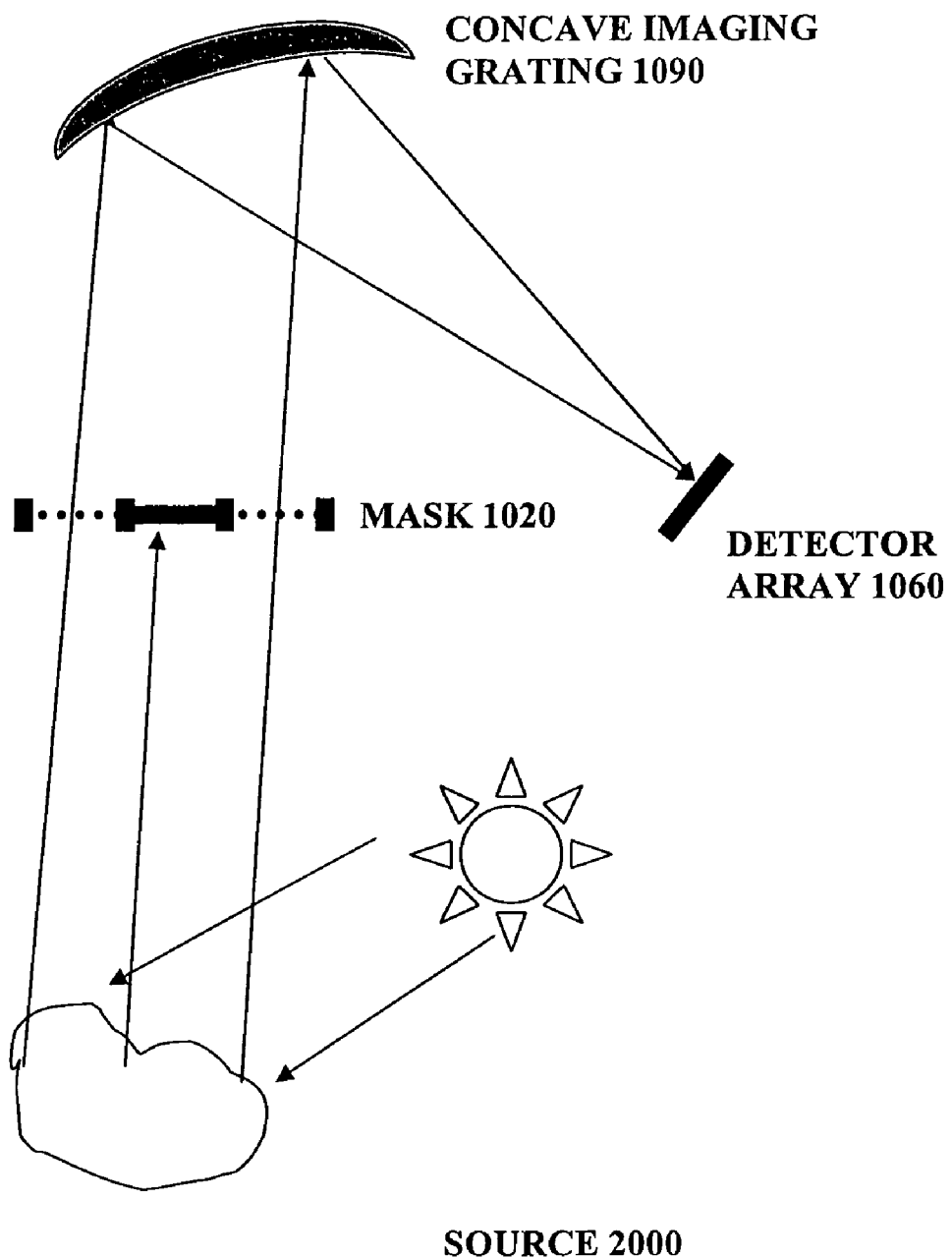
FIG. 49 illustrates in schematic form, a Hadamard encoded aperture of length N=3 in a de-dispersive imaging spectrograph in accordance with an embodiment of the present invention.

Turning now to FIG. 49, there is illustrated portions of an exemplary spectral measurement system 1000 in accordance with an embodiment of the present invention operating as a de-dispersive imaging spectrograph. The de-dispersive imaging spectrograph comprises an encoded Hadamard aperture or mask 1020 of length N=3, a concave imaging grating 1090, and a detector array 1060.

Figure 48:
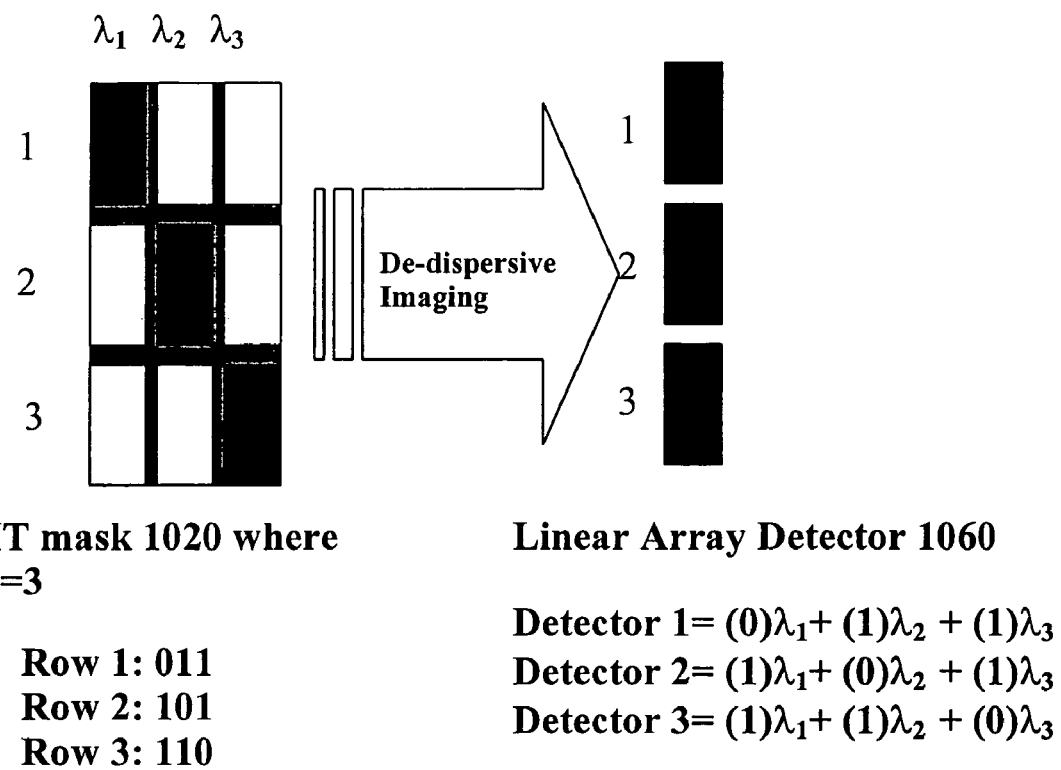
FIG. 48 illustrates how, in accordance an embodiment of the present invention, a Hadamard encoded aperture of length N=3 in a de-dispersive imaging spectrograph results in a combination of spectral resolution elements impinging upon the detector array.

The operation of the Hadamard encoded aperture or mask 1020 of length N=3 in a de-dispersive imaging spectrogram is shown in FIG. 48. The Hadamard encoded mask 1020 of the present invention results in a combination of spectral resolution impinging upon the detector array 1060 so that each of the individual detectors in the array 1060 correspond to each of the N rows of the encodement mask 1020. The combination of spectral resolution elements impinging upon a particular detector element is determined by the open mask resolution elements in the corresponding row. The combination of spectral resolution elements impinging upon a particular detector element is determined by the open mask resolution elements in the corresponding row of the encoded mask 1020. It is appreciated that the simplified view of FIG. 49 shows only first of three shifted encodements corresponding the three detectors of the linear detector array 1060. Top row encodement of 101 is shown in FIG. 49 impinging first and third spectral resolution element on first detector.

Figure 51:
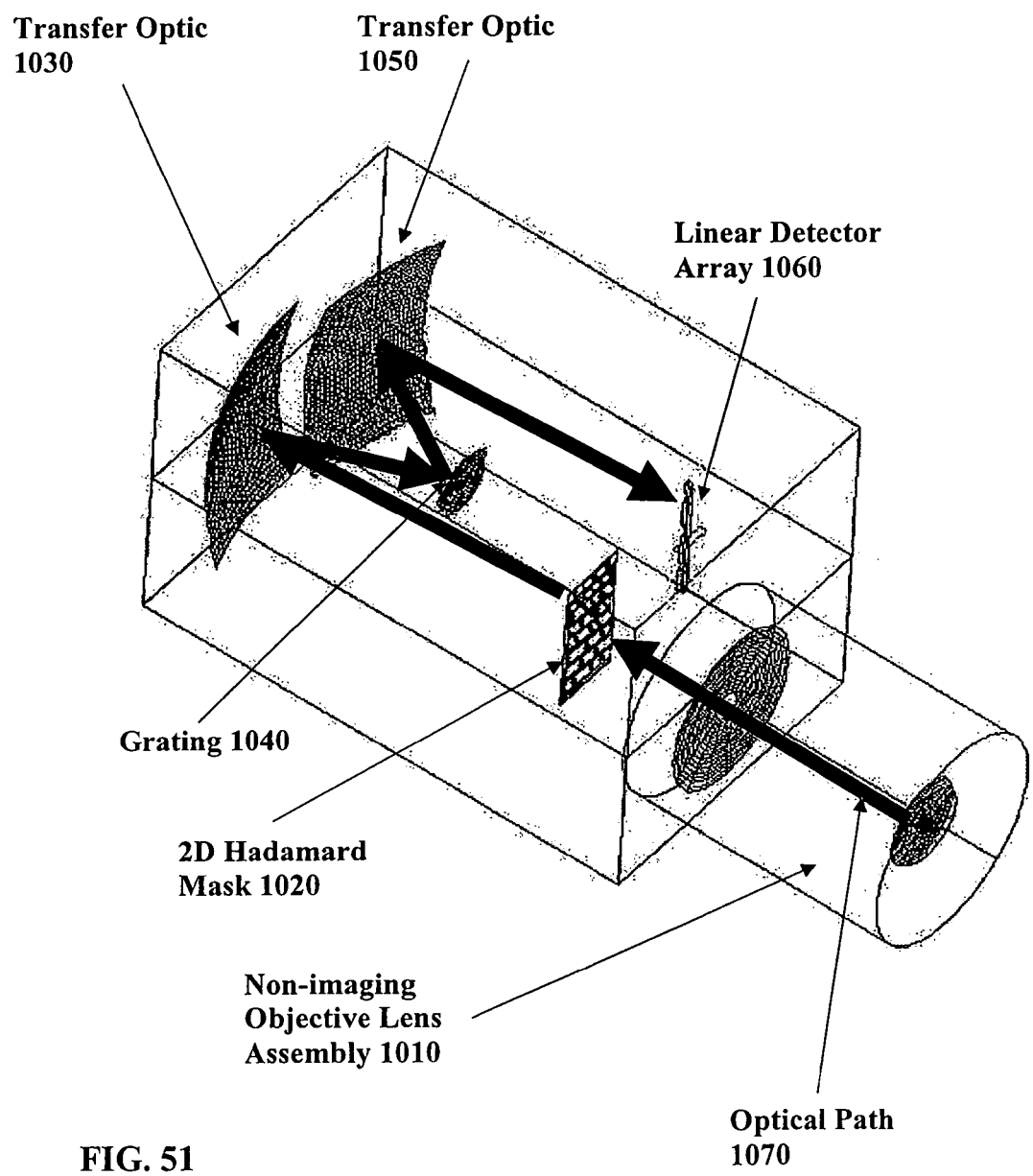
FIG. 51 is a schematic diagram of an exemplary spectral measurement system in accordance with an embodiment of the present invention.

Turning now to FIG. 51, there is illustrated an exemplary spectral measurement system 1000 in accordance with an embodiment of the present invention comprising a mixing optic or non-imaging objective lens assembly 1010, an encoded mask, such as a 2D Hadamard mask 1020, a first reflective transfer optic 1030, a reflective grating 1040, a second reflective transfer optic 1050 and a linear detector array 1060. Light from the source 2000 interacts with the sample 2010 and the mixing optic or non-imaging objective lens assembly 1010 collects the light from the sample area. The light travels through the non-imaging objective lens assembly 1010 via an optical path 1070 and the 2D Hadamard mask 1020, and onto the first reflective transfer optic 1030. The light reflected from the first reflective transfer optic 1030 is further reflected by the reflective grating 1040 and the second reflective transfer optic 1050, and onto the linear detector array 1060. Each row of the 2D Hadamard mask 1020 is one encodement, and goes to one corresponding element of the linear detector array 1060. In this manner, the linear detector array 1060 simultaneously measure a full (Hadamard encoded) spectrum with each measurement. It is appreciated that the number of reflective elements shown in FIG. 51 is merely illustrative and any appropriate number of reflective elements can be used. It is also appreciated that the Hadamard encodement represented in FIG. 51 is merely illustrative. The mask aperture comprises spatially differentiated mask elements. The spectral dispersion elements comprises line densities or programmable line densities exposed to a plurality of spatially differentiated electromagnetic energy propagating from the spatially differentiated mask elements such that the magnitude of diffraction is varied for the spatially differentiated mask elements.

Figure 50:
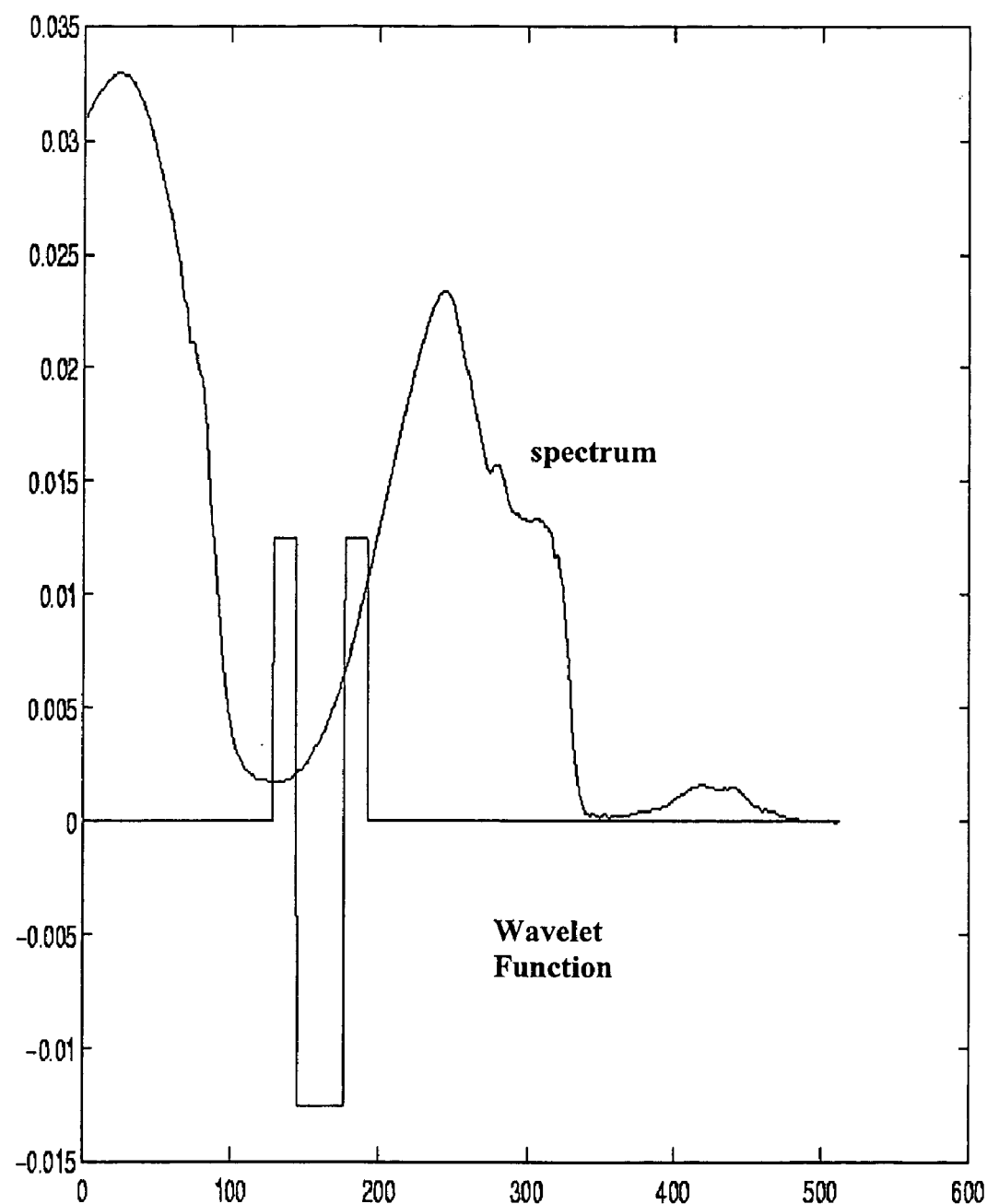
FIG. 50 illustrates a typical spectrum together with an individual wavelet packet function.

FIG. 50 illustrates a typical spectrum together with an individual wavelet packet function. Correlation of the spectrum with the wavelet packet yields a prediction of a relevant quantity which can be used as an encodement in a row of a direct measure encoded aperture of the de-dispersive imaging spectrograph of the present invention.

In an accordance with an embodiment of the present invention, the non-imaging objective lens assembly or lens system 1010 collects the light from the sample area and mixes the light homogenously for presentation to the encoded aperture of the Hadamard mask 1020. As shown in FIG. 49, the light from the source 2000 interacts with the sample 2010 and the interacted light from the sample area is then collected by the non-imaging objective lens assembly 1010. The light from the lens system 1010 is delivered to a fixed encodement entrance aperture into the spectrograph portion or system 1080 of the spectral measurement system 1000 of the present invention. The spectrograph system 1080 receives the spatially encoded light (each spatial position dictates a resolvable spectral resolution element at the detector plane) and de-disperses, in accordance with their spatial distribution, a combination of spectral components onto a single row-matched detector element of the linear detector array 1060. Each row of the HT mask 1020 has a single detector element to record the corresponding encoded spectral resolution element combination. This is essentially a linear array detector 1060 in place of the entranced slit in an imaging spectrograph operated in reverse, where each row of the HT mask 1020 is one shifted encodement from the next or some set of algorithmic combinations for direct measure (e.g., principal components from a chemometric model).

Instead of a single detector element, in accordance with an embodiment of the present invention, the spectral measurement system 1000 comprises a multi-element linear detector array 1060 and a 2D encoding mask 1020 such that each of N detector elements are illuminated with one more than half of the available spectral resolution elements.

In accordance with an embodiment of the present invention, the spectral measurement system 1000 comprises an all reflective system where some top fraction of the mask rows feeds the detector array 1060 that is sensitive to some fraction of the desired spectral range or bandwidth. The lower fraction or remaining rows of the encoded mask 1020 delivering the remaining fraction of the spectral band pass to spatially shifted array of detectors 1060.

For a conventional Fourier transform (FT) or Hadamard transform (HT) instrument that needs to move a mirror for FT or a mask for HT, and it must integrate over some minimal integration time $t_i$ for each detector (single element). Accordingly, the total data collection time is $t_i$ times the number of data resolution elements (N), or mirror or mask positions. In contrast, the static HT multiplexing spectrometer of the present invention can simultaneously collect N spectra. These N spectra can then be averaged to realize an improvement in SNR over scanning FT or scanning HT instruments that is equivalent to the square root of N.

Figure 52:
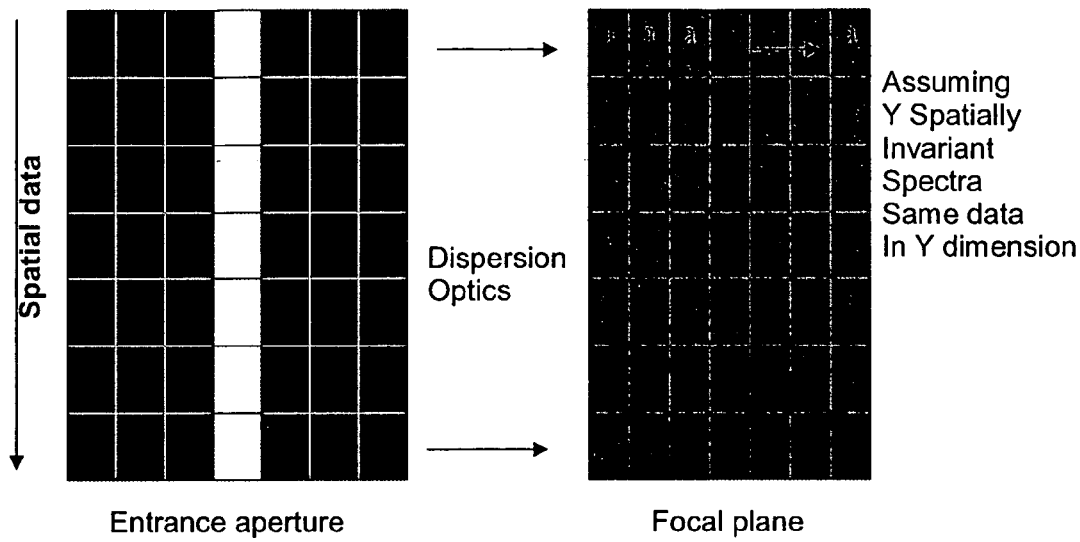
FIG. 52 is a schematic of a conventional imaging spectrograph system function where the entrance aperture is masked by a slit opening.

Turning now to FIG. 52, there is illustrated a schematic of a conventional imaging spectrograph system function where the entrance aperture is masked by a slit opening. Light traveling through the slit is dispersed and presented focused onto the two (2) dimensional focal plane of contiguous detector elements.

Figure 53:
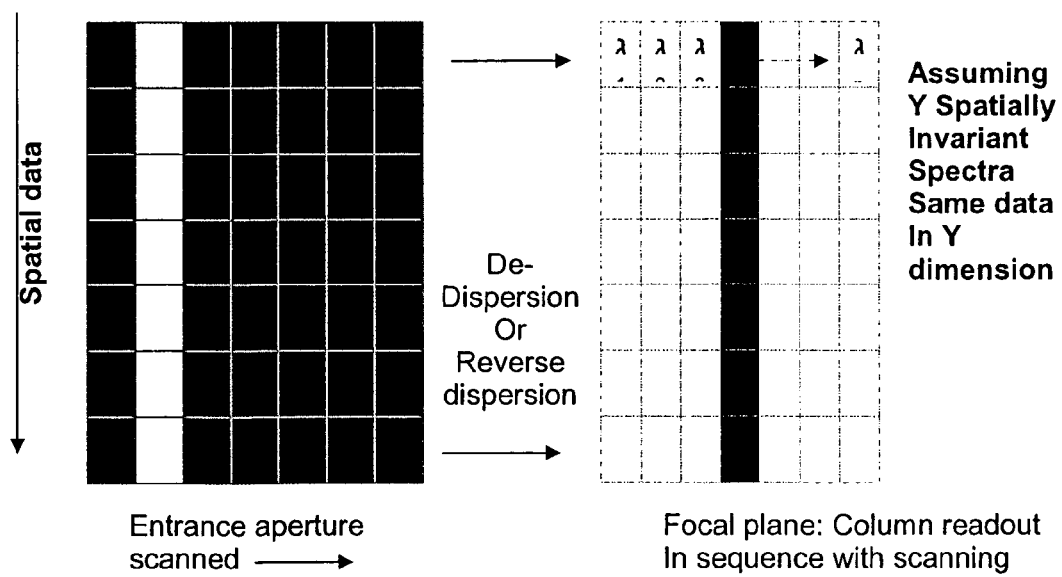
FIG. 53 is a schematic of a conventional scanning slit imaging spectrograph using a linear array detector.

A schematic of a conventional scanning slit imaging spectrograph using a linear array detector is shown in FIG. 53. The entrance slit mask in the aperture is scanned across the entirety of the entrance aperture and the energy entering the slit mask is dispersed onto a linear array of detector elements situated where each detector element receives that energy from that portion of the slit mask that corresponds to its Y spatial location.

Figure 54:
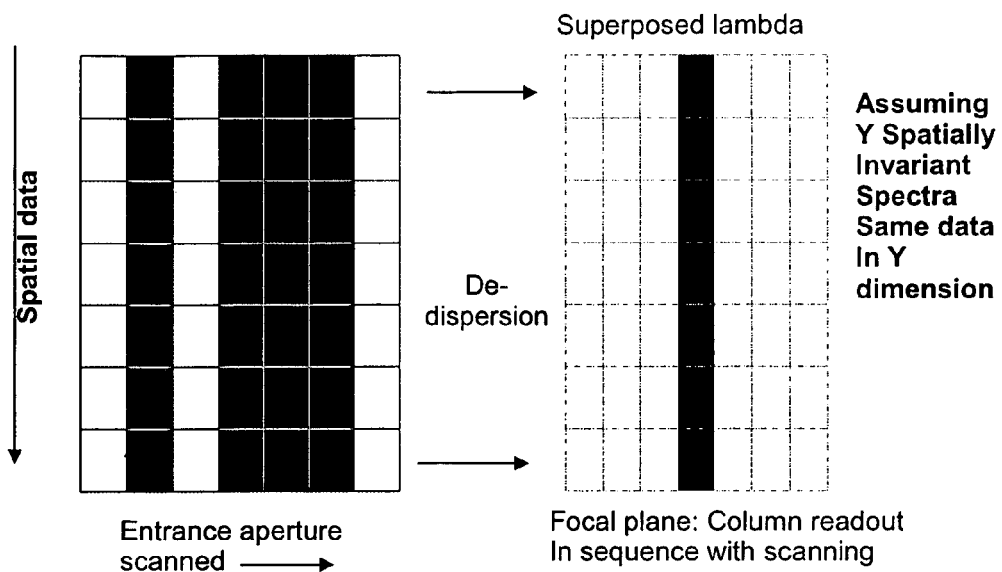
FIG. 54 is a schematic of a conventional scanning Hadamard transform imaging spectrograph operating in a de-dispersive modality.

FIG. 54 shows a schematic of a conventional scanning Hadamard transform imaging spectrograph operating in a de-dispersive modality. Each element in the linear detector array receives that combination of energy entering the combinations of slit openings that correspond to the Y spatial location at the entrance mask. The detector receives the combination of wavelengths in accordance with the slit mask combination of openings spatially distributed in the X or spectral dimension of the system.

Figure 55:
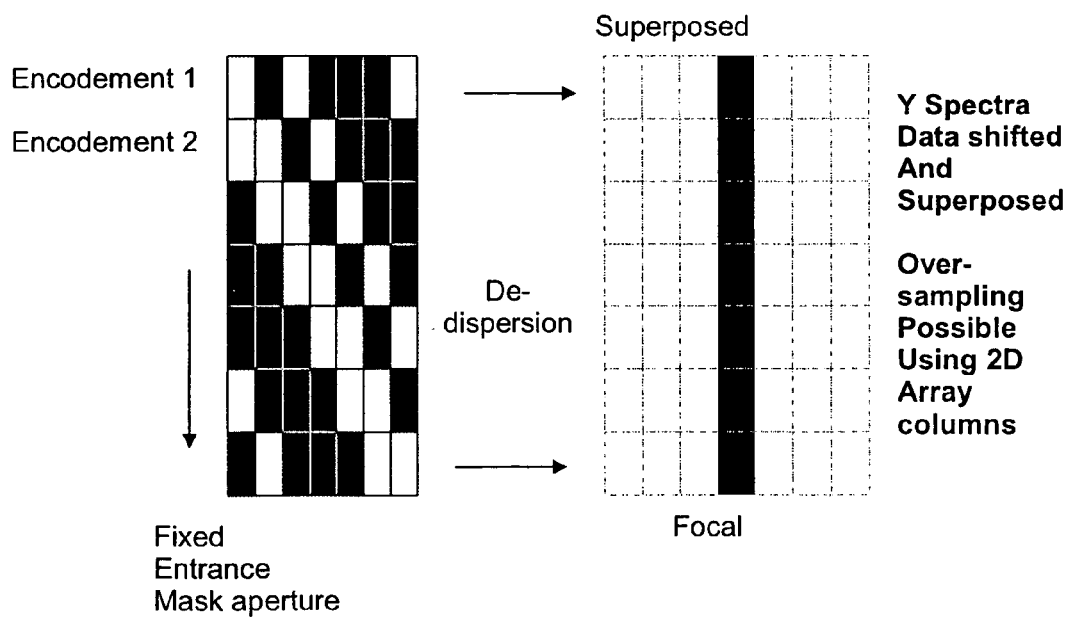
FIG. 55 is a schematic of a spectral measurement imaging spectrograph in accordance with an embodiment of the present invention.

A schematic of a spectral measurement imaging spectrograph in accordance with an embodiment of the present invention is shown in FIG. 55. The entrance aperture is masked in accordance with a N=7 S type Hadamard matrix providing for a SQRT(N)/2 improvement in SNR over conventional single slit mask type monochromer systems. Each row of open mask elements correspond to a single detector element and represent one encodement of the set of 7 encodements. Each detector element receives that combination of wavelengths that are dictated by the spatial location of the open mask elements and the dispersion or de-dispersion properties of the optical system employed. The data recovered from each detector element can be transformed to reveal the spectrum of the energy entering the spectral measurement system of the present invention through the masked entrance aperture.

Figure 56:
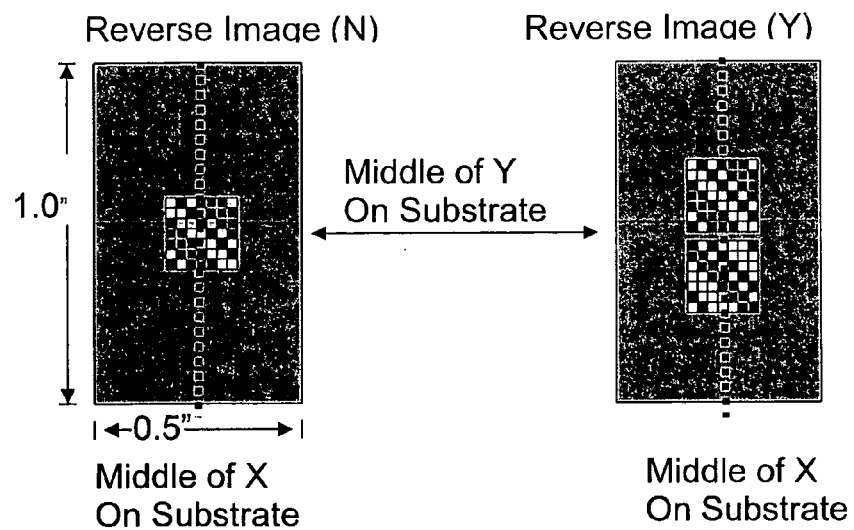
FIG. 56 is a schematic of a spectral measurement imaging spectrograph in accordance with an embodiment of the present invention.

FIG. 56 is a schematic of a spectral measurement imaging spectrograph in accordance with an embodiment of the present invention. The entrance aperture is masked with a 0,1 encoding scheme or S type cyclic matrix on the left and with a H type Hadamard matrix of 1, −1 on the right providing for a SQRT(N) improvement in SNR over conventional single slit mask type monochromer systems. Each row of open mask elements correspond to a single detector element and represent one encodement of the set of the N encodements. Each detector element receives that combination of wavelengths that are dictated by the spatial location of the open mask elements and the dispersion or de-dispersion properties of the optical system employed. The data recovered from each detector element can be transformed to reveal the spectrum of the energy entering the system through the masked entrance aperture.

Figure 57:
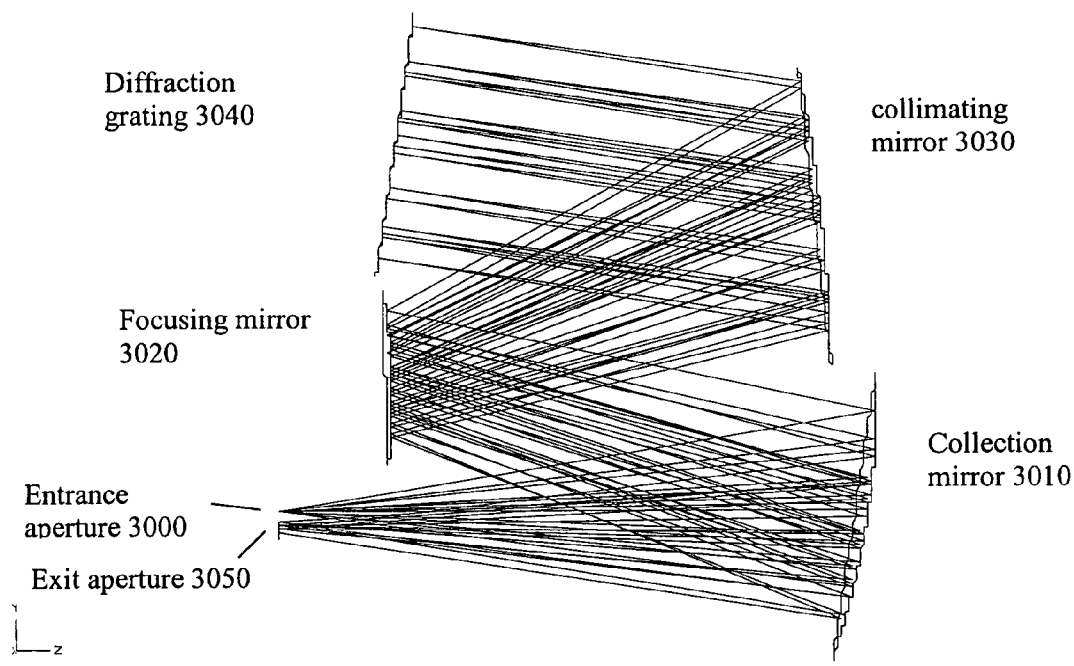
FIG. 57 illustrates the path of light in an optimized optical model of a spectral measurement system in accordance with an embodiment of the present invention.

The path of light in an optimized optical model of a spectral measurement system in accordance with an embodiment of the present invention generated using a commercially available optical design optimization program is shown in FIG. 57. As shown in FIG. 57, the light travels the following optical path in the system: the entrance aperture 3000, the collection mirror 3010, the focusing mirror 3020, the secondary collimating mirror 3030, the diffraction grating 3040, the secondary collimating mirror 3030, the focusing mirror 3020, the collection mirror 3010, and the exit aperture 3050 or the detector array.

Figure 58:
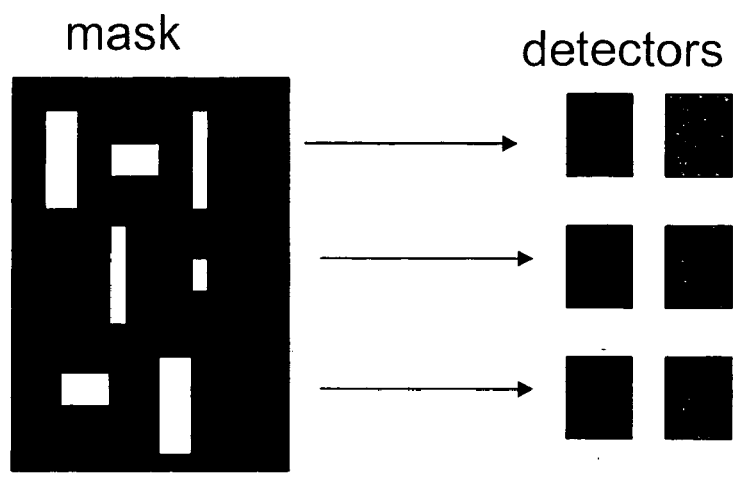
FIG. 58 illustrates an exemplary mask utilized in accordance with an embodiment of the present invention for a non-contiguous non-equally spaced band pass or principal component type analysis.

An exemplary mask utilized in accordance with an embodiment of the present invention for a non-contiguous non-equally spaced band pass or principal component type analysis is shown in FIG. 58.

Figure 59:
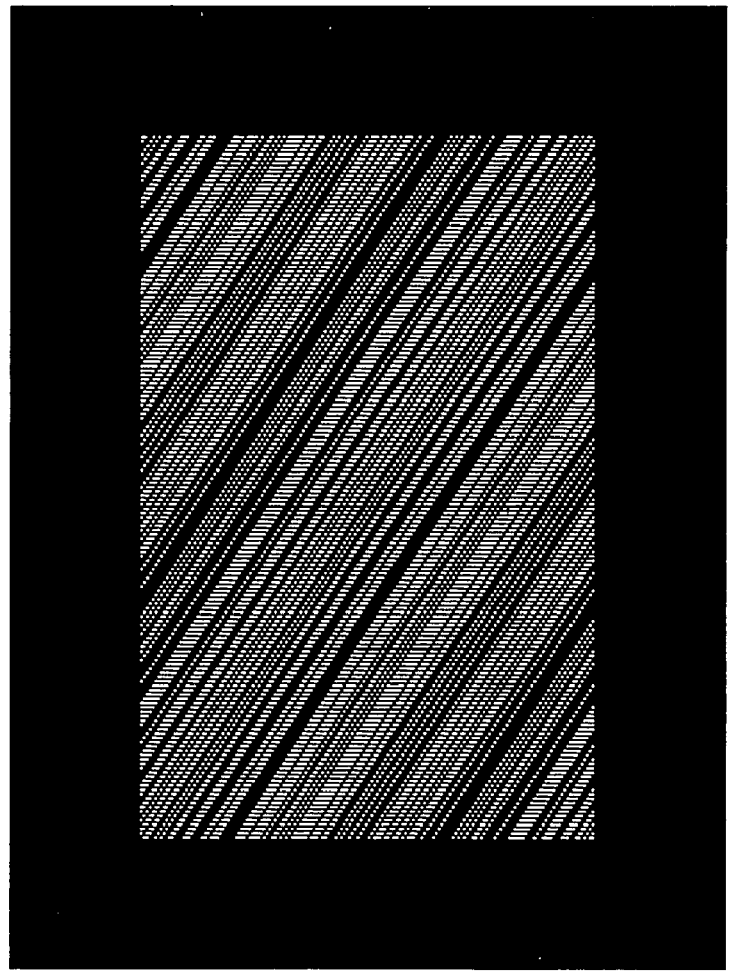
FIG. 59 illustrates an exemplary optical mask in accordance with an embodiment of the present invention.
Figure 60:
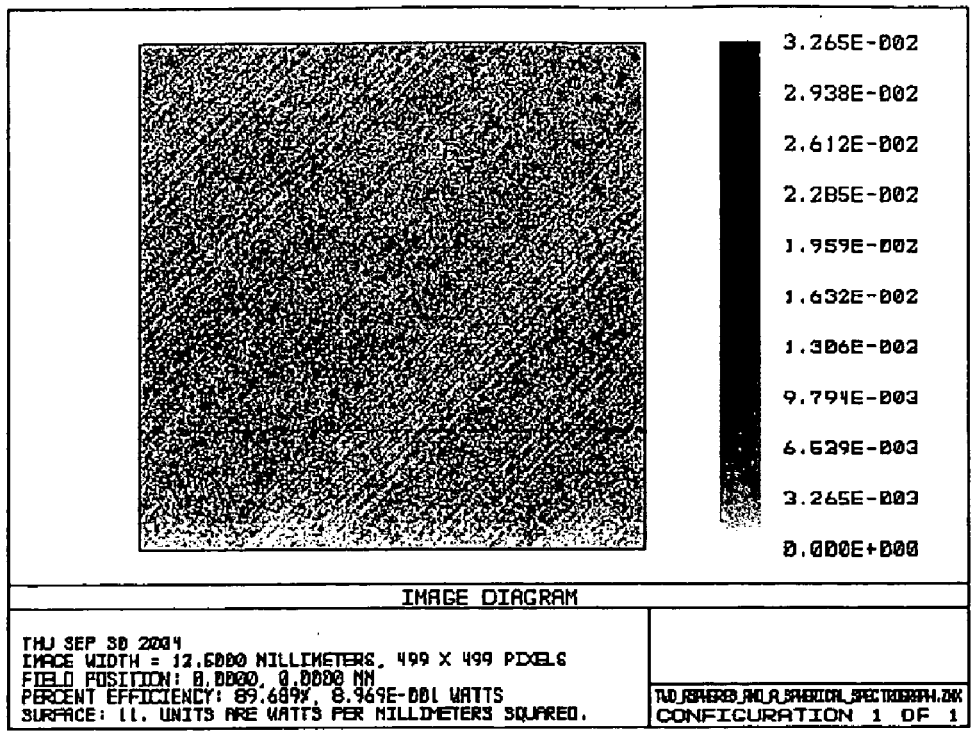
FIG. 60 illustrates the simulated output of a two dimensional detector array using 2D array of detector elements in accordance with an embodiment of the present invention and the optical model of FIG. 557

An exemplary optical mask in accordance with an embodiment of the present invention where N=163 in a S type cyclic Hadamard matrix of 0 and 1 is shown in FIG. 59.

Figure 61:
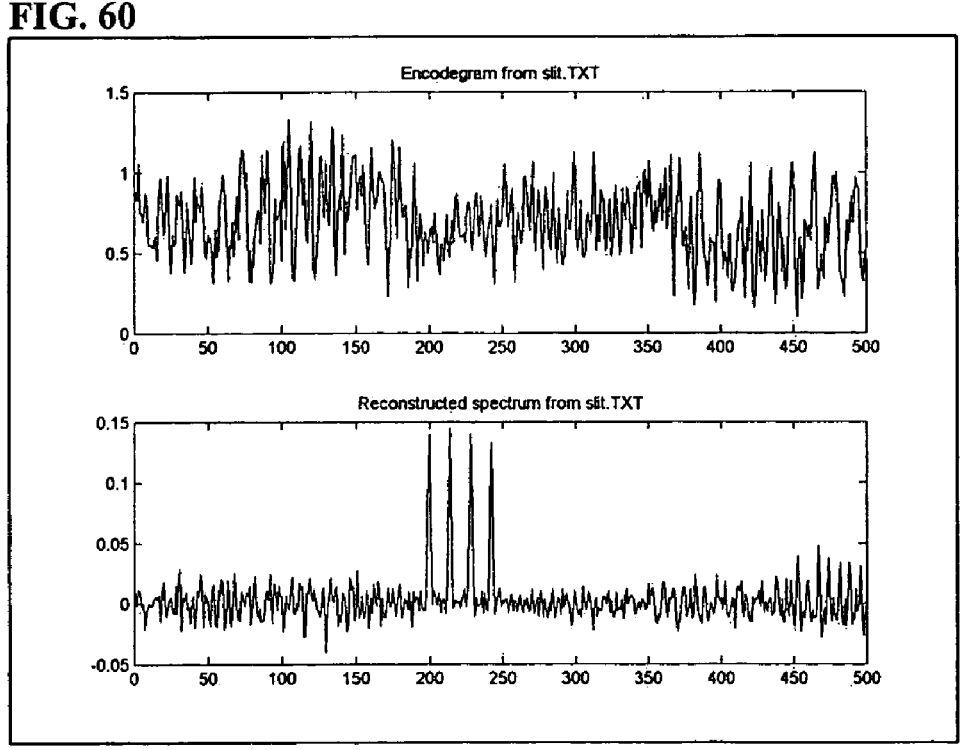
FIG. 61 illustrates exemplary results of the detector output and transform spectra of a spectral measurement system in accordance with an embodiment of the present invention.
Figure 62:
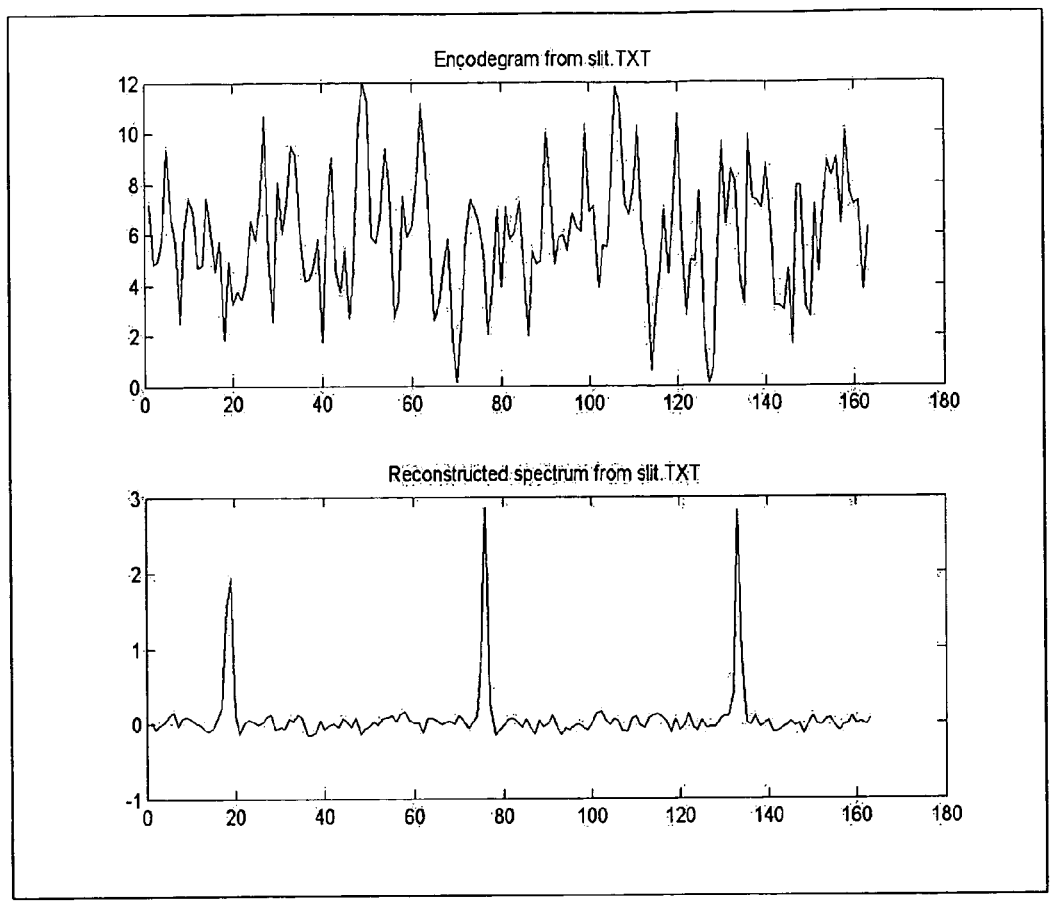
FIG. 62 illustrates exemplary results of a 2D detector output and transform spectra of a spectral measurement system in accordance with an embodiment of the present invention.
Figure 63:
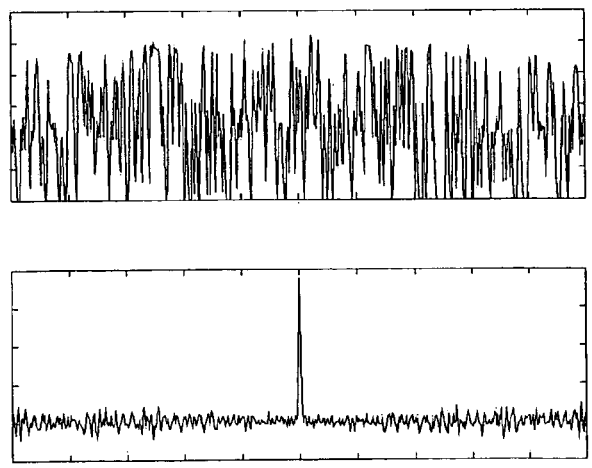
FIG. 63 illustrates exemplary results of the detector output and transform spectra of a spectral measurement system in accordance with an embodiment of the present invention.

Turning now to FIG. 62, there is illustrated a simulated output of a two dimensional detector array using 2D array of detector elements in accordance with an embodiment of the present invention and the optical model of FIG. 57. Exemplary results of the detector output and transform spectra of a spectral measurement system in accordance with an embodiment of the present invention are shown in FIGS. 61–63.

Figure 64:
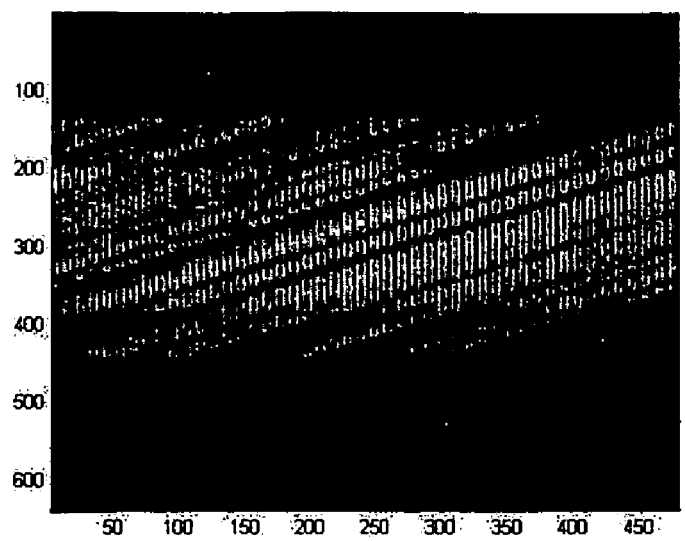
FIG. 64 illustrates exemplary results of the detector output from a spectral measurement system in accordance with an embodiment of the present invention in the visible-NIR spectral range.
Figure 65:
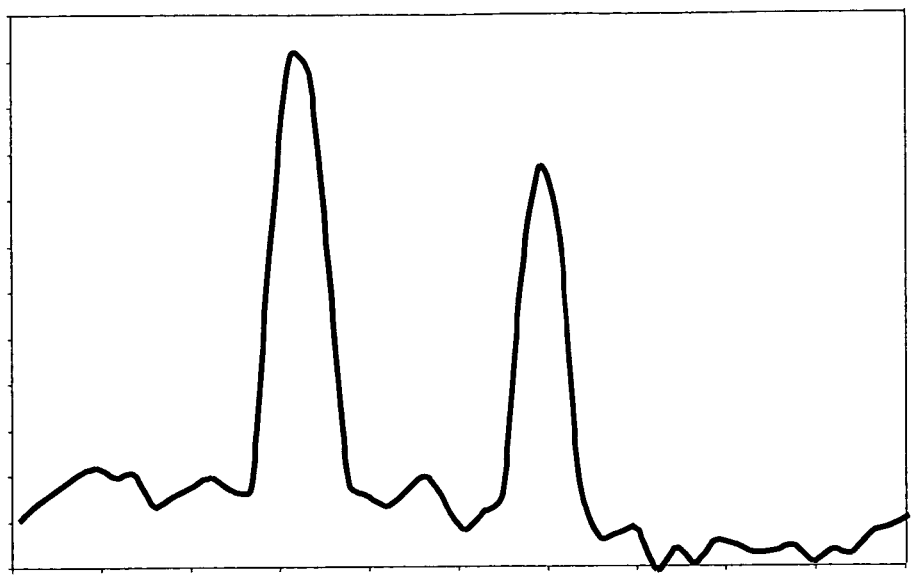
FIG. 65 illustrates exemplary spectrum results of the transformed data of a spectral measurement system in accordance with embodiment of the present invention operating in the visible-near-infrared spectral region.
Figure 66:
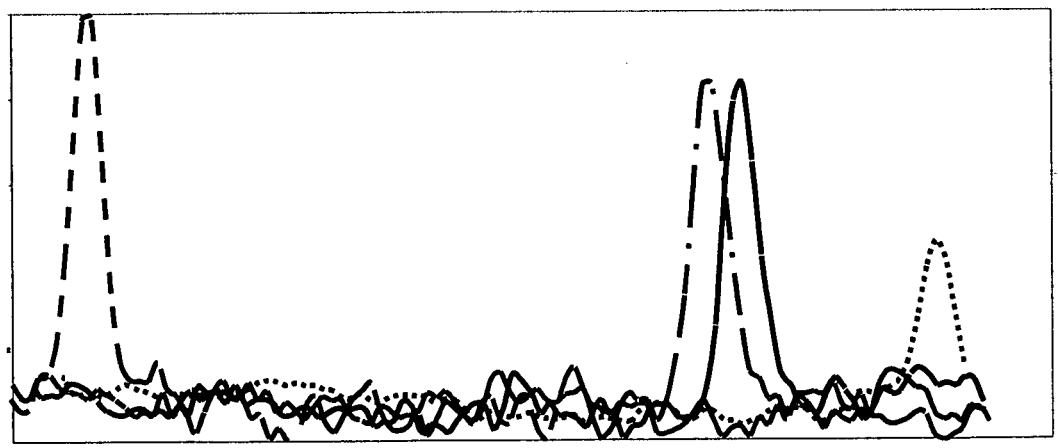
FIG. 66 illustrates an exemplary spectrum results of the transformed data from a spectral measurement system in accordance with an embodiment of the present invention operating in the near-infrared spectral region.

Exemplary results of the detector output from a spectral measurement system in accordance with an embodiment of the present invention in the visible-NIR spectral range collected by two dimensional (2D) silicon charge coupled device (CCD) type camera system is shown in FIG. 64. Exemplary spectrum results of the transformed data of a spectral measurement system in accordance with embodiment of the present invention operating in the visible-near-infrared spectral region and the near-infrared spectral region are shown in FIGS. 65 and 66, respectively.

In accordance with an embodiment of the present invention, the spectral measurement system can directly measure the linear spectral features of a mixture of samples or a sample in complex sample matrices. In particular, often a chemometric or similar model can be constructed from measurements or data, such that the constructed model dictates the measurement of spectra from a sample or scene of interest. The system computes a set of linear features (e.g., inner products or correlations over the collected wavelengths) and derives an answer from these linear features. In accordance with an embodiment of the present invention, the aperture or mask 1020 of the static HT spectrometer can be encoded such that the static HT spectrometer can directly measure the principle components or other "regression vectors" from a model of a sample in the matrix. The encoded mask 1020 has elements that transmit at each point that is proportional to the generalized regression vector coefficient at the corresponding spectral value. This measurement is "direct" in the sense that the combination of spectral bands that is dictated by the linear feature of the determined model will take place in the optical domain because the mask-weighted combination of energy will fall on an individual detector and all of the model components will be collected simultaneously. Each of the model components is combined within the instrument prior to detection. This combination occurs at light speed with the advantage of high photonic flux and reduced integration times due to the increase in photonic flux at the detector. The detector response can be weighted appropriately and each detector can be biased with the result of an instantaneous measure of interest in complex sample matrices.

In accordance with an embodiment of the present invention, the mask elements are substantially transparent at prescribed locations, and substantially opaque at other prescribed locations. For example, such masks can be constructed using photolithography techniques and other comparable means.

In accordance with an embodiment of the present invention, the spectral measurement system can be calibrated by coupling the spectral measurement system with an existing high-resolution spectrometer, such as a Fourier Transform spectrometer, and measuring the response of the coupled system, for example as the FT spectrometer is step-scanned through a range of settings. The output of each detector element of the spectral measurement system then yields the spectral response of each pixel of the spectral measurement system. This spectral data can be used, together with standard linear algebra, or optionally more sophisticated mathematics, to improve the measurements made by the spectral measurement system.

In accordance with an embodiment of the present invention, the spectral measurement system employs spherical reflective optical components (mirrors) as transfer optics 1030, 1050. Alternatively, the spectral measurement system of the present invention can employ high performance aspherical mirror optical surfaces as transfer optics 1030, 1050.

In accordance with an embodiment of the present invention, the spectral measurement system employs a 2D detector array wherein each column of the array acts as a spectrometer. In accordance with an aspect of the present invention, although only one column, e.g., the one in the center of the 2D array, has true Hadamard encoded spectra, each other column will receive a signal from which spectral information can be reconstructed. This redundant system can be inverted to yield a spectrum estimate with greater signal to noise ratio. Specifically, the linear function mapping the 2D array's output to the spectrum can be derived as in the calibration procedure described herein. It is appreciated that each of the columns will be similar to neighboring columns, but shifted in wavelength. In accordance with an embodiment of the present invention, this information can be utilized to provide a more compact spectral measurement system wherein a few columns of detector arrays are employed.

In accordance with an embodiment of the present invention, the spectral dispersion element is one of the following: a volume type diffraction element, a holographically ruled diffraction element, a mechanically ruled diffraction element, an array of bragg diffraction gratings, an acousto-optical diffraction device, an tunable diffraction grating, or a micro-electromechanical systems (MEMS) device.

In any of the embodiments described herein, the array elements can be placed on a Roland circle for the system grating, rather than in a flat plane, thereby permitting some of the usual problems associated with diffraction grating optics.

It is appreciated that it is standard in the art to employ transfer optics at various places along the optical path in the design and implementation of the kinds of systems disclosed herein. In the disclosure, these transfer optics are sometimes and sometimes omitted from the drawings and descriptions, depending on which choice best aids in the descriptive process in each case. It is intended by the inventors that elements incorporated by techniques and practices standard in the art are to be incorporated in the present invention.

While the foregoing has described and illustrated aspects of various embodiments of the present invention, those skilled in the art will recognize that alternative components and techniques, and/or combinations and permutations of the described components and techniques, can be substituted for, or added to, the embodiments described herein. It is intended, therefore, that the present invention not be defined by the specific embodiments described herein, but rather by the appended claims, which are intended to be construed in accordance with the well-settled principles of claim construction, including that: each claim should be given its broadest reasonable interpretation consistent with the specification; limitations should not be read from the specification or drawings into the claims; words in a claim should be given their plain, ordinary, and generic meaning, unless it is readily apparent from the specification that an unusual meaning was intended; an absence of the specific words "means for" connotes applicants' intent not to invoke 35 U.S.C. §112 (6) in construing the limitation; where the phrase "means for" precedes a data processing or manipulation "function," it is intended that the resulting means-plus-function element be construed to cover any, and all, computer implementation(s) of the recited "function"; a claim that contains more than one computer-implemented means-plus-function element should not be construed to require that each means-plus-function element must be a structurally distinct entity (such as a particular piece of hardware or block of code); rather, such claim should be construed merely to require that the overall combination of hardware/firmware/software which implements the invention must, as a whole, implement at least the function(s) called for by the claim's means-plus-function element(s).

We claim:

1. A spectral measurement device comprising:
   a mask aperture in the form of a two-dimensional encodement pattern disposed to receive an input of an electromagnetic energy, wherein said input of said electromagnetic energy is a diffuse input and non-imaging;
   a spectral dispersion element for dispersing said electromagnetic energy in one or more dimensions to provide a dispersed electromagnetic energy;
   an array of detector elements; and
   an optical element for conditioning said electromagnetic energy received from said mask aperture for presentation to said spectral dispersion element and conditioning said dispersed electromagnetic energy onto said array of detector elements.

2. The spectral measurement device of claim 1, wherein said optical element comprises a first optical element for conditioning said electromagnetic energy received from said mask aperture for presentation to said spectral dispersion element and a second optical element for conditioning said dispersed electromagnetic energy onto said array of detector elements.

3. The spectral measurement device of claim 1, wherein said electromagnetic energy is one of the following: optical energy, infrared energy, ultraviolet energy, far-infrared energy, or microwave energy.

4. The spectral measurement device of claim 1, wherein said mask aperture is encoded with a Hadamard pattern of elements.

5. The spectral measurement device of claim 1, wherein said mask aperture comprises at least one of the following: a two dimensional (2D) array of reflective and non-reflective mask elements, a two dimensional (2D) array of open and closed mask elements, an array of wavelength filter elements, an array of optical density filter elements, a spatial light modulator, a two dimensional (2D) array of transmissive and non-transmissive mask elements, and a removable mask module.

6. The spectral measurement device of claim 1, wherein said optical element is one of the following: a refractive lens element or a reflective lens element.

7. The spectral measurement device of claim 1, wherein said optical element is operable to collimate said electromagnetic energy received from said mask aperture.

8. The spectral measurement device of claim 1, wherein said optical element is operable to focus said electromagnetic energy received from said mask aperture.

9. The spectral measurement device of claim 1, wherein said spectral dispersion element is one of the following: a volume type diffraction element, a holographically ruled diffraction element, a mechanically ruled diffraction element, an array of bragg diffraction gratings, an acousto-optical diffraction device, an tunable diffraction grating, or a micro-electromechanical systems (MEMS) device.

10. The spectral measurement device of claim 1, wherein said mask aperture comprises spatially differentiated mask elements; and wherein said spectral dispersion element comprises line densities exposed to a plurality of spatially differentiated electromagnetic energy propagating from said spatially differentiated mask elements such that the magnitude of diffraction is varied for said spatially differentiated mask elements.

11. The spectral measurement device of claim 10, wherein said line densities are programmable line densities.

12. The spectral measurement device of claim 1, wherein said array of detector elements is a linear array of detector elements or a two dimensional (2D) array of detector elements.

13. The spectral measurement device of claim 12, wherein said array of detector elements is a linear array of detector elements; and wherein each detector element is set to receive light from a corresponding row of said two-dimensional encodment pattern of said mask aperture.

14. The spectral measurement device of claim 1, wherein each detector element receives a different spectral range of said electromagnetic energy.

15. The spectral measurement device of claim 1, wherein said mask aperture is encoded with arbitrary fixed weighted combinations of spectral components selected to directly measure predetermined spectral features.

16. The spectral measurement device of claim 15, wherein said predetermined spectral features are the positive and negative parts of one or more features from a set consisting of regression vectors, principal component vectors of a spectral model, and local discriminative basis (LDB) vectors.

17. A spectral measurement device comprising:
a mask aperture in the form of a two-dimensional encodement pattern disposed to receive an input of an electromagnetic energy, wherein said input of said electromagnetic energy is a diffuse input and nonimaging;
a concave grating for conditioning and dispersing said electromagnetic energy in one or more dimensions to provide a dispersed electromagnetic energy; and
an array of detector elements for receiving said dispersed electromagnetic energy from said concave grating.

18. A method for spectral measurement, comprising the steps of:
receiving an input of an electromagnetic energy through a mask aperture in the form of a two-dimensional encodement pattern, wherein said input of said electromagnetic energy is a diffuse input and non-imaging;
dispersing said electromagnetic energy in one or more dimensions to provide a dispersed electromagnetic energy;
conditioning said electromagnetic energy received from said mask aperture for presentation to a spectral dispersion element and conditioning said dispersed electromagnetic energy onto an array of detector elements.

* * * * *